(12) United States Patent
Herman

(10) Patent No.: US 11,756,032 B2
(45) Date of Patent: Sep. 12, 2023

(54) METHODS AND SYSTEMS FOR SECURE PAYMENT PROCESSING

(71) Applicant: Sionic Mobile Corporation, Atlanta, GA (US)

(72) Inventor: Ronald Duane Herman, Atlanta, GA (US)

(73) Assignee: Sionic Mobile Corporation, Atlanta, GA (US)

( * ) Notice: Subject to any disclaimer, the term of this patent is extended or adjusted under 35 U.S.C. 154(b) by 800 days.

(21) Appl. No.: 15/478,154

(22) Filed: Apr. 3, 2017

(65) Prior Publication Data

US 2017/0286958 A1      Oct. 5, 2017

Related U.S. Application Data

(60) Provisional application No. 62/420,365, filed on Nov. 10, 2016, provisional application No. 62/317,357, filed on Apr. 1, 2016.

(51) Int. Cl.
| | | |
|---|---|---|
| *G06Q 20/40* | (2012.01) | |
| *G06Q 20/38* | (2012.01) | |
| *G06Q 20/32* | (2012.01) | |

(52) U.S. Cl.
CPC ....... *G06Q 20/4012* (2013.01); *G06Q 20/322* (2013.01); *G06Q 20/3821* (2013.01); *G06Q 20/4015* (2020.05)

(58) Field of Classification Search
CPC ............. G06Q 20/4012; G06Q 20/322; G06Q 20/3821; G06Q 20/401
See application file for complete search history.

(56) References Cited

U.S. PATENT DOCUMENTS

| | | |
|---|---|---|
| 9,542,691 B1 | 1/2017 | Herman |
| 2005/0167491 A1 | 8/2005 | Sia |
| | (Continued) | |

FOREIGN PATENT DOCUMENTS

| | | | |
|---|---|---|---|
| IN | 03468DE2014 | | 2/2015 |
| IN | 03468DE2014 A | * | 2/2015 |
| IN | 03468DE2014 A | * | 2/2015 |

OTHER PUBLICATIONS

International Search Report and Written Opinion, dated Jul. 6, 2017, received in connection with International Patent Application No. PCT/US2017/25793.

*Primary Examiner* — John W Hayes
*Assistant Examiner* — Ari Shahabi
(74) *Attorney, Agent, or Firm* — Meunier Carlin & Curfman LLC

(57) ABSTRACT

Exemplified systems and methods facilitate secured mobile payment transactions using credit cards, debit cards, bank account without having to transmit credit card, debit card, or bank account numbers over a wireless network. Rather, the exemplified systems and methods facilitate a highly secure and intuitive payment transaction and/or ATM cash withdrawal or transaction via two independent processes tied to a cloud or enterprise network—one performed between a customer computing device and a cloud network or enterprise network and another performed between a merchant computing device (including an ATM system) and the cloud or enterprise network. The validation token comprising a short code between 3 and 6 tokens in length is beneficially realized.

12 Claims, 51 Drawing Sheets

(56) References Cited

U.S. PATENT DOCUMENTS

| | | | |
|---|---|---|---|
| 2009/0167553 A1* | 7/2009 | Hong | G06Q 10/02 340/4.61 |
| 2010/0006641 A1* | 1/2010 | Boutcher | G06Q 20/20 235/379 |
| 2011/0208659 A1* | 8/2011 | Easterly | G06Q 20/3274 705/79 |
| 2011/0238573 A1 | 9/2011 | Varadarajan | |
| 2016/0335608 A1* | 11/2016 | Balasubramani | G06Q 20/322 |

* cited by examiner

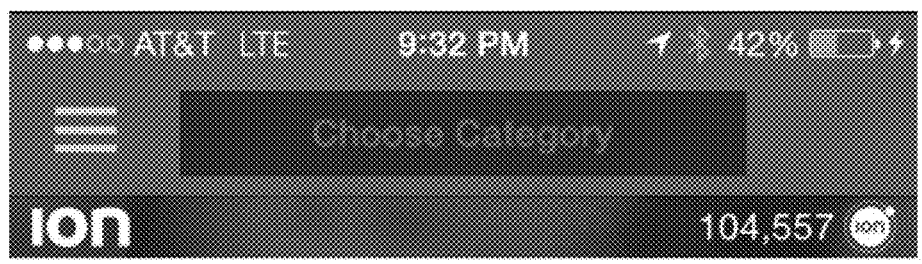
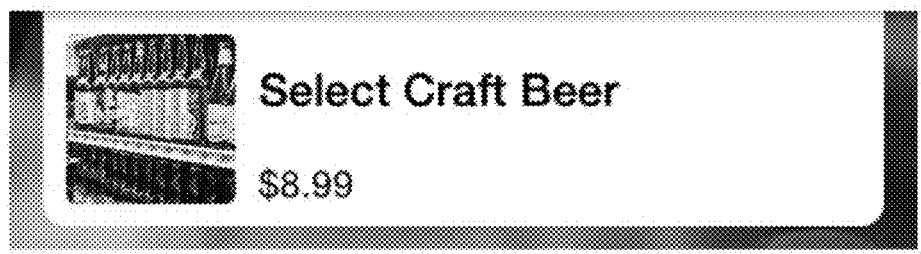
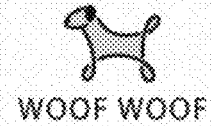
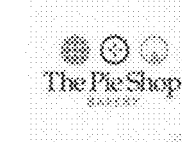
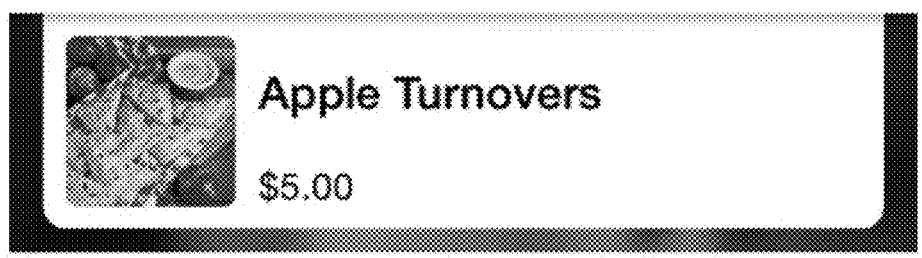
FIG. 3B

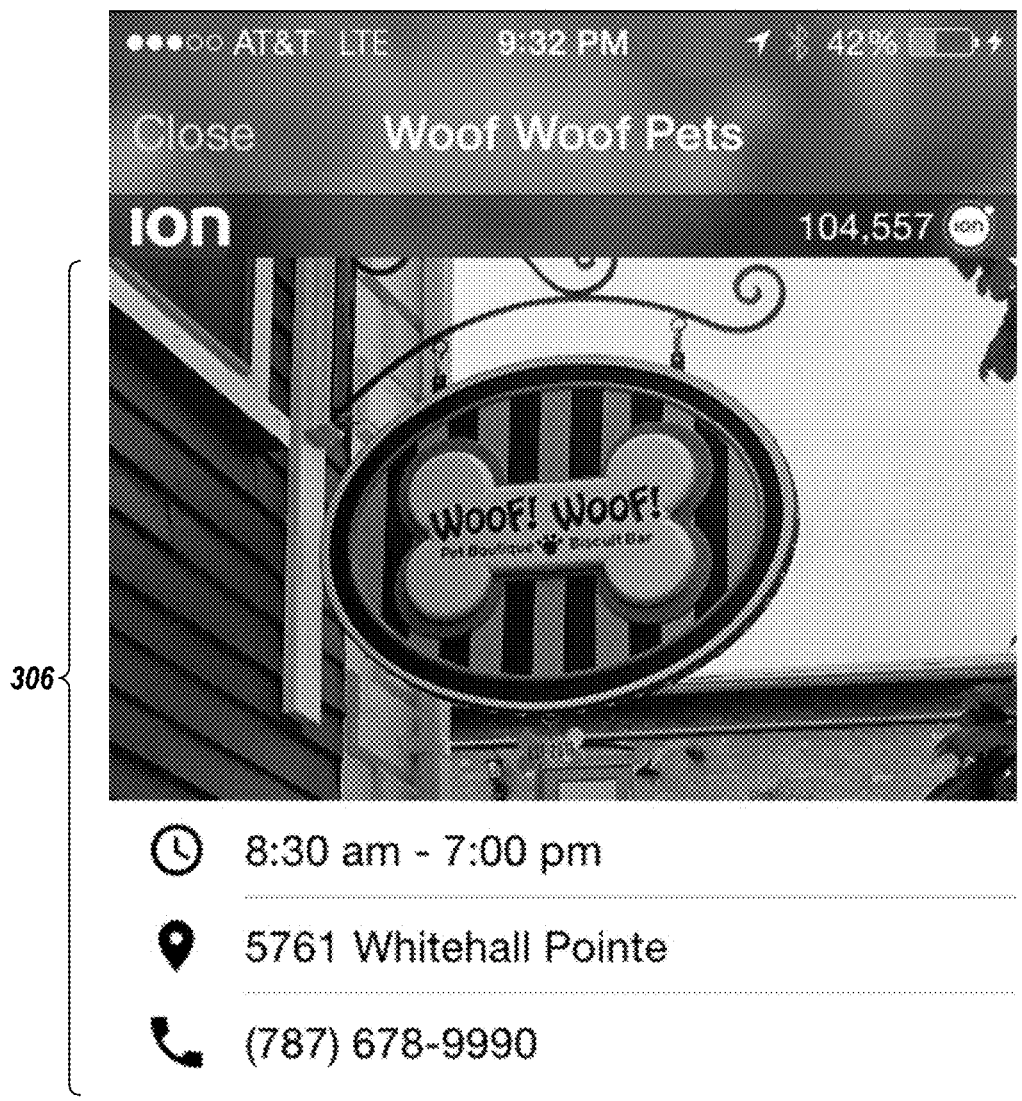
FIG. 3C

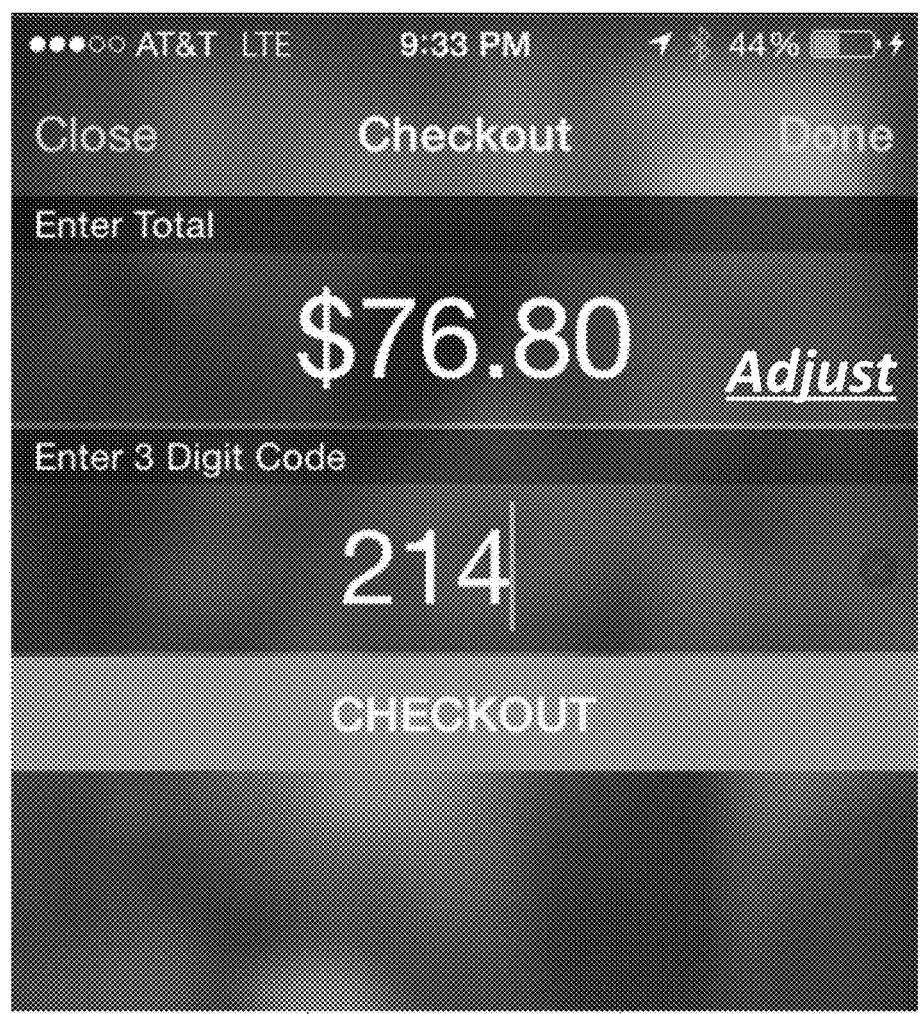
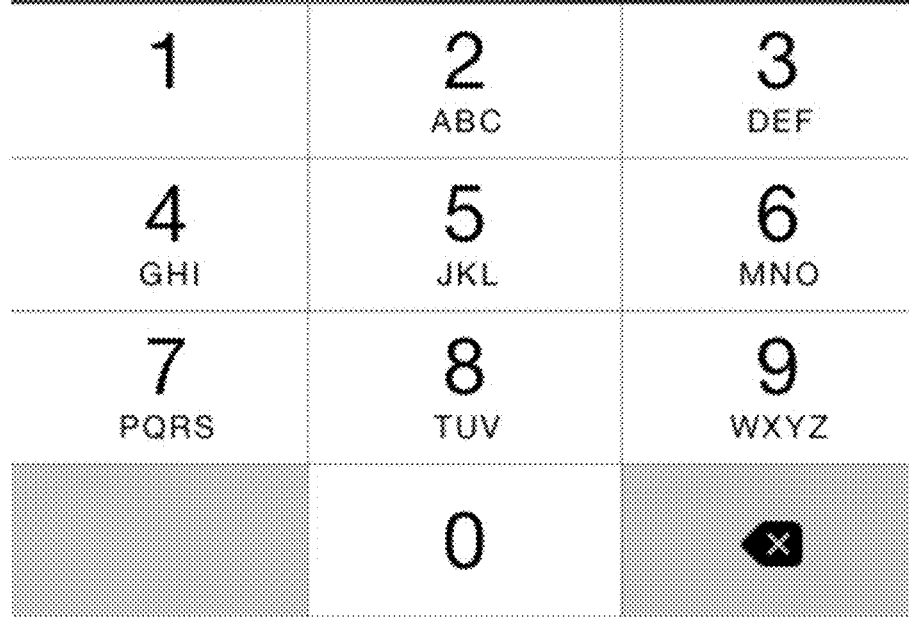
FIG. 10A

2600

┌─────────────────────────────────────────────────────────────────────┐
│ Upon receiving, from a second computing device (e.g., customer device), a transaction
request (e.g., a cardless cash-withdrawal request) having an association with a given
customer profile, wherein the request includes an ATM-system identifier, i) determine
(e.g., via a random process), at one or more first computing devices (e.g., Sionic AWS),
an available transaction token value from a set of available transaction token values
specific to the ATM-system identifier, wherein the transaction token has a token length
selected from the group consisting of 3, 4, 5, and 6 symbols and ii) transmit, at the one
or more first computing devices, the determined available transaction token value to
the second computing device, wherein the transmitted transaction token is presented at
the second computing device │
└─────────────────────────────────────────────────────────────────────┘ — 2602

↓

┌─────────────────────────────────────────────────────────────────────┐
│ Upon receiving, at the one or more first computing devices, from a third computing
device (e.g., an ATM provider system) associated with an ATM-system device, a
transaction request, wherein the transaction request comprises an inputted
transaction token value received at the ATM-system device and a second ATM-
system identifier associated with the ATM-system device, and a payment amount
value, i) determine, by the processor, at the one or more first computing devices,
whether the received inputted transaction token value matches an active transaction
token associated with the second ATM-system identifier and ii) upon a successful
determination, transmit, by the processor, an authorization message to the third
computing device (e.g., the ATM provider system), wherein the third computing
device authorizes cash dispensing at the ATM-system device │
└─────────────────────────────────────────────────────────────────────┘ — 2604

Upon receiving, from a second computing device (e.g., a customer device), a cash withdrawal request having an association with a given customer profile, wherein the request includes a ATM system identifier and a customer position identifier (e.g., GPS or MPS coordinates, e.g., latitude and longitude) corresponding to a position of the second computing device, i) determine (e.g., via a random process), at one or more first computing devices (e.g., servers, e.g., in the cloud), an available transaction token value from a set of available transaction token values specific to the ATM system identifier, wherein the available transaction token has a token length selected from the group consisting of 3, 4, 5, and 6 symbols and ii) transmit, at the one or more first computing devices, the determined available transaction token value to the second computing device, wherein the transmitted transaction token is presented at the second computing device

2804

Upon receiving, at the one or more first computing devices, from a third computing device (e.g., a ATM provider system or the ATM system), a transaction request, wherein the transaction request comprises an inputted transaction token value received at the third computing device and a second ATM system identifier associated with the ATM system, i) determine, by the processor, at the one or more first computing devices, whether the received inputted transaction token value matches an active transaction token associated with the second ATM system identifier, ii) determine, by the processor, at the one or more first computing devices, whether the customer position identifier is within a pre-defined area or proximity to a ATM system location identifier associated with the second ATM system identifier, and iii), upon both successful determinations, transmit, by the processor, an authorization message to the ATM system or to the ATM provider system to dispense cash at the ATM system based on an amount provided by the customer

FIG. 28

3) Request random 3-digit verification code for ATM transaction at selected location 2) Confirm funding method. Note: Rewards can be applied to cover all of, or a portion of the withdrawal 1) Search the marketplace for a nearby ATM location

US 11,756,032 B2

METHODS AND SYSTEMS FOR SECURE PAYMENT PROCESSING

RELATED APPLICATIONS

This application claims priority to, and the benefit of, U.S. Provisional Patent Appl. No. 62/317,357, filed Apr. 1, 2016, title "Methods and Systems for Secure Payment Processing," and U.S. Provisional Patent Appl. No. 62/420,365, filed Nov. 10, 2016, title "Methods and Systems for Secure Transaction Proceeding," each of which is incorporated by reference herein in its entirety.

BACKGROUND

Mobile payment processing (i.e., payment via a mobile device) has a potential to fundamentally transform the way that consumers pay for services and products from merchants.

One class of mobile payment processing system stores, at the mobile device, encrypted credit cards, debit cards, bank account data and information. The credit cards, debit cards, bank account are then transmitted, over a wireless network, from the customer mobile device to a POS system at a merchant location.

One class of cardless Automated Teller Machines (ATM) stores, at a mobile device, encrypted debit card or bank account data. The debit cards or bank account data are then transmitted, over a wireless network (e.g., a near-field communication channel), from the customer mobile device to a cardless ATM system.

What are needed are devices, systems and methods that overcome challenges in the present art, some of which are described above.

SUMMARY

Exemplified systems and methods facilitate secured mobile payment transactions using credit cards, debit cards, bank account without having to transmit credit card, debit card, or bank account numbers over a wireless network.

Rather, the exemplified systems and methods facilitate a highly secure and intuitive payment transaction and/or ATM cash withdrawal or transaction via two independent processes tied to a cloud or enterprise network—one performed between a customer computing device and a cloud network or enterprise network and another performed between a merchant computing device (including an ATM system) and the cloud or enterprise network. To this end, the only connection between any given customer computing device and any given merchant in a given transaction is over secured communications to the cloud or enterprise network.

Because there is no direct communication between the customer computing device and the merchant computing device (and/or an ATM system) during a given payment transaction or a given ATM cash withdrawal or transaction, the risk of interception or interference to such direct communication between the customer computing device and the merchant computing device is eliminated.

To link the customer computing device and the merchant computing device (e.g. an ATM system) in the cloud or enterprise network, a unique validation token is used. The validation token is unique to a given merchant store (or ATM system), which in conjunction with an identifier associated with the store (i.e., a store identifier) (or ATM system identifier) enhances the security of the unique validation token such that a short code between 3 and 6 tokens in length is beneficially realized. The merchant store (or ATM system) has a merchant identifier (or ATM identifier) that is unique, within the service provider system, for all merchants and merchant stores (and for all ATM systems). The exemplified systems and methods improve the technology of computing and security in providing a highly secure security scheme that is quick to use by consumers (i.e., convenient) and quick to complete (i.e., reducing complexity and processing time to complete a given transaction).

In some embodiments, the unique validation token is further geo-locked (that is proximity and location information is used) to provide additional validation via customer computing device's location with respect to an expected location, via the merchant computing device's location with respect to an expected location, and via the location of the customer's computing device in relation to the location of the merchant computing device (or to the ATM system). In some embodiments, the unique validation token is time bound.

In some embodiments, the exemplified systems and methods is configured to enhance security by mitigating frequency of fraud.

According to an aspect, a method is disclosed for conducting a secure processing transaction (e.g., a secure payment transaction, a secure cash-withdrawal transaction, or a secure cardless ATM transaction) for a user having an authenticatable ID via a mobile computing device associated with the user. The method includes, presenting, via a processor, at a display of a first computing device (e.g., user device), on a first pane of a graphical interface, a plurality of first graphical elements comprising a list of one or more secure processing entities (e.g., one or more merchant stores and/or one or more ATM systems); upon selection, in the first pane (e.g., Merchant list and/or ATM system list), of a first graphical element associated with a given secure processing entity from a plurality of the presented first graphical elements, determining a secure processing entity identifier (e.g., a merchant identifier or an ATM system identifier) and secure processing data (e.g., merchant data or ATM system data) associated with the given secure processing entity (e.g., merchant or ATM system) (e.g., via a API call to Facebook or Google Map); presenting, via the processor, at the display of the first computing device, on a second pane (e.g., Merchant information screen or ATM system information screen) of the graphical interface, the determined secure processing entity data (e.g., merchant data or ATM system data) and a first widget (e.g., a checkout button, a cash button, a pay button, and etc.) associated with a secure transaction (e.g., a payment transaction, a cash withdrawal transaction, and etc.). The method further includes, upon selection of the first widget (e.g., the checkout button, the cash button, the pay button, and etc.): receiving, by the processor, transaction token (e.g., payment token or ATM-transaction token) having a token length selected from the group consisting of 3, 4, 5, and 6 symbols (e.g., number or alphanumerical symbols), wherein the transaction token (e.g., payment token or ATM-transaction token) comprises a unique symbol among a set of symbols, each set being specific to each secure processing entity identifier (e.g. merchant identifier or ATM system identifier), and wherein each secure processing entity identifier (e.g., merchant identifier or ATM system identifier) is unique (e.g., unique among all merchants, merchant stores, and ATM systems) maintained by a provider (e.g., payment provider or transaction processing provider); and presenting, by the processor, at the display of the first computing device, on a third pane (e.g., a token screen), a third graphical element of the transaction token, wherein the transaction token (e.g., payment token or ATM-transaction token) is subsequently inputted into a fourth pane (e.g., Merchant payment screen or ATM system screen), at a display of a third computing device (e.g., a merchant device or the ATM system) to be transmitted, to one or more second computing devices, (e.g., payment servers, cash-withdrawal processing servers, or cardless ATM transaction processing servers) with a secure processing entity identifier (e.g., a merchant identifier or an ATM system identifier) associated with the third computing device, wherein the one or more second computing devices is configured to determine whether the inputted transaction token matches an active transaction token associated with the secure processing entity identifier (e.g., merchant identifier or ATM system identifier) and to complete a transaction (e.g., a payment transaction, a cash-withdrawal transaction, or a cardless ATM transaction) if there is a match.

In another aspect, a method is disclosed for conducting a secure payment transaction (e.g., a payment that includes in part, or whole, reward points (e.g., universal reward points) in the payment) for a user having an authenticatable ID via a mobile computing device associated with the user. The method includes, presenting, via a processor, at a display of a first computing device (e.g., user device), on a first pane of a graphical interface, a plurality of first graphical elements comprising a list of one or more merchants; upon selection, in the first pane (e.g., Merchant list), of a first graphical element associated with a given merchant from a plurality of the presented first graphical elements, determining a merchant identifier and merchant data associated with the given merchant (e.g., via a API call to Facebook or Google Map); presenting, via the processor, at the display of the first computing device, on a second pane (e.g., a Merchant information screen) of the graphical interface, the determined merchant data and a first widget (e.g., a checkout button) associated with a payment transaction; and upon selection of the first widget (e.g., the checkout button), presenting, via the processor, at the display of the first computing device, on a third pane (e.g., a rewards screen) of the graphical interface, i) a second graphical element associated with a reward point value (e.g., universal reward point value) associated with the authenticatable ID of the user, ii) a second widget (e.g., input text or slider) to receive a universal reward point input (e.g., universal reward point input) to be applied to a given payment transaction, and iii) a third widget (e.g., pay button) associated with the given payment transaction. The method further includes, upon selection of the third widget (e.g., the pay button), receiving, by the processor, payment token data having a token length selected from the group consisting of 3, 4, 5, and 6 symbols (e.g., number or alphanumerical symbols), wherein the payment token data comprises a unique symbol among a set of symbols, each set being specific to each merchant identifier, and wherein each merchant identifier is unique among all merchants and merchant stores maintained by a payment provider; and presenting, by the processor, at the display of the first computing device, on a fourth pane (e.g., a token screen), a third graphical element of the payment token data, wherein the payment token is subsequently inputted into a fifth pane (e.g., a Merchant payment screen), at a display of a third computing device (e.g., a merchant device), to be transmitted, to one or more second computing devices (e.g., the payment servers), with a merchant identifier associated with the third computing device, wherein the one or more second computing devices is configured to determine whether the inputted payment token matches an active payment token associated with the merchant identifier and to complete a payment transaction if there is a match, and wherein the reward point input (e.g., universal reward point input) is transmitted to the one or more second computing devices and the payment transaction is adjusted by a determined monetary value derived from the reward point input (e.g., universal reward point input).

In another aspect, a method is disclosed for conducting a secure card-less ATM transaction (e.g., a cash withdrawal that includes in part, or whole, reward points (e.g., universal reward points) in the withdrawal) for a user having an authenticatable ID via a mobile computing device associated with the user. The method includes, presenting, via a processor, at a display of a first computing device (e.g., user device), on a first pane of a graphical interface, a plurality of first graphical elements comprising a list of one or more ATM systems; upon selection, in the first pane (e.g., ATM system list), of a first graphical element associated with a given ATM system from a plurality of the presented first graphical elements, determining an ATM system identifier and ATM system data associated with the given ATM system (e.g., via a API call to Facebook or Google Map or bank/ATM server); presenting, via the processor, at the display of the first computing device, on a second pane (e.g., ATM system information screen) of the graphical interface, the determined ATM system data and a first widget (e.g., a pay button, a cash button, etc.) associated with a cash withdrawal transaction; and upon selection of the first widget (e.g., the pay button, the cash button, etc.), presenting, via the processor, at the display of the first computing device, on a third pane (e.g., rewards screen) of the graphical interface, i) a second graphical element associated with a reward point value (e.g., universal reward point value) associated with the authenticatable ID of the user, ii) a second widget (e.g., input text or slider) to receive a universal reward point input (e.g., universal reward point input) to be applied to a given cash-withdrawal transaction, and iii) a third widget (e.g., a pay button, a cash button, etc.) associated with the given cash-withdrawal transaction. The method further includes, upon selection of the third widget (e.g., the pay button, cash button, etc.), receiving, by the processor, token data having a token length selected from the group consisting of 3, 4, 5, and 6 symbols (e.g., number or alphanumerical symbols), wherein the payment token data comprises a unique symbol among a set of symbols, each set being specific to each ATM system identifier, and wherein each ATM system identifier is unique among all ATM systems maintained by a provider; and presenting, by the processor, at the display of the first computing device, on a fourth pane (e.g., a token screen), a third graphical element of the transaction token data, wherein the transaction token is subsequently inputted into a fifth pane (e.g., ATM cash-withdrawal screen or cardless ATM transaction screen), at a display of a third computing device (e.g., a ATM system), to be transmitted, to one or more second computing devices (e.g., cash-withdrawal processing servers, or cardless ATM transaction processing servers), with a ATM system identifier associated with the third computing device, wherein the one or more second computing devices is configured to determine whether the inputted transaction token matches an active transaction token associated with the ATM system identifier and to complete a cash withdrawal transaction if there is a match, and wherein the reward point input (e.g., universal reward point input) is transmitted to the one or more second computing devices and the cash-withdrawal transaction is adjusted by a determined monetary value derived from the reward point input (e.g., universal reward point input).

In another aspect, a method is disclosed for conducting a secure payment transaction (e.g., a payment that includes in part, or whole, reward points, e.g., universal reward points, in the payment and that allows the user to make adjustments to the cost) for a user having an authenticatable ID via a mobile computing device associated with the user. The method includes presenting, via a processor, at a display of a first computing device (e.g., user device), on a first pane of a graphical interface, a plurality of first graphical elements comprising a list of one or more merchants; upon selection, in the first pane (e.g., Merchant list), of a first graphical element associated with a given merchant from a plurality of the presented first graphical elements, determining merchant identifier and merchant data associated with the given merchant (e.g., via a API call to Facebook or Google Map); presenting, via the processor, at the display of the first computing device, on a second pane (e.g., Merchant information screen) of the graphical interface, the determined merchant data and a first widget (e.g., a checkout button) associated with a payment transaction; upon selection of the first widget (e.g., the checkout button), presenting, via the processor, at the display of the first computing device, on a third pane (e.g., rewards screen) of the graphical interface, i) a second graphical element associated with a reward point value (e.g., universal reward point value) associated with the authenticatable ID of the user, ii) a second widget (e.g., input text or slider) to receive a reward point input (e.g., universal reward point input) to be applied to a given payment transaction, and iii) a third widget (e.g., pay button) associated with the payment transaction; and upon selection of the first widget (e.g., the checkout button), presenting, via the processor, at the display of the first computing device, on a fourth pane (e.g., adjustment screen, e.g., to include tip) of the graphical interface, i) one or more fourth widgets (e.g., input text or slider), each associated with an adjustment parameter (e.g., tip, coupon codes, etc.) to be applied to a given payment transaction, and ii) a fifth widget (e.g., pay button) associated with the payment transaction. The method further includes, upon selection of the fifth widget (e.g., the pay button), receiving, by the processor, payment token data having a token length selected from the group consisting of 3, 4, 5, and 6 symbols (e.g., number or alphanumerical symbols), wherein the payment token data comprises a unique symbol among a set of symbols, each set being specific to each merchant identifier, and wherein each merchant identifier is unique among all merchants and merchant stores maintained by a payment provider; presenting, by the processor, at the display of the first computing device, on a fifth pane (e.g., a token screen), a third graphical element of the payment token data, wherein the payment token is subsequently inputted into a sixth pane (e.g., Merchant payment screen), at a display of a third computing device (e.g., a merchant device) to be transmitted, to one or more second computing devices, (e.g., the payment servers) with a merchant identifier associated with the third computing device, wherein the one or more second computing devices is configured to determine whether the inputted payment token matches an active payment token associated with the merchant identifier and to complete a payment transaction if there is a match, and wherein the reward point input (e.g., universal reward point input) and the one or more adjustment parameters are transmitted to the one or more second computing devices and the payment transaction is adjusted by a determined monetary value derived from the reward point input (e.g., universal reward point input) and by the one or more adjustment parameters.

In any of the above embodiments, the transaction token (e.g. payment token or ATM-transaction token) has an associated expiration time.

In any of the above embodiments, each token value of the transaction token (e.g., payment token or ATM-transaction token) comprises a number or an alphanumerical symbol.

In any of the above embodiments, the method further includes, presenting, via the processor, at the display of the first computing device, on a fifth pane (e.g., a token pane) of the graphical interface, a prompt for authenticating a user PIN to receive the transaction token (e.g., payment token or ATM-transaction token).

In any of the above embodiments, the merchant data for each given merchant includes: a merchant name; a merchant address; a telephone number or email address. In some embodiments, the merchant data for each given merchant includes a business hour information.

In any of the above embodiments, the ATM-system data for each given ATM system includes an ATM location description (e.g., proximity and identifier to nearby stores or landmarks). In some embodiments, the ATM-system data includes an ATM name or identifier that is presented on the ATM system. In some embodiments, the ATM-system data includes a telephone number to a bank or provider associated with the ATM. In some embodiments, the ATM-system data includes operation hour information for the ATM system.

In any of the above embodiments, wherein the secure processing transaction comprises a payment transaction, the one or more second computing devices being configured to determine the reward point value (e.g., universal reward point value) based on the payment transaction and to update reward point account (e.g., universal reward point account) associated with the user using the determined reward point value (e.g., determined universal reward point value).

In any of the above embodiments, the list of one or more secure processing entity (e.g., merchants, ATM systems) is arranged, by proximity, to a location of the first computing device (e.g., by increasing distance value between a secure processing entity location identifiers (e.g., a merchant location identifier or ATM system location identifier) associated with the third computing device and a location identifier associated with the first computing device (e.g., user device).

In any of the above embodiments, the list of one or more secure processing entities (e.g., merchants or ATM systems) is arranged based on the alphanumerical ordering of a name associated with each secure processing entity (e.g., merchant or ATM system) in the list of one or more secure processing entities (e.g., merchants or ATM systems).

In any of the above embodiments, the method further includes transmitting, by the first computing device (e.g., the user device), the determined secure processing entity identifier (e.g., merchant identifier or ATM-system identifier) to the one or more second computing devices (e.g., the servers), wherein the transmitted secure processing entity identifier (e.g., merchant identifier or ATM-system identifier) is used to determine the transaction token (e.g., payment token, ATM-transaction token, etc.), wherein the transaction token includes the unique symbol among the set of symbols specific to the transmitted secure processing entity identifier (e.g., merchant identifier or ATM-system identifier).

In some embodiments, the method includes, transmitting, by the first computing device (e.g., the user device), a location identifier associated with the first computing device (e.g., GPS or MPS latitude and longitudinal data) to the one or more second computing devices (e.g., the servers), wherein the one or more second computing devices is configured to determine whether the location identifier associated with the first computing device is within a pre-defined area with or distance to a merchant location identifier associated with the third computing device. In some embodiments, the secure processing entity location identifier (e.g., merchant location identifier or ATM-system location identifier is determined based on the secure processing entity identifier (e.g., merchant identifier or ATM-system identifier). In some embodiments, the secure processing entity location identifier (e.g., GPS or MPS latitude and longitudinal data) is transmitted, by the third computing device, and received, at the one or more second computing devices.

In another aspect, a method is disclosed for conducting a secure payment transaction for a merchant via a computing device associated with the merchant. The method includes: presenting, via a processor, at a display of a first computing device (e.g., merchant device), on a first pane of a graphical interface, i) a first widget configured to receive payment token data having a token length selected from the group consisting of 3, 4, 5, and 6 symbols (e.g., number or alphanumerical symbols) and ii) a second widget (e.g., a submit button) to submit a request for a payment transaction to one or more second computing devices (e.g., payment servers, e.g., in the cloud); upon input of the payment token at the first widget and a selection of the second widget, transmitting, by the processor, to the one or more second computing devices, the request for the payment transaction, wherein the request comprises the inputted payment token, a merchant identifier associated with the first computing device, and an inputted payment amount value, wherein the payment token data comprises a unique symbol among a set of symbols, wherein each set is specific to each merchant identifier, and wherein each merchant identifier is unique among all merchants and merchant stores maintained by a payment provider, and wherein the one or more second computing devices is configured to determine whether the inputted payment token matches an active payment token associated with the merchant identifier and to complete a payment transaction if there is a match.

In some embodiments, the method includes presenting, via the processor, at the display of the first computing device, one or more third widgets (e.g., input text or slider), each associated with an adjustment parameter to be applied to a given payment transaction; and transmitting, by the first computing device, the one or more adjustment parameters to the one or more second computing devices, wherein the payment transaction is adjusted, by the one or more second computing devices, by the one or more adjustment parameters.

In some embodiments, each token value of the payment token data comprises a number or an alphanumerical symbol.

In some embodiments, the method includes presenting, via a processor, at the display of the first computing device (e.g., merchant device), on a second pane of the graphical interface, i) a fourth widget configured to receive a selection of a store identifier among a plurality of store identifiers associated with the merchant.

In some embodiments, the payment token data has a token length selected from the group consisting of 3, 4, 5, and 6 symbols (e.g., number or alphanumerical symbols) and ii) a second widget (e.g., a submit button) to submit a request for a payment transaction to one or more second computing devices (e.g., payment servers, e.g., in the cloud);

In some embodiments, the method includes transmitting, by the first computing device (e.g., the user device), to the one or more second computing devices (e.g., the servers), the merchant identifier associated with the first computing device, wherein the one or more second computing devices determine whether payment token data exists for the transmitted merchant identifier.

In another aspect, a method (e.g., of operating servers) is disclosed for conducting a secure payment transaction between a mobile computing device associated with a customer and a computing device associated with a merchant. The method includes: maintaining, at one or more first computing devices (e.g., Sionic AWS), a plurality of sets of one or more credit card data, debit card data, and/or bank account data, each associatively linked to a customer profile; upon receiving, from a second computing device (e.g., customer device), a payment request having an association with a given customer profile, wherein the request includes a merchant identifier: determining, (e.g., via a random process), at the one or more first computing devices, an available payment token value from a set of available payment token values specific to the merchant identifier, wherein the payment token has a token length selected from the group consisting of 3, 4, 5, and 6 symbols; and transmitting, at the one or more first computing devices, the determined available payment token value to the second computing device, wherein the transmitted payment token is presented at the second computing device. The method further includes upon receiving, at the one or more first computing devices, from a third computing device (e.g., the merchant device), a transaction request, wherein the transaction request comprises an inputted payment token value received at the third computing device, a second merchant identifier associated with the third computing device, and a payment amount value: determining, by the processor, at the one or more first computing devices, whether the received inputted payment token value matches an active payment token associated with the second merchant identifier; and upon a successful determination, transmitting, by the processor, the one or more credit card data, debit card data, and/or bank account data and the payment amount value to a payment-network processor, wherein the transmitted one or more credit card data, debit card data, and/or bank account data is associated with the given customer profile associated with the payment request.

In some embodiments, the credit card data, debit card data, and/or bank account data is transmitted as a token or hash value to the payment-network processor.

In another aspect, a method (e.g., of operating servers) is disclosed for conducting a secure payment transaction between a mobile computing device associated with a customer and a computing device associated with a merchant. The method includes maintaining, at one or more first computing devices (e.g., servers, e.g., in the cloud), a plurality of sets of one or more credit card data, debit card data, and/or bank account data, each associatively linked to a customer profile; upon receiving, from a second computing device (e.g., customer device), a payment request having an association with a given customer profile, wherein the request includes a merchant identifier and a customer position identifier (e.g., GPS or MPS coordinates, e.g., latitude and longitude) corresponding to a position of the second computing device; determining, (e.g., via a random process), at the one or more first computing devices, an available payment token value from a set of available payment token values specific to the merchant identifier, wherein the payment token has a token length selected from the group consisting of 3, 4, 5, and 6 symbols; and transmitting, at the one or more first computing devices, the determined available payment token value to the second computing device, wherein the transmitted payment token is presented at the second computing device. The method further includes, upon receiving, at the one or more first computing devices, from a third computing device (e.g., the merchant device), a transaction request, wherein the transaction request comprises an inputted payment token value received at the third computing device, a second merchant identifier associated with the third computing device, and a payment amount value: determining, by the processor, at the one or more first computing devices, whether the received inputted payment token value matches an active payment token associated with the second merchant identifier; and determining, by the processor, at the one or more first computing devices, whether the customer position identifier is within a pre-defined area or proximity to a merchant location identifier associated with the second merchant identifier; and upon both successful determinations, transmitting, by the processor, the one or more credit card data, debit card data, and/or bank account data and the payment amount value to a payment-network processor, wherein the transmitted one or more credit card data, debit card data, and/or bank account data is associated with the given customer profile associated with the payment request.

In some embodiments, the method includes transmitting, at the one or more first computing devices (e.g., Merchant device), a fourth notification (e.g., a payment decline message) to the third computing device upon an unsuccessful determination of the customer position identifier being within the pre-defined area or proximity to the merchant location identifier.

In some embodiments, the merchant location identifier is received from the third computing device.

In some embodiments, the step of determining whether the customer position identifier is within a pre-defined area or proximity to a merchant location identifier associated with the second merchant identifier is bypassed (e.g., considered valid or automatically assigned a successful value) when the second computing device is associated with a trusted user account (e.g., having a valid/verified email, valid/verified credit card, and and/or a selfie image associated therewith).

In another aspect, a method (e.g., of operating servers) is disclosed for conducting a secure payment transaction (e.g., a payment that includes in part, or whole, reward points (e.g., universal reward points) in the payment) between a mobile computing device associated with a customer and a computing device associated with a merchant. The method includes comprising: maintaining, at one or more first computing devices (e.g., servers, e.g., in the cloud), a plurality of sets of one or more credit card data, debit card data, and/or bank account data, each associatively linked to a customer profile; and upon receiving, from a second computing device (e.g., customer device), a payment request having an association with a given customer profile, wherein the request includes a merchant identifier and a reward point input (e.g., universal reward point input) to be applied to a given payment transaction: determining, (e.g., via a random process), at the one or more first computing devices, an available payment token value from a set of available payment token values specific to the merchant identifier, wherein the payment token has a token length selected from the group consisting of 3, 4, 5, and 6 symbols; and transmitting, at the one or more first computing devices, the determined available payment token value to the second computing device, wherein the transmitted payment token is presented at the second computing device. The method further includes, upon receiving, at the one or more first computing devices, from a third computing device (e.g., the merchant device), a transaction request, wherein the transaction request comprises an inputted payment token value received at the third computing device, a second merchant identifier associated with the third computing device, and a payment amount value: determining, by the processor, at the one or more first computing devices, whether the received inputted payment token value matches an active payment token associated with the second merchant identifier; and upon a successful determination, transmitting, by the processor, the one or more credit card data, debit card data, and/or bank account data and an adjustment payment amount value to a payment-network processor, wherein the transmitted one or more credit card data, debit card data, and/or bank account data is associated with the given customer profile associated with the payment request, and wherein the adjustment payment amount value is determined by modifying (e.g., subtracting) the payment amount value with a determined monetary value derived from the reward point input (e.g., universal reward point input).

In some embodiments, the method includes, transmitting, at the one or more first computing devices (e.g., servers), a first notification (e.g., a payment decline message) to the third computing device upon an unsuccessful determination of the matching of the received inputted payment token value and at least one active payment token associated with the second merchant identifier.

In some embodiments, the method includes, transmitting, at the one or more first computing devices (e.g., servers), a second notification (e.g., a payment decline message) to the first computing device upon an unsuccessful determination of the matching of the received inputted payment token value and at least one active payment token associated with the second merchant identifier.

In some embodiments, each active payment token has an expiration time and/or date from a time selected from the group consisting of: a determination of the active payment token being available; and an association (e.g., assignment or linking) of a payment token to a given payment request.

In some embodiments, the method includes transmitting, at the one or more first computing devices (e.g., servers), a third notification (e.g., an expired token message) to the third computing device upon an unsuccessful determination of the matching of the received inputted payment token value and at least one active payment token associated with the second merchant identifier, wherein the inputted payment token value had expired within less than a pre-defined period of time from the receipt of the transaction request.

In some embodiments, the method includes determining, by the one or more first computing devices, a reward point value (e.g., universal reward point value) based on the payment amount value transmitted to the payment-network processor; and modifying, by the one or more first computing devices, with the determined reward point value (e.g., determined universal reward point value), a balance value of a reward account profile (e.g., crediting or adding) associated with the user.

In some embodiments, the method includes, determining, by the one or more first computing devices, a second reward point value (e.g., second universal reward point value) based on the payment amount value transmitted to the payment-network processor; and modifying, by the one or more first computing devices, with the determined second reward point value (e.g., determined second universal reward point value), a second balance value of a second reward account profile (e.g., crediting or adding) associated with a third-party (e.g., a non-profit organization designated by the user).

In another aspect, a method (e.g., of operating servers) is disclosed, e.g., for conducting a secure payment transaction between a mobile computing device associated with a customer and a computing device associated with a merchant. The method includes, upon receiving, from a second computing device (e.g., customer device), a transaction request (e.g., a cardless cash-withdrawal request) having an association with a given customer profile, wherein the request includes an ATM-system identifier, i) determining, (e.g., via a random process), at one or more first computing devices (e.g., Sionic AWS), an available transaction token value from a set of available transaction token values specific to the ATM-system identifier, wherein the transaction token has a token length selected from the group consisting of 3, 4, 5, and 6 symbols; and ii) transmitting, at the one or more first computing devices, the determined available transaction token value to the second computing device, wherein the transmitted transaction token is presented at the second computing device. The method further includes, upon receiving, at the one or more first computing devices, from a third computing device (e.g., an ATM provider system) associated with an ATM-system device, a transaction request, wherein the transaction request comprises an inputted transaction token value received at the ATM-system device and a second ATM-system identifier associated with the ATM-system device, i) determining, by the processor, at the one or more first computing devices, whether the received inputted transaction token value matches an active transaction token associated with the second ATM-system identifier; and ii), upon a successful determination, transmitting, by the processor, an authorization message to the third computing device (e.g., the ATM provider system), wherein the third computing device authorizes cash dispensing at the ATM-system device.

In another aspect, a method (e.g., of operating servers) is disclosed, e.g., for conducting a secure payment transaction between a mobile computing device associated with a customer and a computing device associated with a merchant. The method includes, upon receiving, from a second computing device (e.g., customer device), a transaction request (e.g., a cardless cash-withdrawal request) having an association with a given customer profile, wherein the request includes an ATM-system identifier, i) determining, (e.g., via a random process), at one or more first computing devices (e.g., Sionic AWS), an available transaction token value from a set of available transaction token values specific to the ATM-system identifier, wherein the transaction token has a token length selected from the group consisting of 3, 4, 5, and 6 symbols; and ii) transmitting, at the one or more first computing devices, the determined available transaction token value to the second computing device, wherein the transmitted transaction token is presented at the second computing device. The method further includes, upon receiving, at the one or more first computing devices, from an ATM provider system device, a transaction request, wherein the transaction request comprises an inputted transaction token value received at the ATM-system device and a second ATM-system identifier associated with the ATM-system device i) determining, by the processor, at the one or more first computing devices, whether the received inputted transaction token value matches an active transaction token associated with the second ATM-system identifier; and ii) upon a successful determination, transmitting, by the processor, an authorization message to the ATM system device to dispense cash.

In some embodiments, the method includes, in response to an unsuccessful determination (e.g., the received inputted transaction token value does not match the active transaction token associated with the second ATM-system identifier), transmitting, by the processor, an authorization message to the ATM system device or to the ATM provider system associated with the ATM system device, wherein the authorization message causes presentation, at a display of the ATM-system device, of an incorrect inputted transaction token value.

In some embodiments, the first computing devices (e.g., the Sionic AWS) maintains one or more debit card data, and/or one or more bank account data linked with a given customer profile, and wherein the authorization message includes a selected debit card data or a selected bank account data of the one or more debit card data, and/or one or more bank account data.

In some embodiments, the third computing device (e.g., the ATM provider system) maintains one or more debit card data, and/or one or more bank account data linked with a given customer profile, and wherein the authorization message causes a maintained debit card data or a maintained bank account to be processed.

In another aspect, a method (e.g., of operating servers) is disclosed, e.g., for conducting a secure payment transaction between a mobile computing device associated with a customer and a computing device associated with a merchant. The method includes, upon receiving, from a second computing device (e.g., a customer device), a cash withdrawal request having an association with a given customer profile, wherein the request includes a ATM system identifier and a customer position identifier (e.g., GPS or MPS coordinates, e.g., latitude and longitude) corresponding to a position of the second computing device, i) determining, (e.g., via a random process), at one or more first computing devices (e.g., servers, e.g., in the cloud), an available transaction token value from a set of available transaction token values specific to the ATM system identifier, wherein the available transaction token has a token length selected from the group consisting of 3, 4, 5, and 6 symbols; and ii) transmitting, at the one or more first computing devices, the determined available transaction token value to the second computing device, wherein the transmitted transaction token is presented at the second computing device. The method further includes, upon receiving, at the one or more first computing devices, from a third computing device (e.g., a ATM provider system or the ATM system), a transaction request, wherein the transaction request comprises an inputted transaction token value received at the third computing device and a second ATM system identifier associated with the ATM system, i) determining, by the processor, at the one or more first computing devices, whether the received inputted transaction token value matches an active transaction token associated with the second ATM system identifier; ii) determining, by the processor, at the one or more first computing devices, whether the customer position identifier is within a pre-defined area or proximity to a ATM system location identifier associated with the second ATM system identifier; and iii), upon both successful determinations, transmitting, by the processor, an authorization message to the ATM system or to the ATM provider system to dispense cash at the ATM system based on an amount provided by the customer.

In some embodiments the method includes transmitting, at the one or more first computing devices (e.g., Merchant device), a fourth notification (e.g., a transaction decline message) to the third computing device upon an unsuccessful determination of the customer position identifier being within the pre-defined area or proximity to the merchant location identifier.

In some embodiments, the ATM system location identifier is received from the third computing device.

In any of the above embodiments, the credit card data, debit card data, and/or bank account data is transmitted as a token or hash value to the payment-network processor.

In another aspect, computer readable mediums are claimed. Each of the mediums has instructions stored thereon, which when executed by a processor, cause the processor to perform the methods described above.

In another aspect, systems are claimed. Each system includes a memory and a processor. The memory has instructions stored thereon, which when executed by a processor, cause the processor to perform the methods described above.

BRIEF DESCRIPTION OF THE DRAWINGS

The components in the drawings are not necessarily to scale relative to each other and like reference numerals designate corresponding parts throughout the several views:

FIGS. 3A, 3B, 3C, 3D, 3E, and 3F, each depicts exemplary graphical user interface at a computing device associated with a consumer, in accordance with an illustrative embodiment. FIGS. 3A-3E illustrates a sequence of graphical user interface for the consumer computing device as, for example, but not limited to, shown in relation to FIG. 2. FIG. 3F illustrates a graphical user interface for the consumer computing device to input a secondary PIN, in accordance with another illustrative embodiment.

In FIGS. 4A-4E, a sequence of graphical user interface for the merchant computing device as, for example, but not limited to, shown in relation to FIG. 2. FIG. 4F illustrates a graphical user interface that shows past transactions (i.e., completed transactions) for a given merchant identifier. FIG. 4G illustrates a graphical user interface that shows detail information of the past transactions shown in FIG. 4F, in accordance with an illustrative embodiment. FIG. 4H illustrates a graphical user interface to facilitate verification of associated location identifier (e.g., GPS coordinates, e.g., latitudes and longitudes) associated with a given merchant identifier, in accordance with an illustrative embodiment.

FIGS. 10A, 10B, and 10C, each depicts exemplary graphical user interface at a computing device associated with a merchant for conducting a secure payment transaction, in accordance with another illustrative embodiment. In FIG. 10A, the graphical user interface presents a graphical input to made adjustments to an entered payment amount. In FIG. 10B, the graphical user interface presents a graphical input to make one or more adjustment types. In FIG. 10C, the graphical user interface presents a detailed transaction that includes one or more of such adjustments.

FIGS. 25, 26, 27, and 28, each depicts a flow diagram of an exemplary method for conducting a secure cardless ATM transaction, in accordance with an illustrative embodiments.

DETAILED DESCRIPTION

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

It is understood that throughout this specification the identifiers "first", "second", "third", "fourth", "fifth", "sixth", and such, are used solely to aid in distinguishing the various components and steps of the disclosed subject matter. The identifiers "first", "second", "third", "fourth", "fifth", "sixth", and such, are not intended to imply any particular order, sequence, amount, preference, or importance to the components or steps modified by these terms.

Architecture Overall

Figure 1:
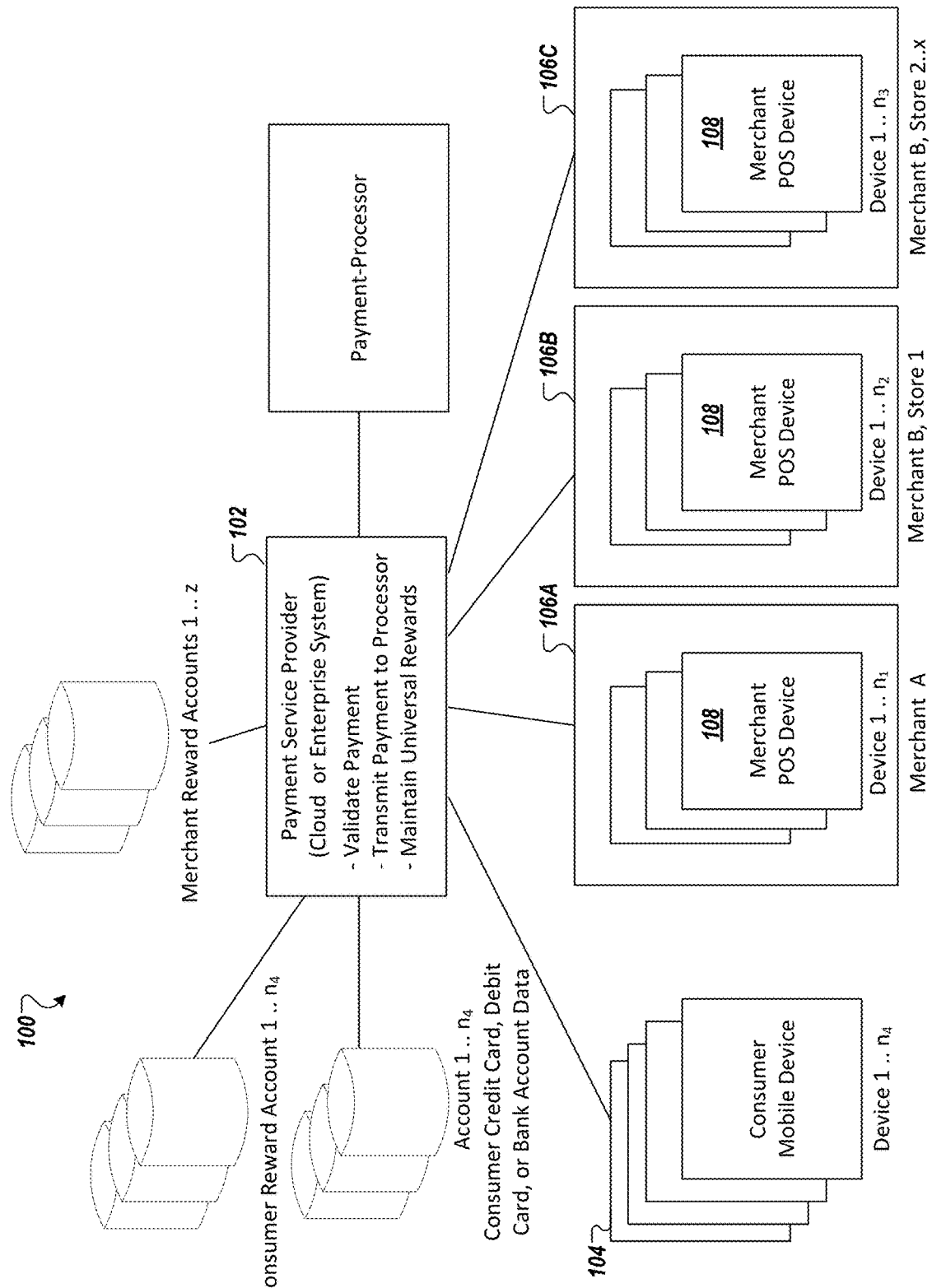
FIG. 1 depicts a diagram of an exemplary architecture for a payment service provider that provides secured mobile payment transactions between a plurality of user devices and a plurality of merchant devices, in accordance with an illustrative embodiment.

FIG. 1 depicts a diagram of an exemplary architecture 100 for a payment service provider 102 that provides secured mobile payment transactions between a plurality of user devices 104 and a plurality of merchant devices 106 (groups within merchant 106a, merchant store 106b, and merchant store 106c), in accordance with an illustrative embodiment. Each of the merchants has a unique merchant identifier (also referred to as a Merchant ID) that is unique among all the merchants and all the merchant stores maintained by the service provider.

As shown, each merchant (e.g., 106A) and merchant store (e.g., 106B, and 106C) may have one or more computing devices 108 that is used as a checkout device (e.g., a POS device). In some embodiments, the merchant computing devices 108 operates an application (e.g., an APP) that is provided by the payment service provider 102. The application, in some embodiments, presents merchant stores in a marketplace pane. The computing devices 108 may be mobile devices. In some embodiments, the computing devices 108 are desktops. In some embodiments, the computing devices 108 are embodiment in a POS system.

The technology facilitates a highly secure and trust payment transaction that does not rely on specialize hardware or capabilities.

Figure 2:
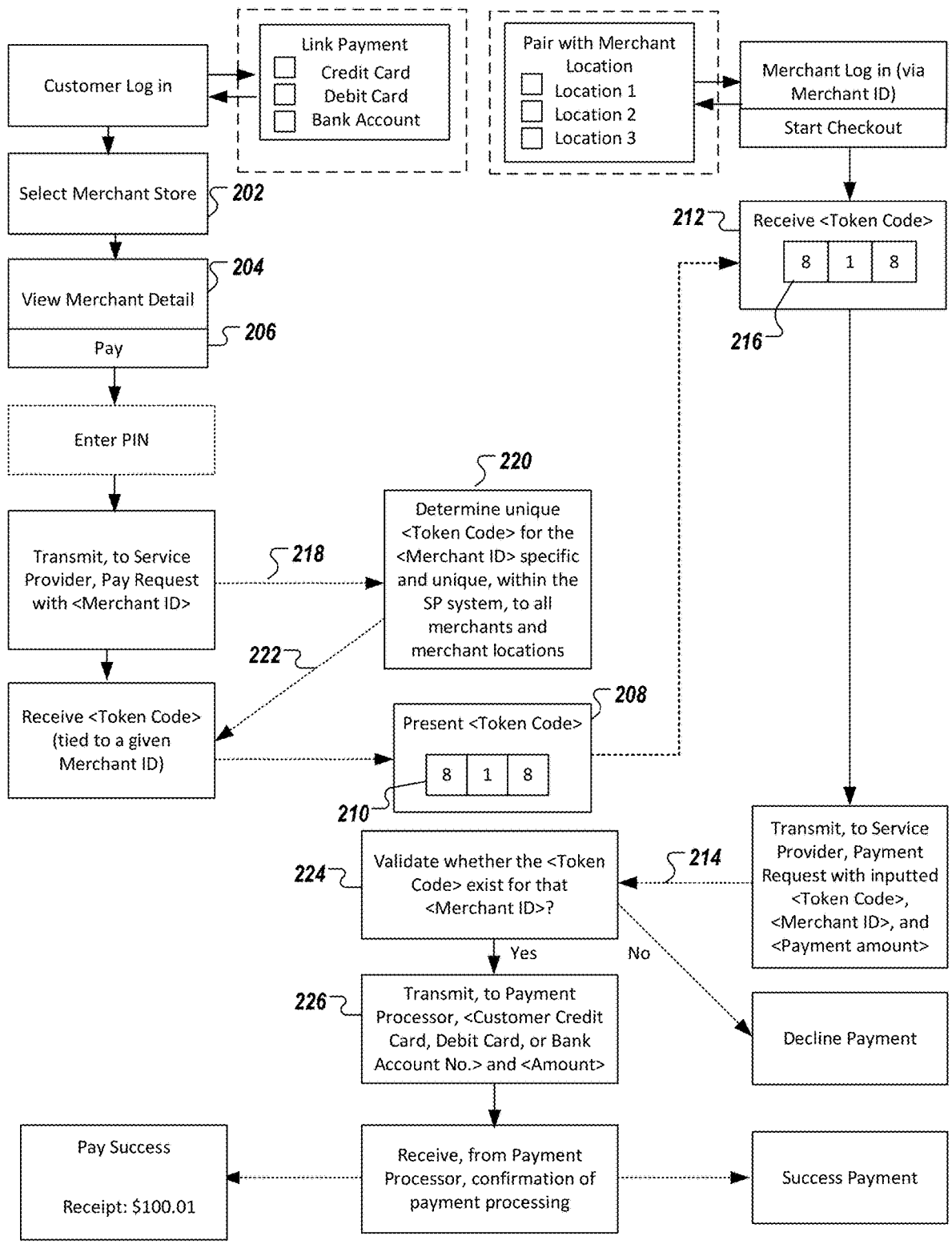
FIG. 2 depicts a flow diagram of an exemplary method for conducting a secure payment transaction, in accordance with an illustrative embodiment.
Figure 3A:
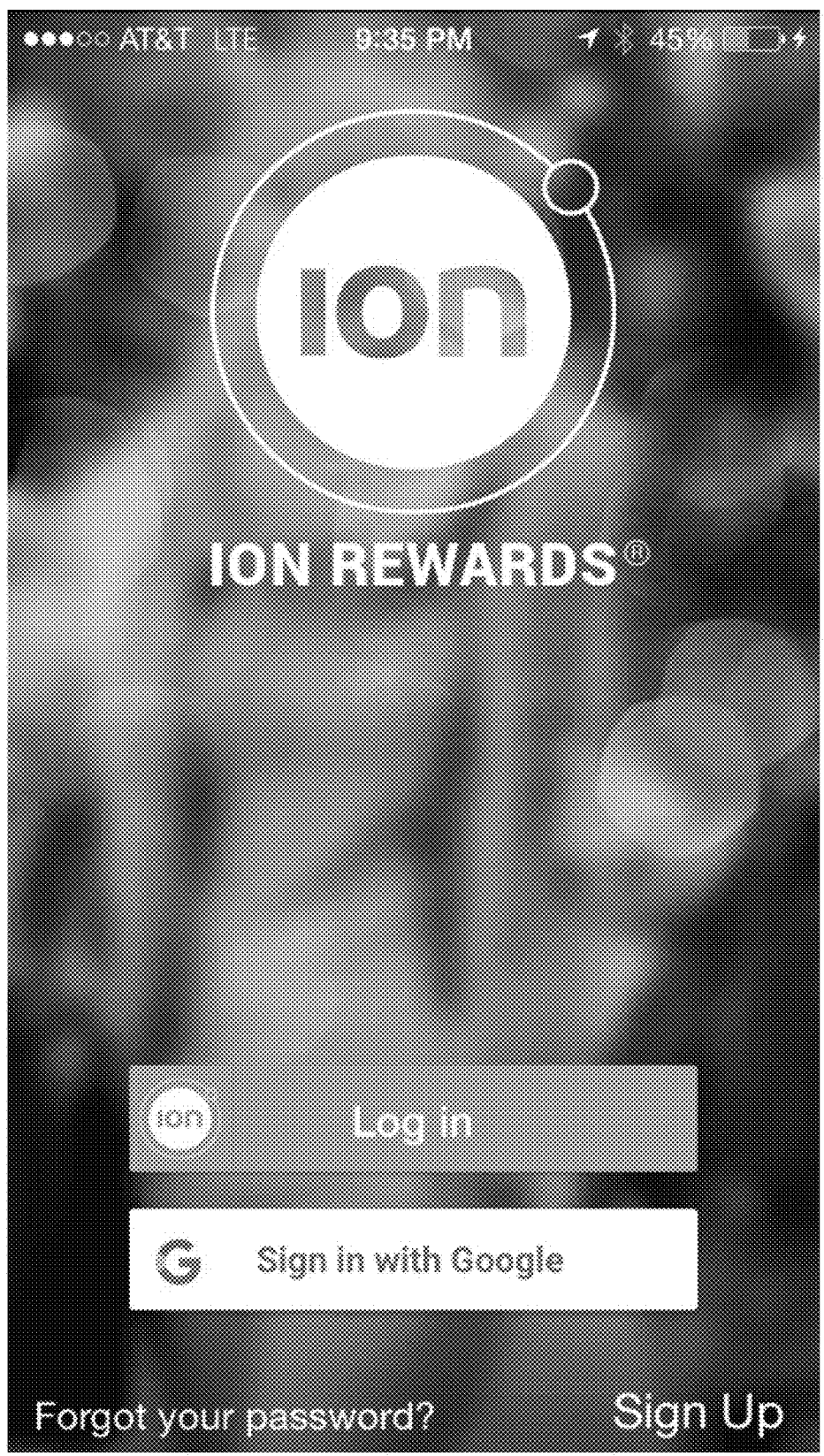
Figure 3D:
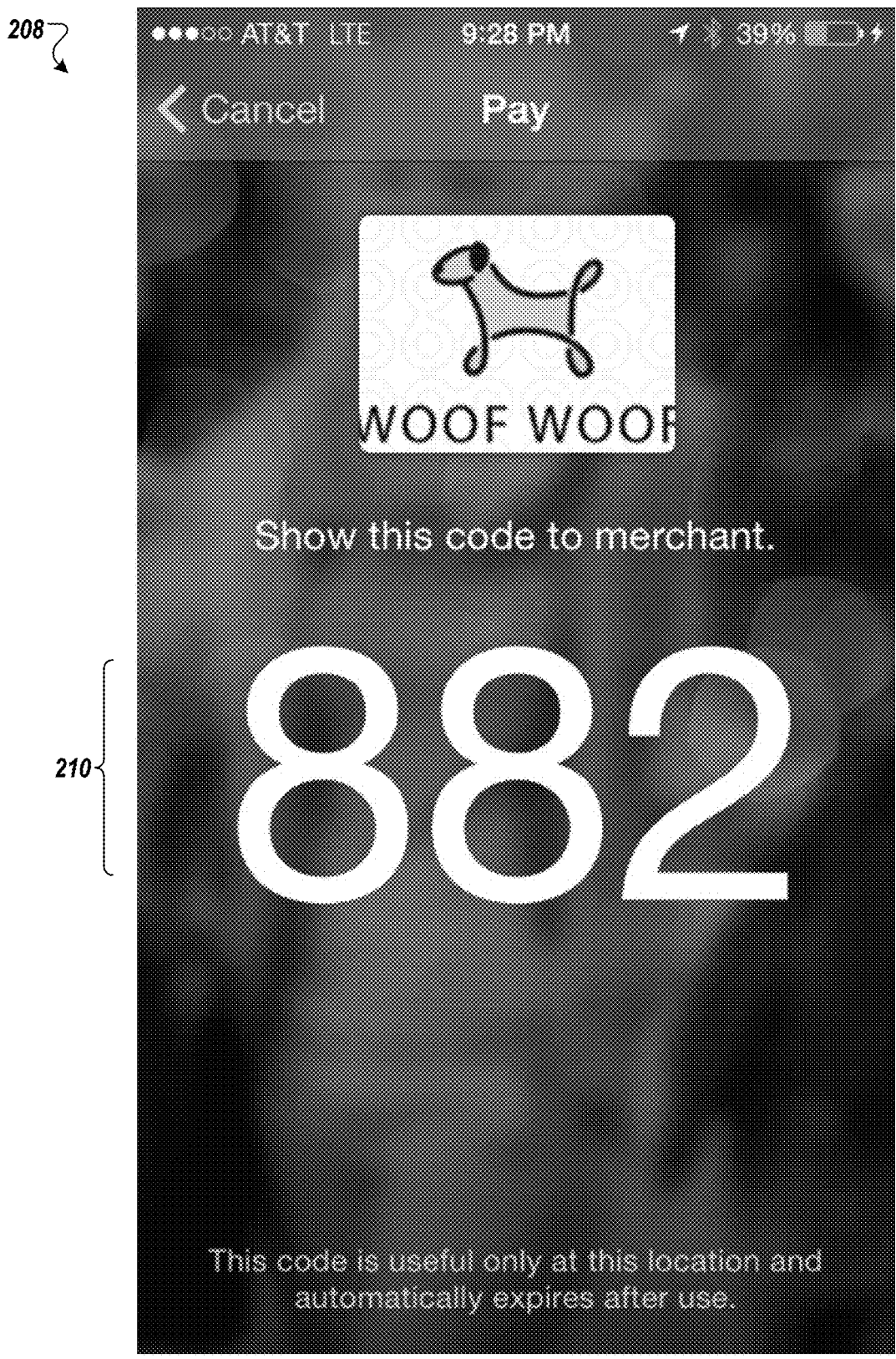
Figure 3E:
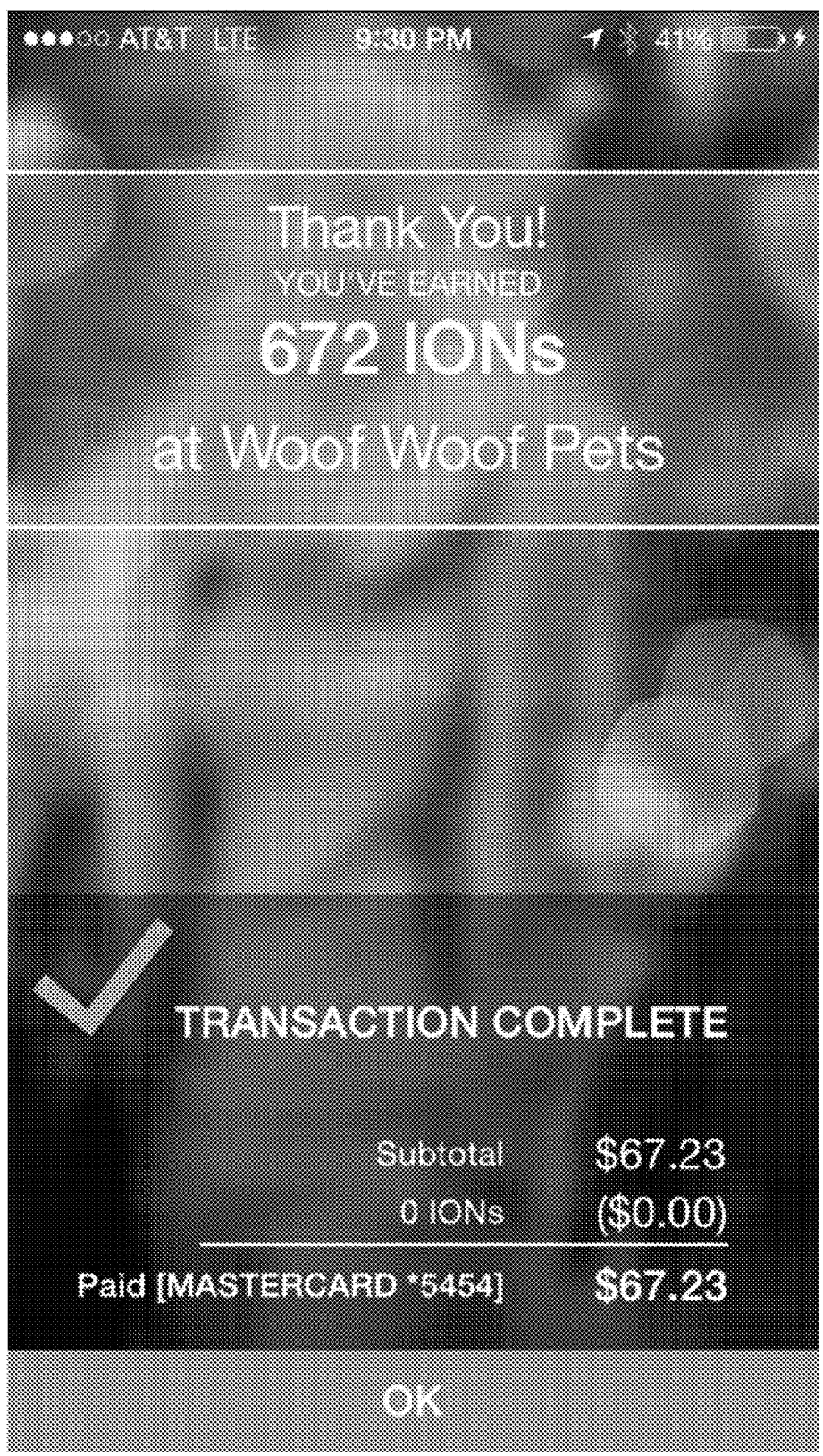
Figure 3F:
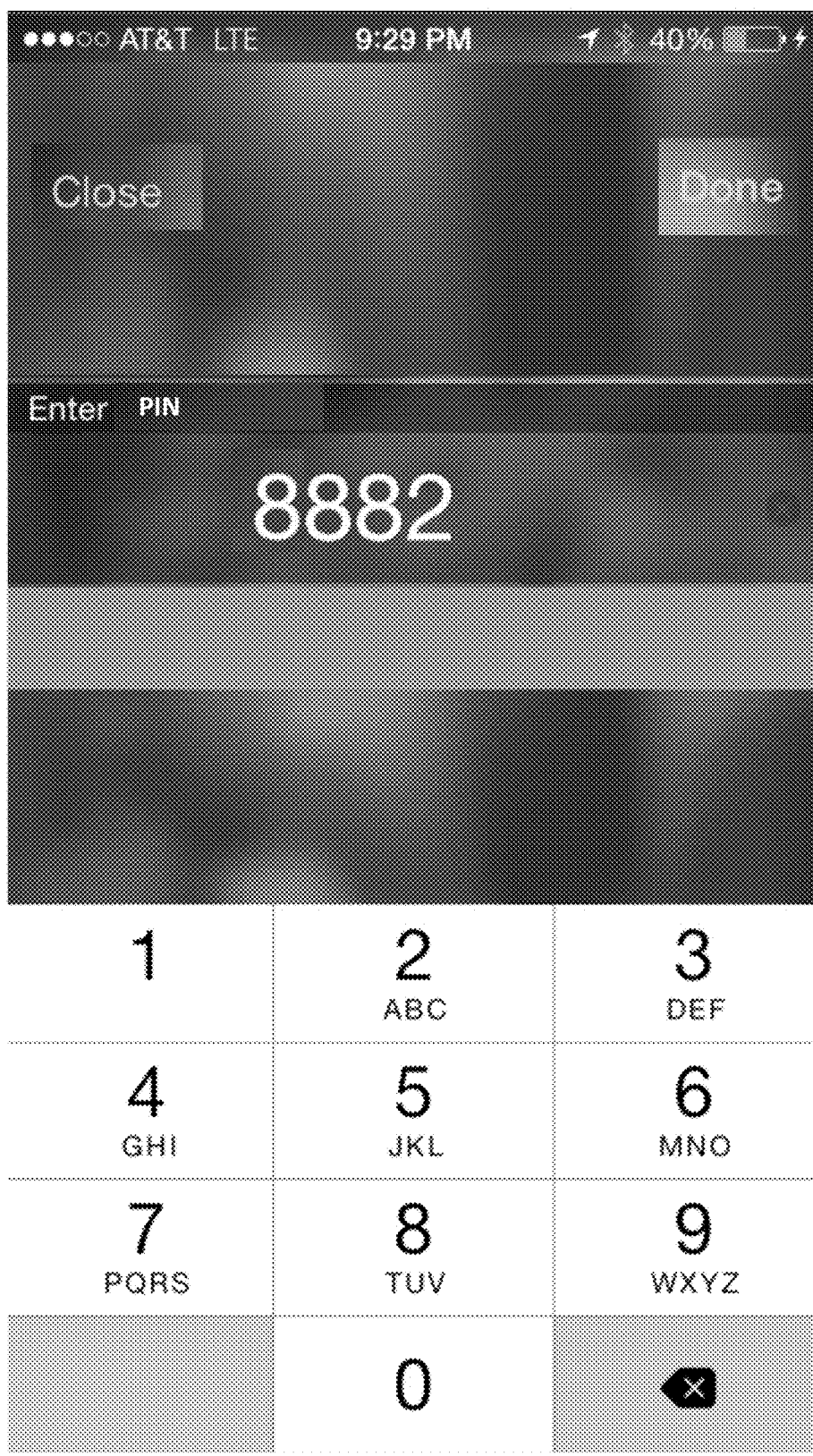

FIG. 2 depicts a flow diagram of an exemplary method for conducting a secure payment transaction, in accordance with an illustrative embodiment. In particular, FIG. 2 illustrates two independent parallel processes between the consumer computing device and the servers and between the merchant computing device and the server to validate and complete a payment transaction. FIGS. 3A, 3B, 3C, 3D, 3E, and 3F, each depicts exemplary graphical user interface at a computing device associated with a consumer, in accordance with an illustrative embodiment. FIGS. 3A-3F are now described in relation to FIG. 2. FIGS. 3A-3E illustrates a sequence of graphical user interface for the consumer computing device as, for example, but not limited to, shown in relation to FIG. 2. FIG. 3F illustrates a graphical user interface for the consumer computing device to input a secondary PIN, in accordance with another illustrative embodiment.

As shown in FIG. 2, a consumer computing device is configured to present, at a display of a first computing device (e.g., user device), on a first pane 202 (e.g., a marketplace pane) (see also FIG. 3B) of a graphical interface, a plurality of first graphical elements 302 comprising a list of one or more merchants. Upon selection, in the first pane 202 (e.g., Merchant list), of a first graphical element 304 associated with a given merchant from a plurality of the presented first graphical elements 302, the computing device determines merchant identifier and merchant data associated with the given merchant (e.g., via an API call to Facebook or Google Map). The consumer computing device then presents, at the display of the first computing device, on a second pane 204 (e.g., Merchant information screen) (see also FIG. 3C) of the graphical interface, the determined merchant data 306 and a first widget 206 (e.g., a checkout button) associated with a payment transaction.

Upon selection of the first widget 206 (e.g., the checkout button), the consumer computing device is configured to receive payment token data 210 from the service provider 102, and present at the display of the first computing device, on a third pane 208 (e.g., a token screen) (see also FIG. 3D), a third graphical element of the payment token data 210 having a token length of 3, 4, 5, or 6 symbols (e.g., number or alphanumerical symbols). The payment token data, in some embodiments, is a unique symbol among a set of symbols, in which each set is specific to each merchant identifier, where each merchant identifier is unique among all merchants and merchant stores maintained by a payment provider.

Still referring to FIG. 2, upon selection of the first widget 206, the customer computing device transmits a pay request 218 having a merchant identifier associated with the selected merchant to a payment service provider 102.

The payment service provider determines (see block 220), e.g., via a random process an available payment token value from a set of available payment token values specific to the merchant identifier, and transmits the determined available payment token value 222 to the consumer computing device.

A second independent process operating at the merchant computing device then uses the presented payment token data to complete the transaction. FIGS. 4A, 4B, 4C, 4D, 4E, 4F, 4G, and 4H, each depicts exemplary graphical user interface at a computing device associated with a merchant, in accordance with an illustrative embodiment. FIGS. 4A-4E are now described in relation to FIG. 2.

As shown in FIG. 2, a merchant computing device presents at a display, on a first pane 212 (see also FIG. 4D) of a merchant graphical interface, i) a first widget 402 configured to receive payment token data 216 having a token length of 3, 4, 5, or 6 symbols (e.g., number or alphanumerical symbols) and ii) a second widget (e.g., a submit button). Upon input of the payment token at the first widget 402 and a selection of the second widget 404, the merchant computing device transmits, to the payment service provider 102, the request 214 for the payment transaction. The request 214, in some embodiments, includes the inputted payment token 216, a merchant identifier associated with the first computing device, and an inputted payment amount value 406.

Upon the payment service provider receiving the request 214, the payment service provider determines (see block 224) whether the received inputted payment token value matches an active payment token associated with the second merchant identifier. Upon a successful determination, payment service provider transmits (see block 226) one or more credit card data, debit card data, and/or bank account data, in the form of a hash or a token, and the payment amount value, which may also in the form of a hash or a token, to a payment-network processor (e.g., a card processing platform, such as ChaseNet).

In some embodiments, upon receipt of a successful processing of the payment by the processor, a notification (see, e.g., FIG. 3E and FIG. 4E) is sent to each of the consumer computing device and to the merchant computing devices.

In another aspect, a method is disclosed for conducting a secure payment transaction (e.g., a payment that includes in part, or whole, reward points (e.g., universal reward points) in the payment) for a user having an authenticatable ID via a mobile computing device associated with the user. This is further illustrated in FIGS. 8, 9A-9C, and 10A-10B.

The method includes, presenting, via a processor, at a display of a first computing device (e.g., user device), on a first pane of a graphical interface, a plurality of first graphical elements comprising a list of one or more merchants; upon selection, in the first pane (e.g., Merchant list), of a first graphical element associated with a given merchant from a plurality of the presented first graphical elements, determining merchant identifier and merchant data associated with the given merchant (e.g., via a API call to Facebook or Google Map); presenting, via the processor, at the display of the first computing device, on a second pane (e.g., Merchant information screen) of the graphical interface, the determined merchant data and a first widget (e.g., a checkout button) associated with a payment transaction; and upon selection of the first widget (e.g., the checkout button), presenting, via the processor, at the display of the first computing device, on a third pane (e.g., rewards screen) of the graphical interface, i) a second graphical element associated with a reward point value (e.g., universal reward point value) associated with the authenticatable ID of the user, ii) a second widget (e.g., input text or slider) to receive a universal reward point input (e.g., universal reward point input) to be applied to a given payment transaction, and iii) a third widget (e.g., pay button) associated with the given payment transaction. The method further includes, upon selection of the third widget (e.g., the pay button), receiving, by the processor, payment token data having a token length selected from the group consisting of 3, 4, 5, and 6 symbols (e.g., number or alphanumerical symbols), wherein the payment token data comprises a unique symbol among a set of symbols, each set being specific to each merchant identifier, and wherein each merchant identifier is unique among all merchants and merchant stores maintained by a payment provider; and presenting, by the processor, at the display of the first computing device, on a fourth pane (e.g., a token screen), a third graphical element of the payment token data, wherein the payment token is subsequently inputted into a fifth pane (e.g., Merchant payment screen), at a display of a third computing device (e.g., a merchant device), to be transmitted, to one or more second computing devices (e.g., the payment servers), with a merchant identifier associated with the third computing device, wherein the one or more second computing devices is configured to determine whether the inputted payment token matches an active payment token associated with the merchant identifier and to complete a payment transaction if there is a match, and wherein the reward point input (e.g., universal reward point input) is transmitted to the one or more second computing devices and the payment transaction is adjusted by a determined monetary value derived from the reward point input (e.g., universal reward point input).

In some of the embodiments, the payment token data has an associated expiration time.

Other Examples

Figure 4A:
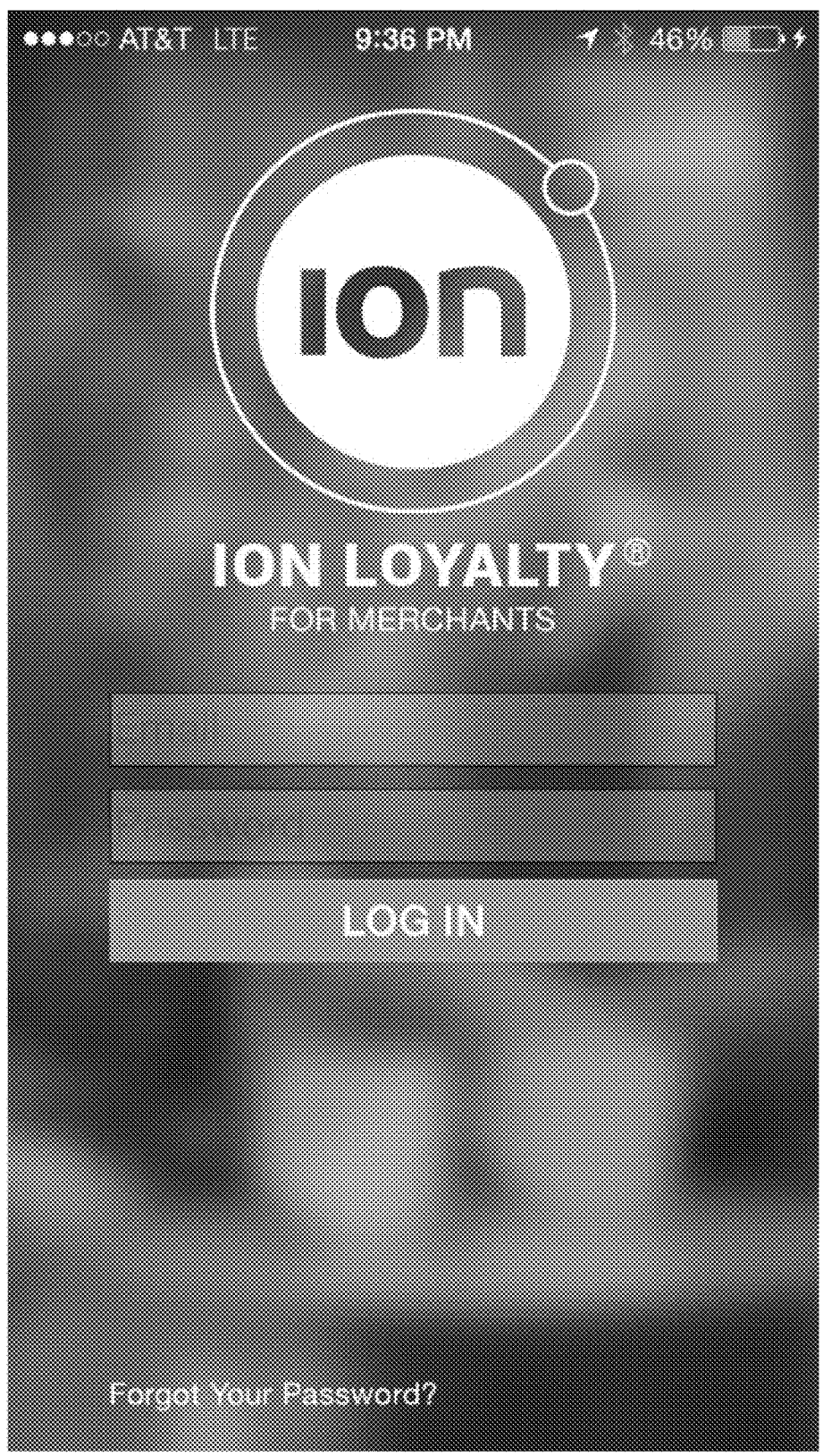
FIGS. 4A, 4B, 4C, 4D, 4E, 4F, 4G, and 4H, each depicts exemplary graphical user interface at a computing device associated with a merchant, in accordance with an illustrative embodiment.
Figure 4B:
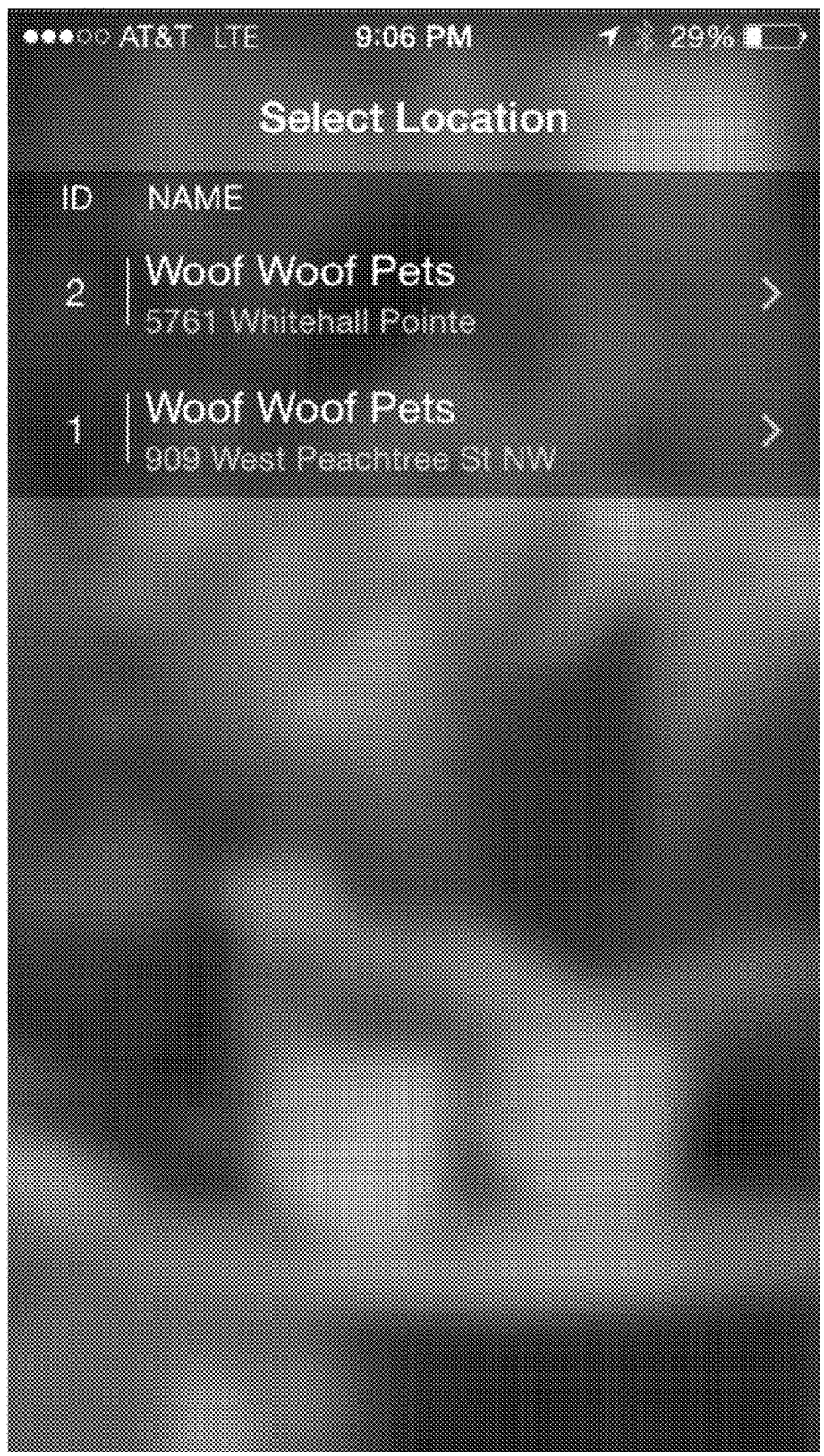

FIG. 4B illustrates a GUI at the merchant computing device, to select a store location when multiple store locations are associated with the merchant account with the payment service provider.

Figure 4C:
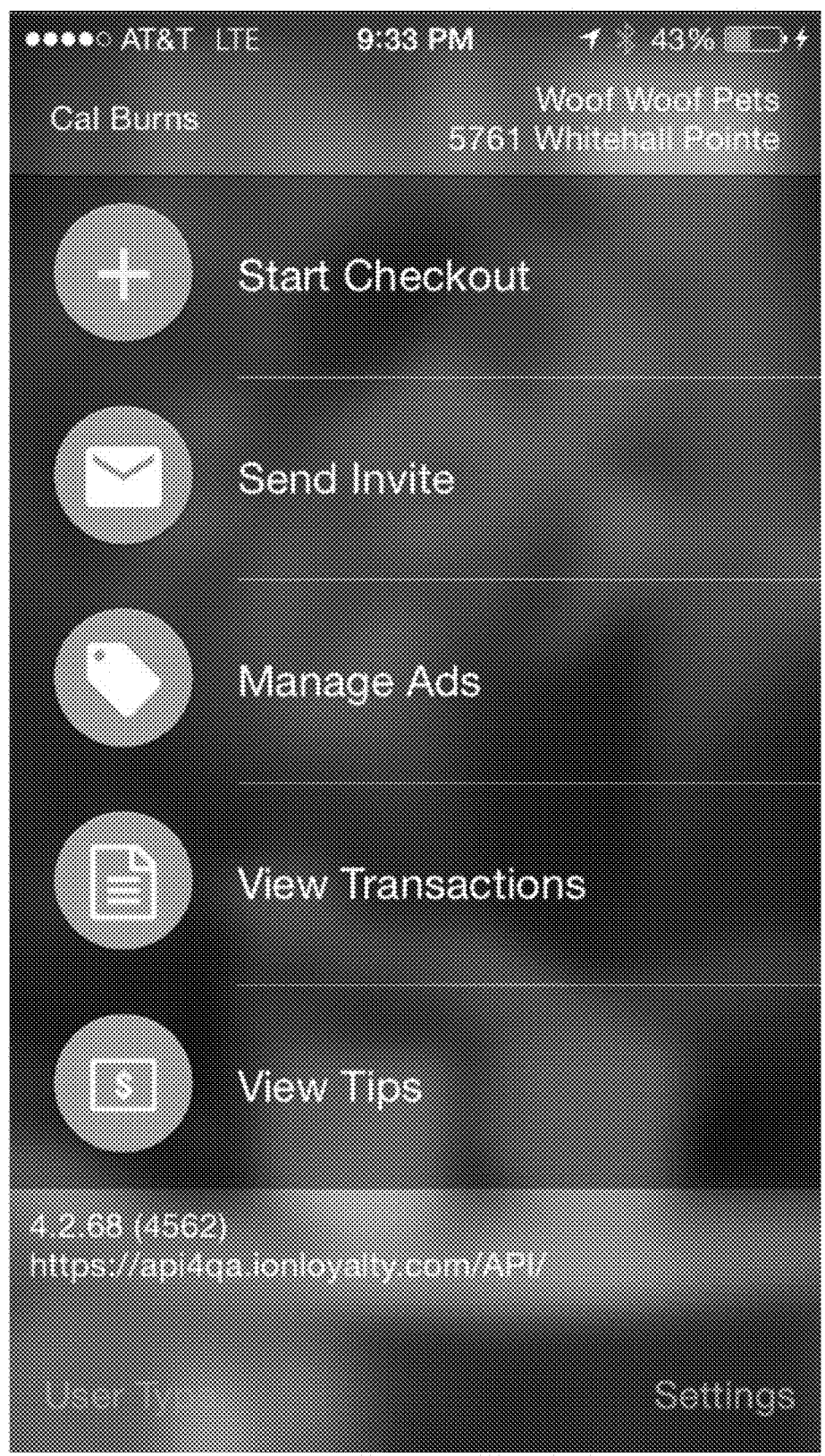
Figure 4D:
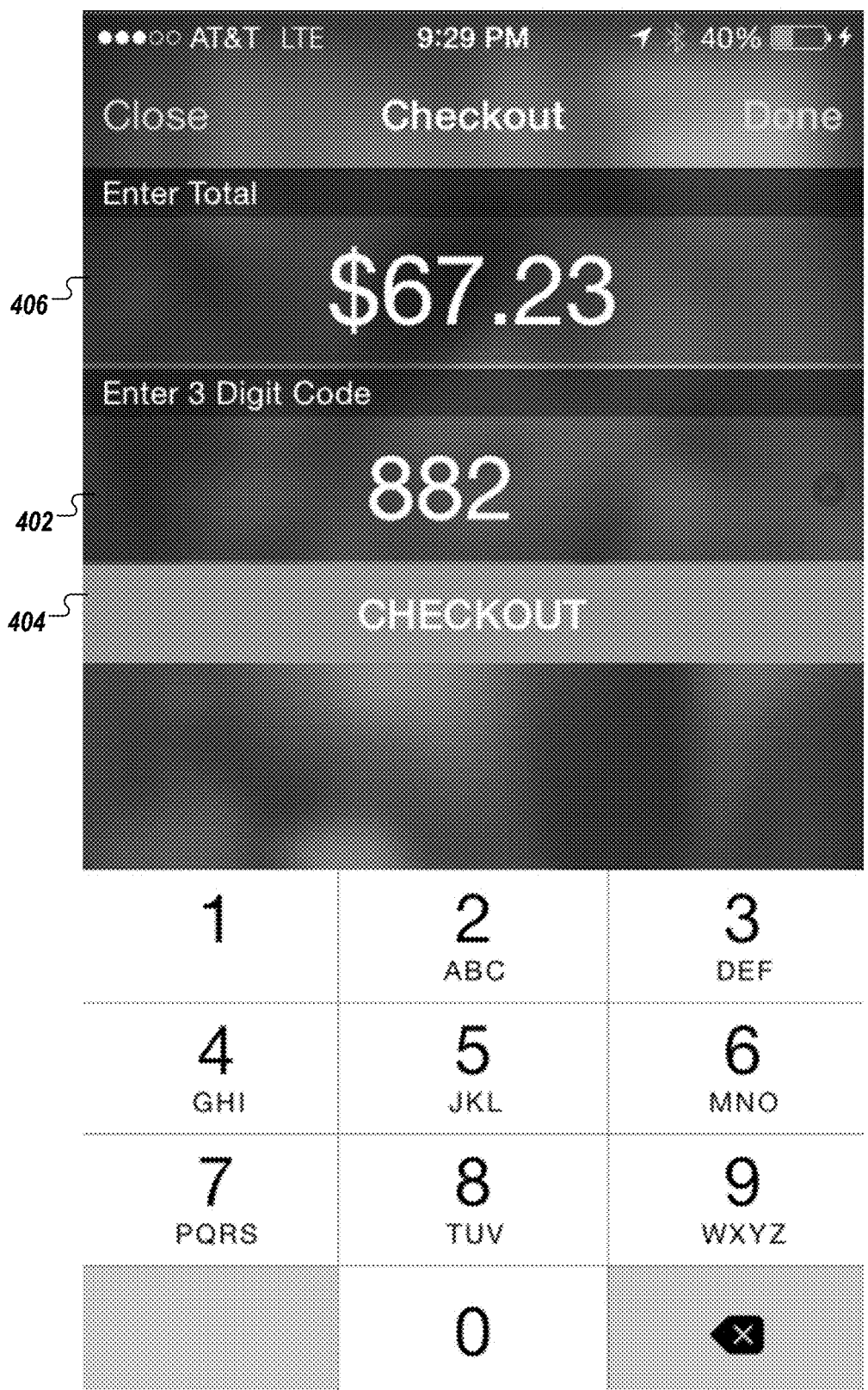
Figure 4E:
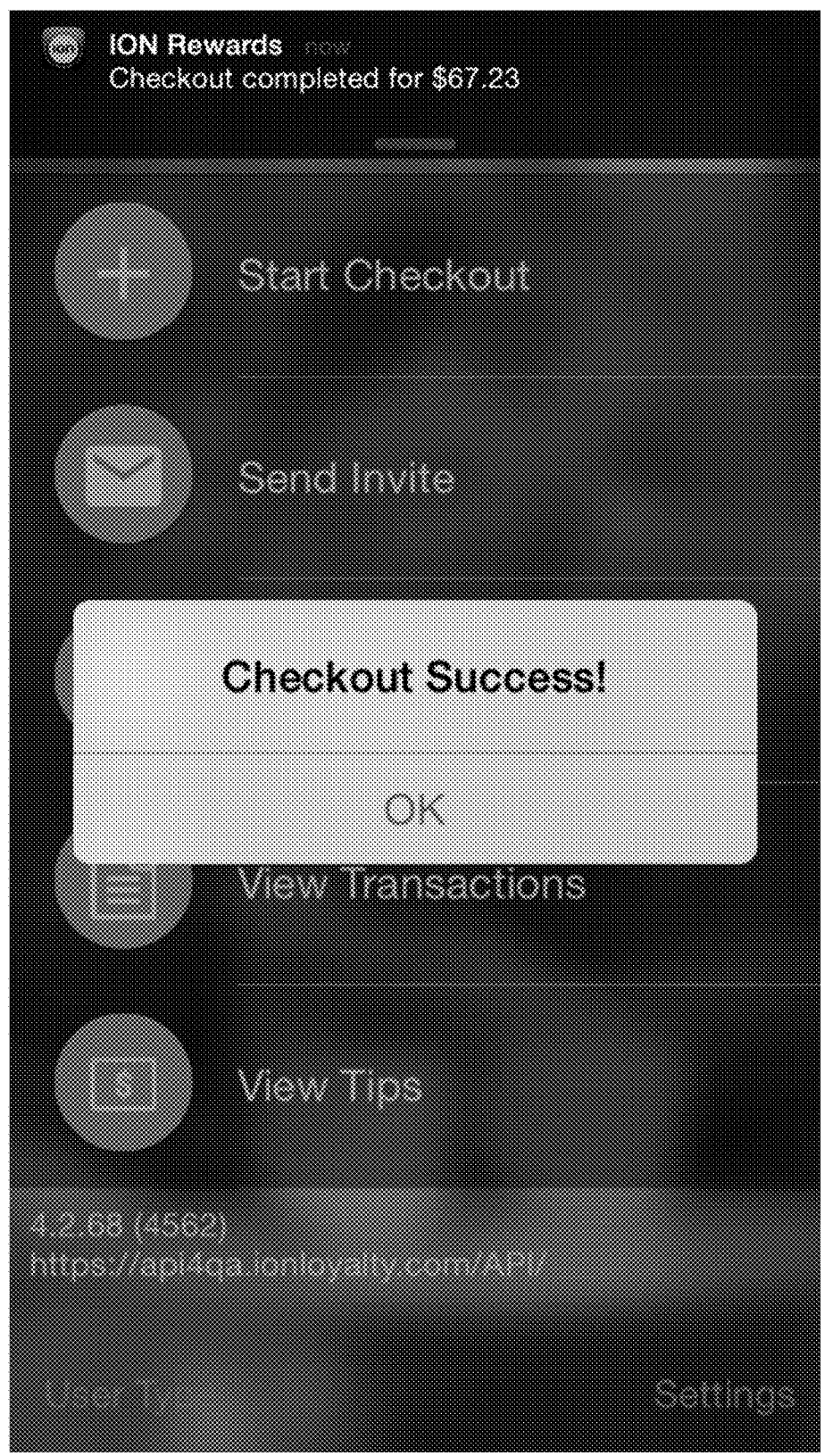
Figure 4F:
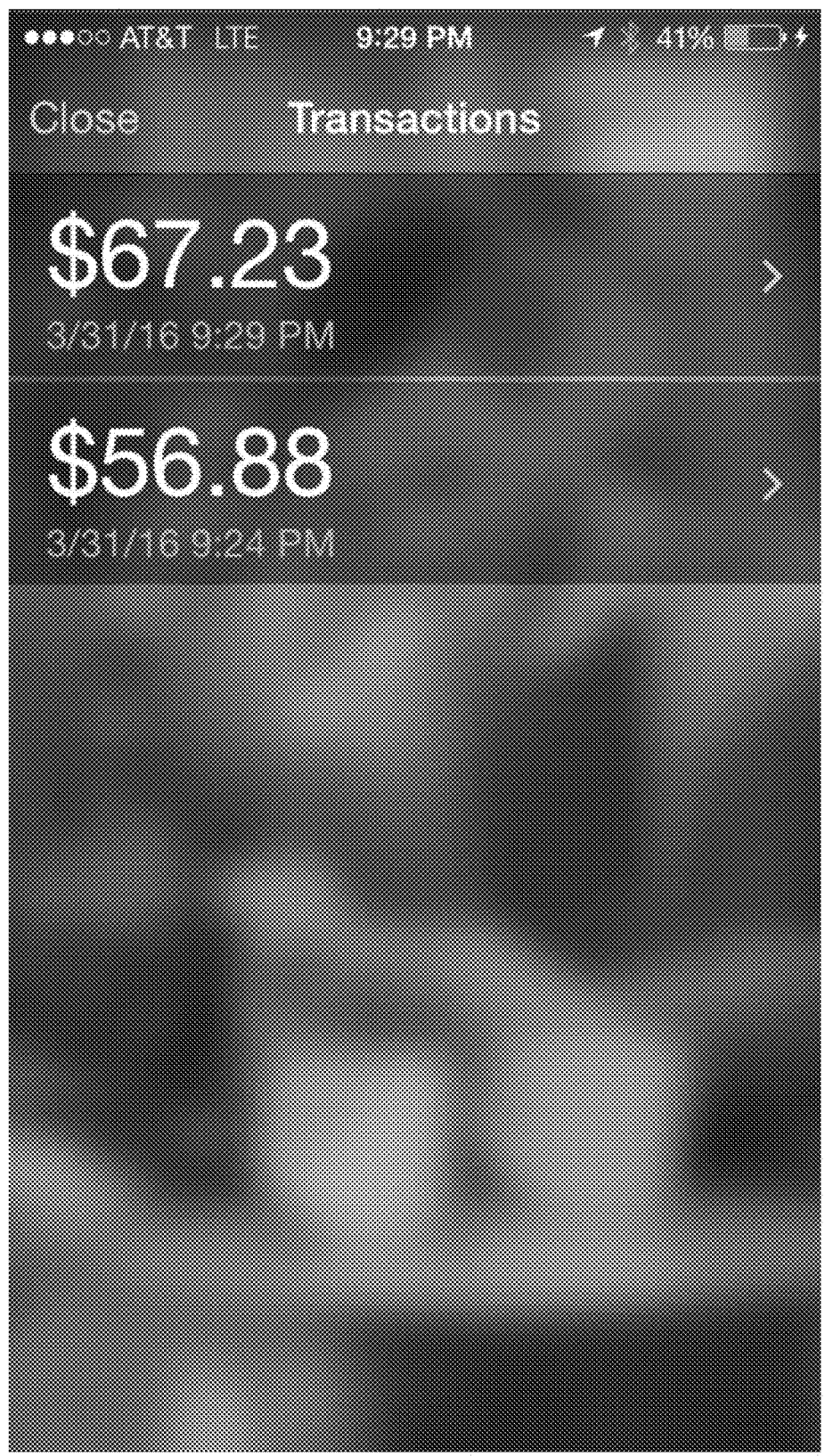
Figure 4G:
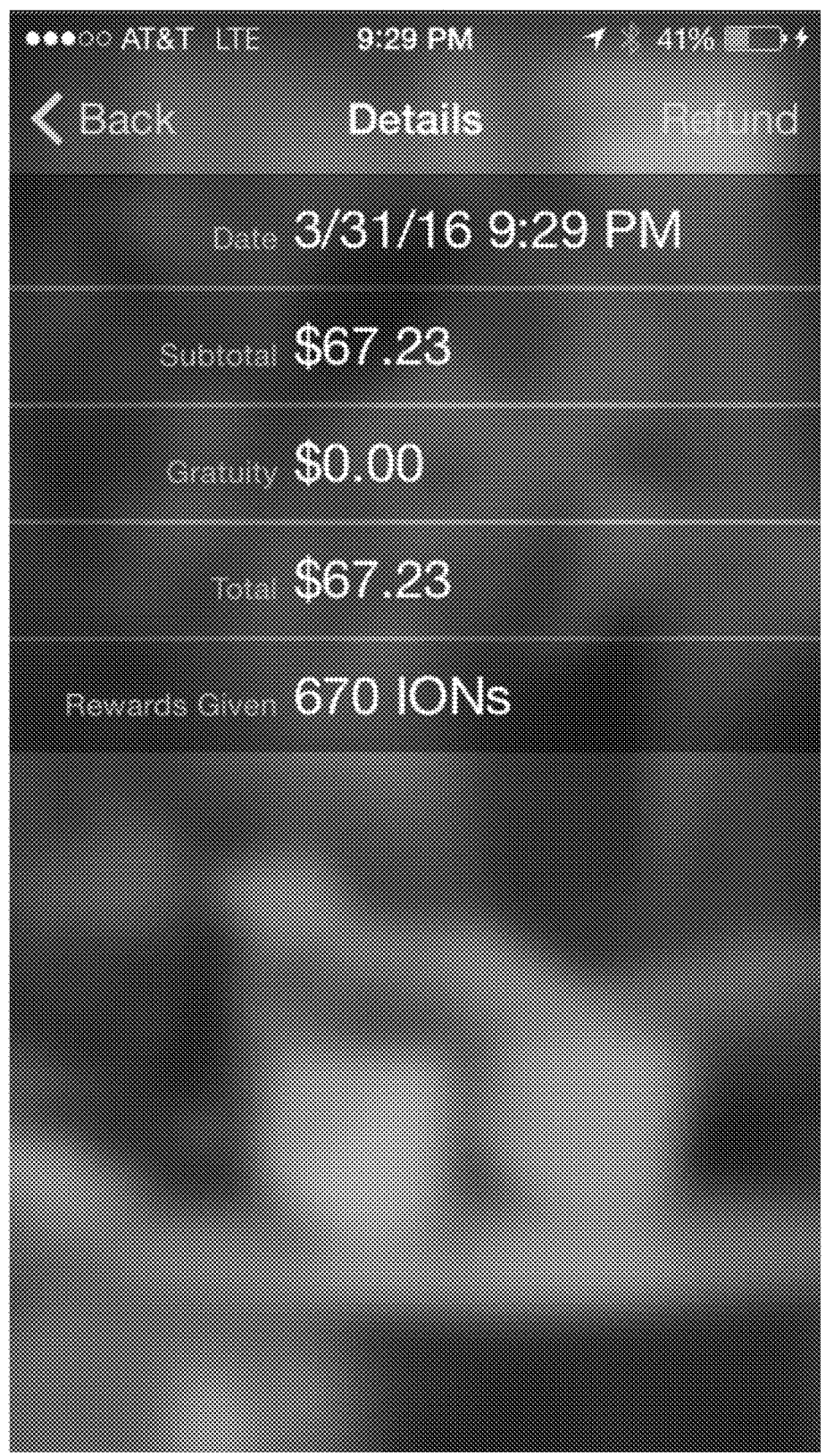
Figure 4H:
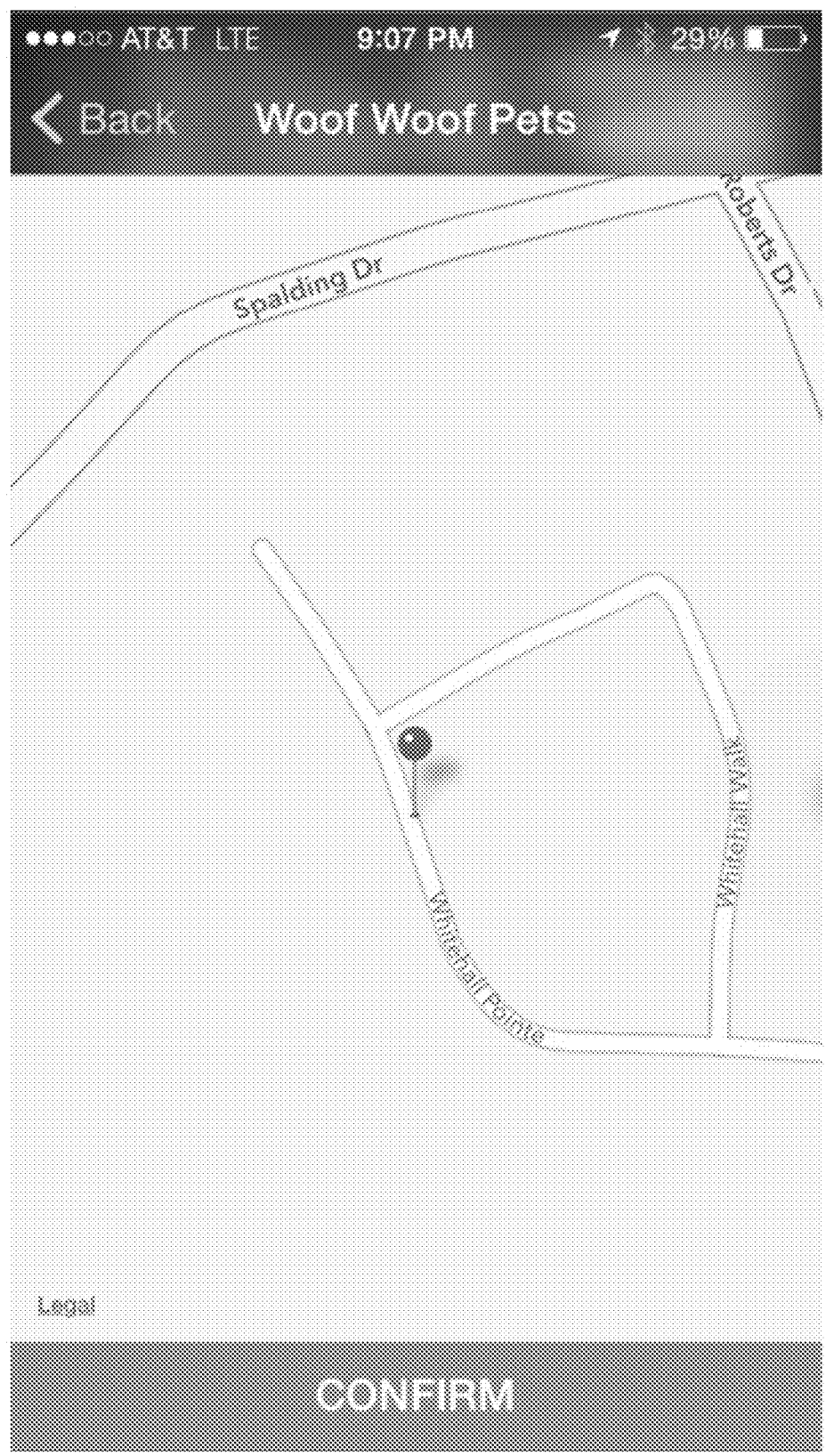

FIG. 4H illustrates a GUI at the merchant computing device, to confirm the merchant location with respect to its location identifier (e.g., Latitude and Longitude) is accurate with respect to its Merchant ID. In some embodiments, the location identifier of the merchant (i.e., that on its online profile) or the merchant computing device (and the consumer computing device) is used during the validation of the payment transaction by the payment service provider in conjunction with the payment token.

Figure 5:
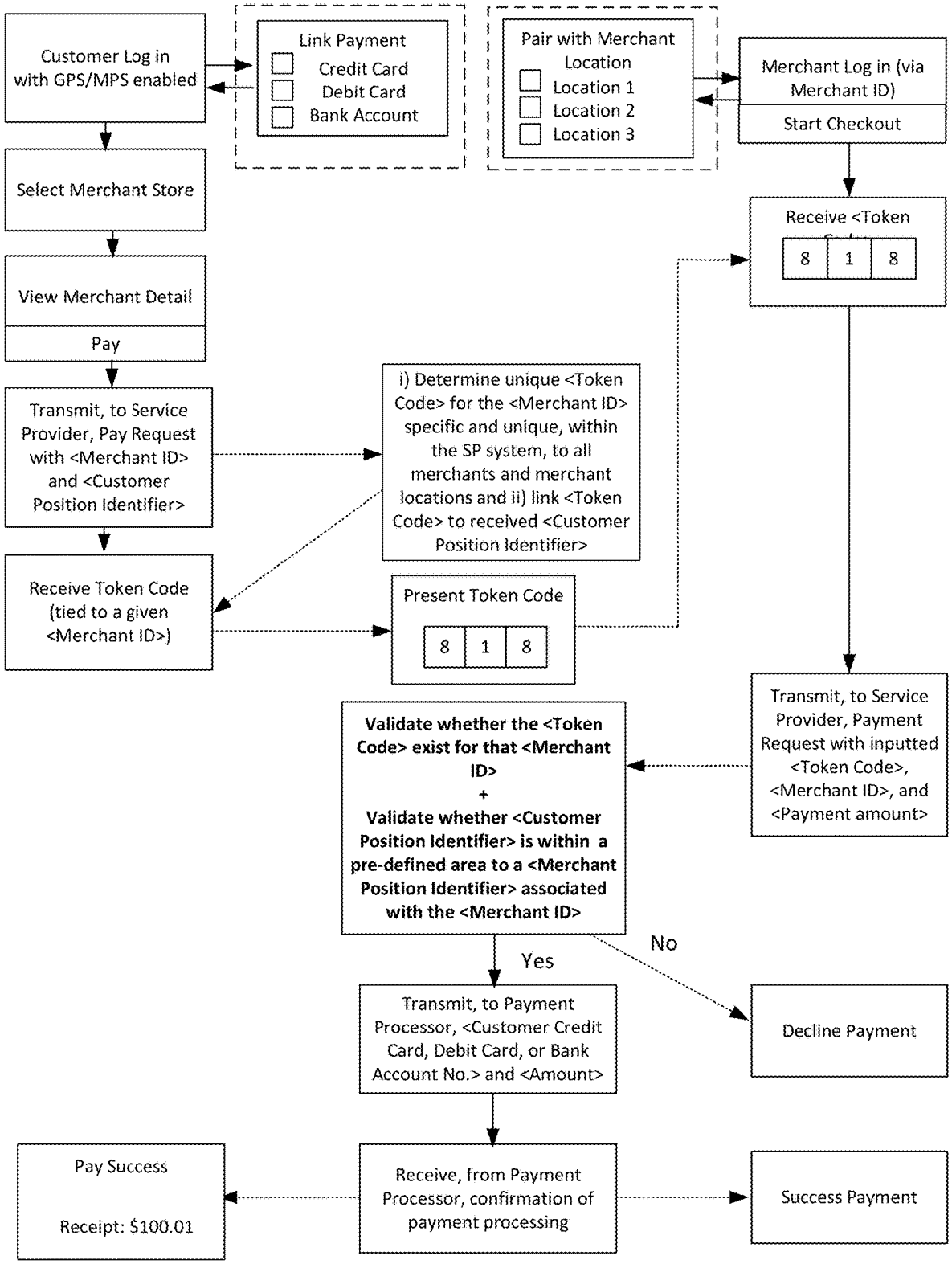
FIG. 5 depicts a flow diagram of an exemplary method for conducting a secure payment transaction using customer location identifier as a verification criteria, in accordance with an illustrative embodiment.

FIG. 5 depicts a flow diagram of an exemplary method for conducting a secure payment transaction using customer location identifier as a verification criteria, in accordance with an illustrative embodiment. In particular, FIG. 5 illustrates transaction validation using the customer proximity to merchant's location, which is associated with merchant identifier (e.g., its location on its on-line profile), as part of condition to sending transaction to payment processor.

Figure 6:
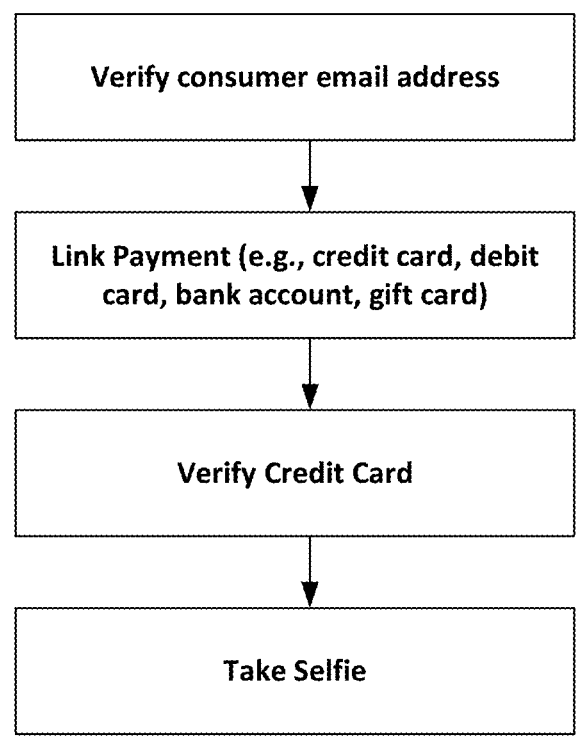
FIG. 6 depicts a flow diagram of an exemplary method for creating a trusted user account, in accordance with an illustrative embodiment.

FIG. 6 depicts a flow diagram of an exemplary method for creating a trusted user account, in accordance with an illustrative embodiment. As shown in FIG. 6, to create a trusted user account, the system may request that the user i) provide an email address, ii) a form of electronic or digital payment (e.g., credit card, debit card, bank account, gift card information or payment account, e.g., Paypal, and etc.) to which the system can verify the electronic or digital payment information, and iii) a selfie (an image of the user).

Figure 7:
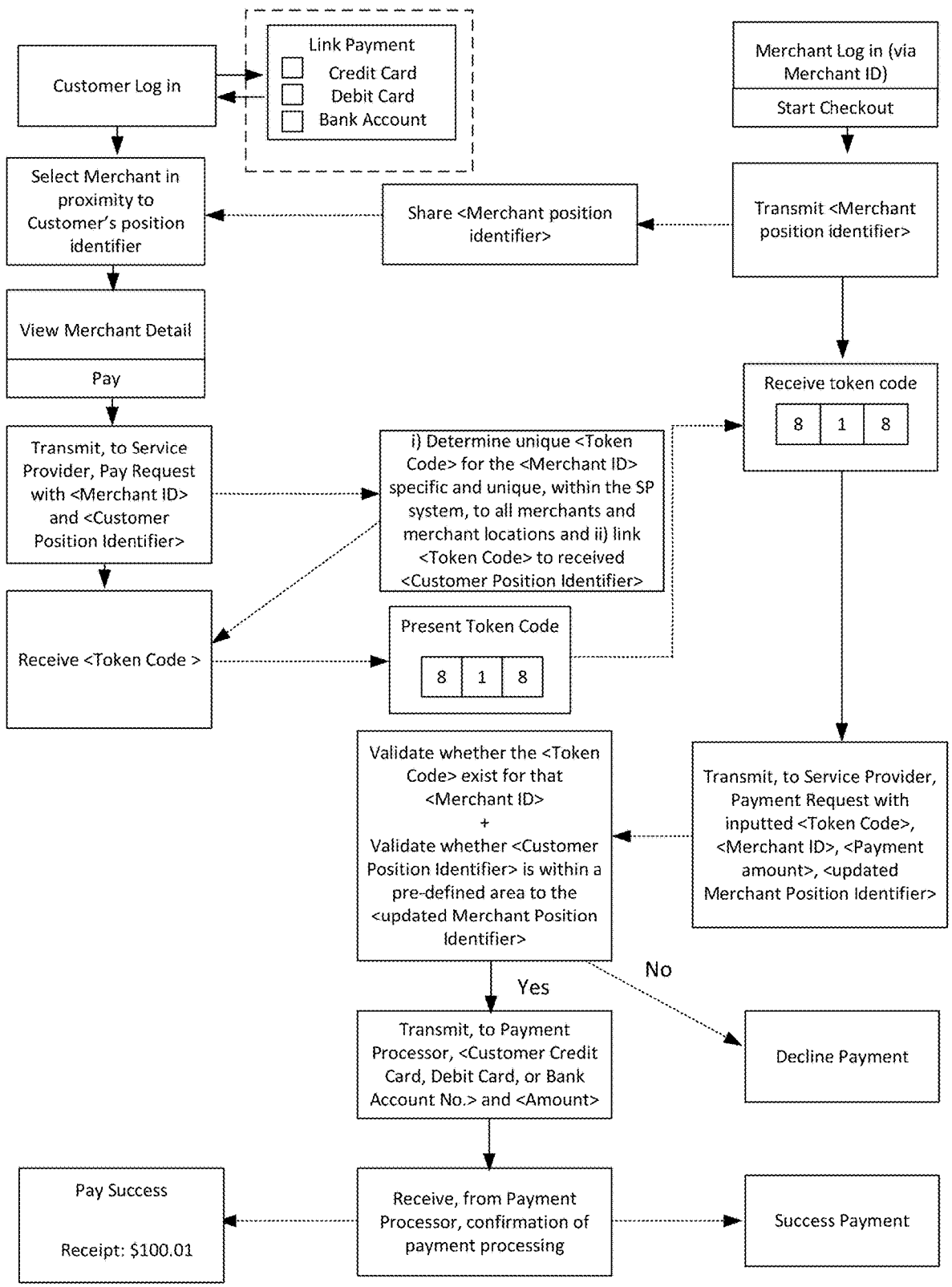
FIG. 7 depicts a flow diagram of an exemplary method for conducting a secure payment transaction using customer location identifier and merchant "live" location identifier as a verification criteria, in accordance with an illustrative embodiment.

FIG. 7 depicts a flow diagram of an exemplary method for conducting a secure payment transaction using customer location identifier and merchant "live" (rather than info from an online-profile) location identifier as a verification criteria, in accordance with an illustrative embodiment. Here, the customer position identifier is used as, in the business decision logic, as to whether the payment request from the consumer and the merchant is valid (or invalid). The position identifier allows for proximity to be used in addition to time to increase the security of the token code.

Figure 8:
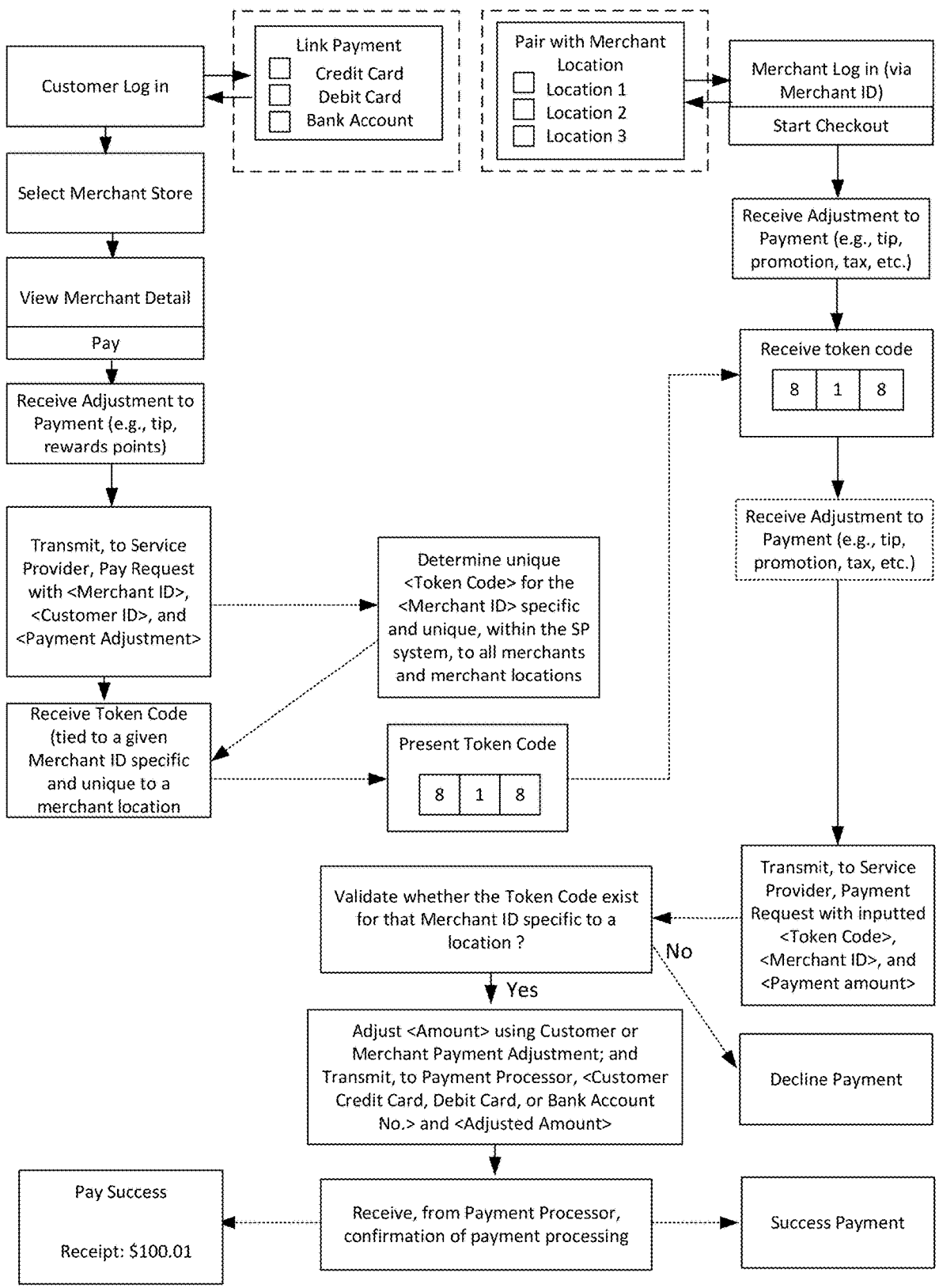
FIG. 8 depicts a flow diagram of an exemplary method for conducting a secure payment transaction, in accordance with another illustrative embodiment.

FIG. 8 depicts a flow diagram of an exemplary method for conducting a secure payment transaction, in accordance with another illustrative embodiment. As shown in FIG. 8, adjustments to the payment amount may be made via the consumer computing device (e.g., to add tip or reward points) or via the merchant computing device (e.g., to add tax, tip, etc.)

Figure 9A:
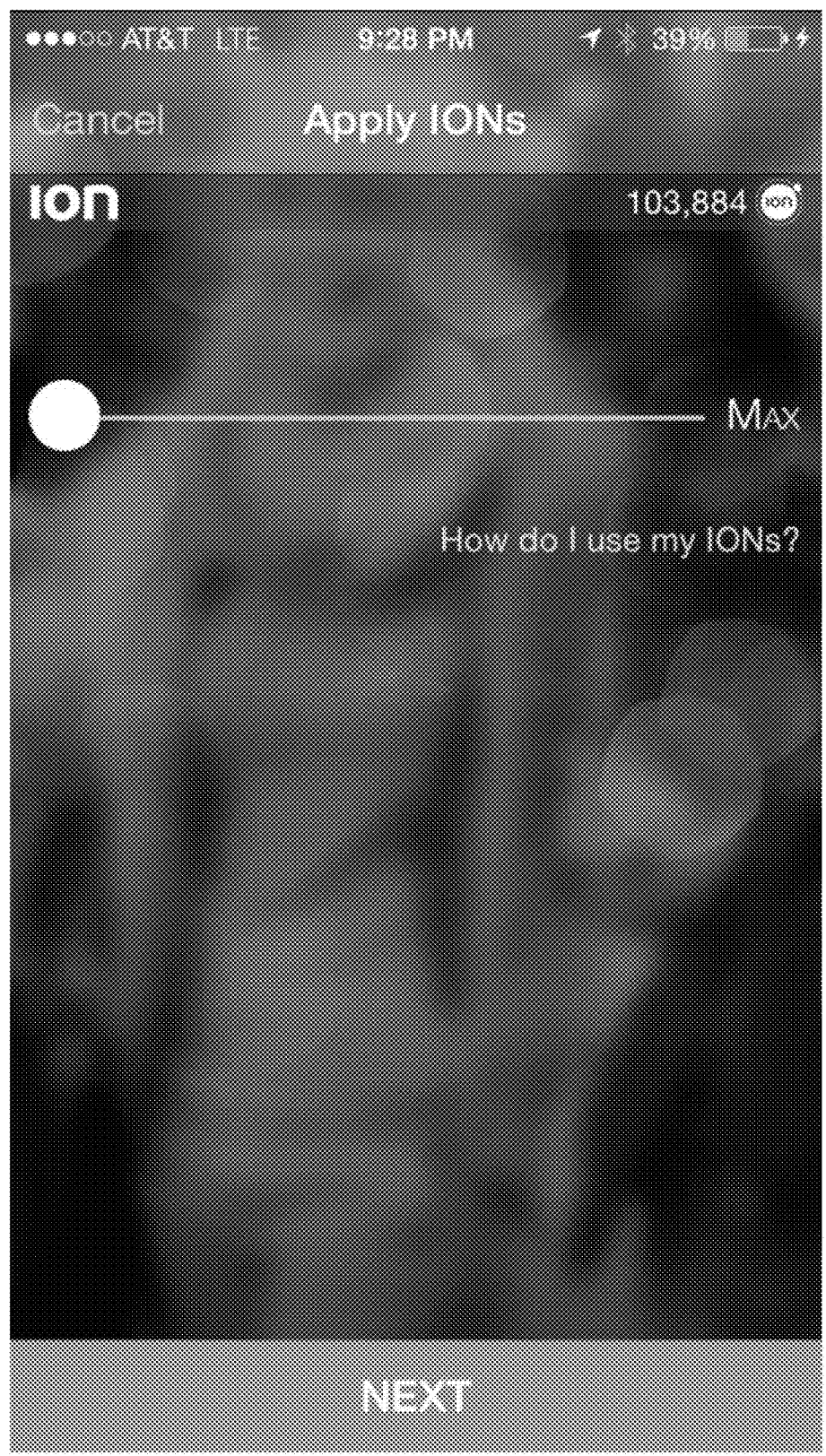
FIGS. 9A, 9B, and 9C, each depicts exemplary graphical user interface at a computing device associated with a consumer for conducting a secure payment transaction using reward points (e.g., universal reward points), in accordance with an illustrative embodiment.
Figure 9B:
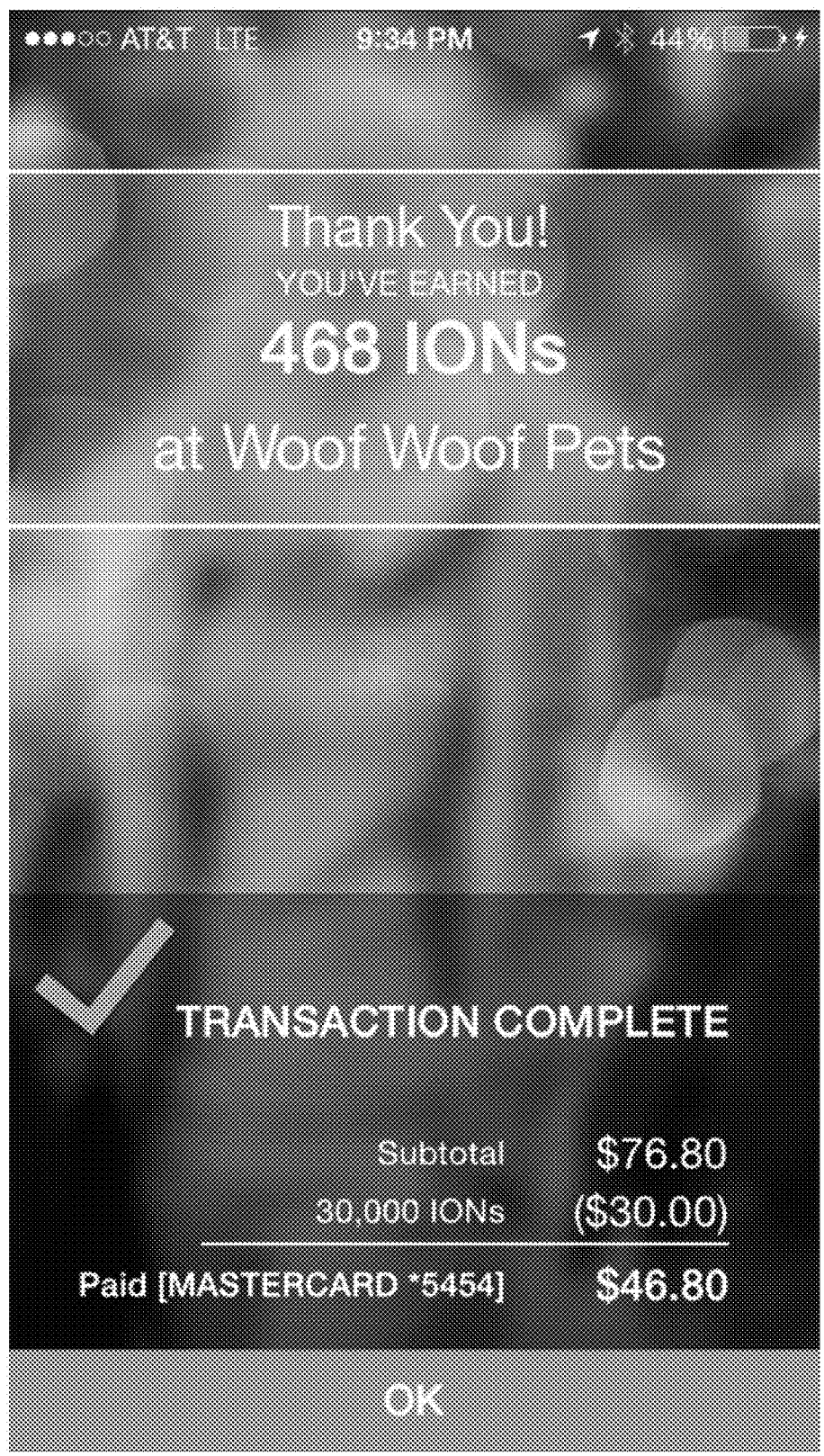
Figure 9C:
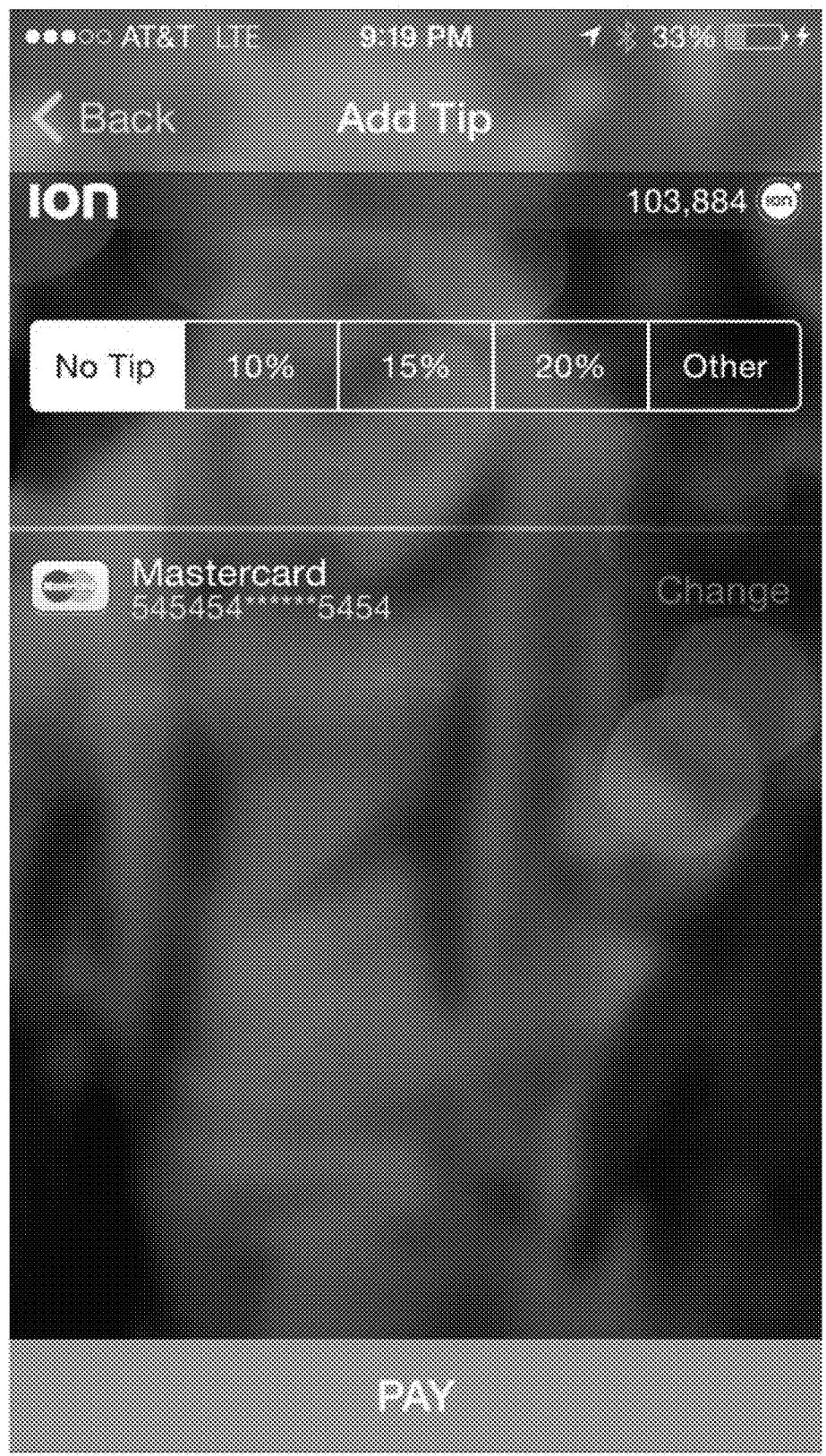

FIGS. 9A, 9B, and 9C, each depicts exemplary graphical user interface at a computing device associated with a consumer for conducting a secure payment transaction using reward points (e.g., universal reward points), in accordance with an illustrative embodiment. In FIG. 9A, the graphical user interface is configured to receive a number of desired reward points to use in the secure payment transaction. In FIG. 9B, the graphical user interface presents a receipt confirming a payment transaction. The receipt, in this example, further presents a number of the reward points used in the secure payment transaction and that is debited from the user's account. In FIG. 9C, the graphical user interface is configured to receive an optional tip amount to be applied to the payment in the secure payment transaction.

Figure 10B:
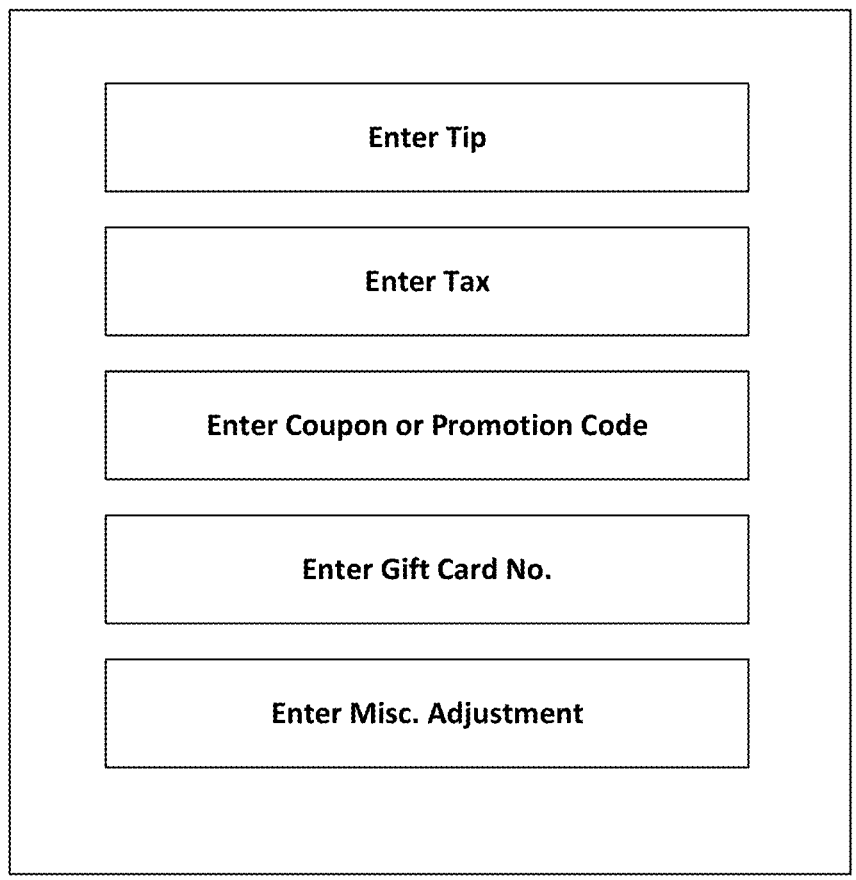
Figure 10C:
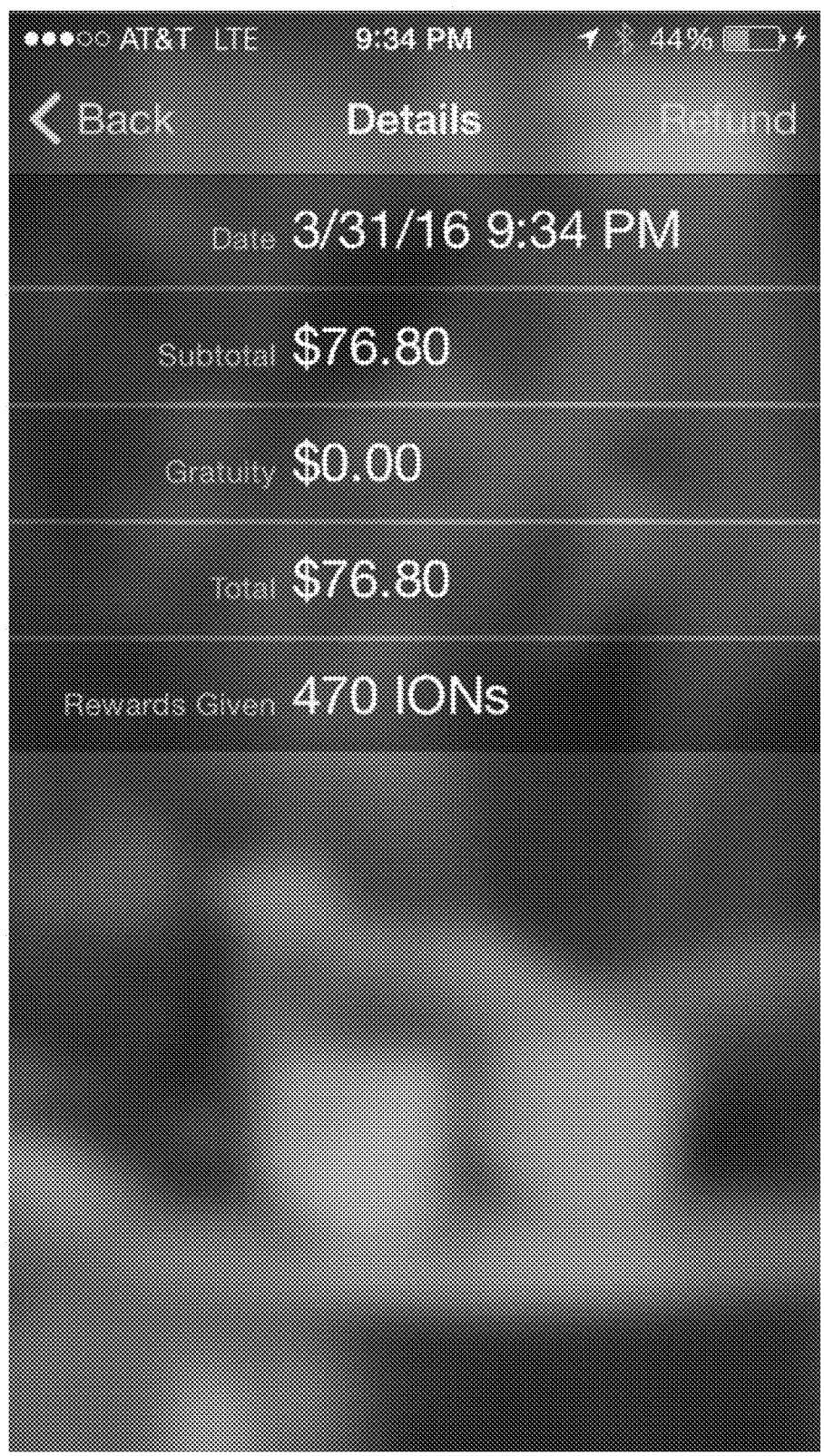

FIGS. 10A, 10B, and 10C, each depicts exemplary graphical user interface at a computing device associated with a merchant for conducting a secure payment transaction, in accordance with another illustrative embodiment. In FIG. 10A, the graphical user interface presents a graphical input to made adjustments to an entered payment amount. In FIG. 10B, the graphical user interface presents a graphical input to make one or more adjustment types. In FIG. 10C, the graphical user interface presents a detailed transaction that includes one or more of such adjustments.

Figure 11A:
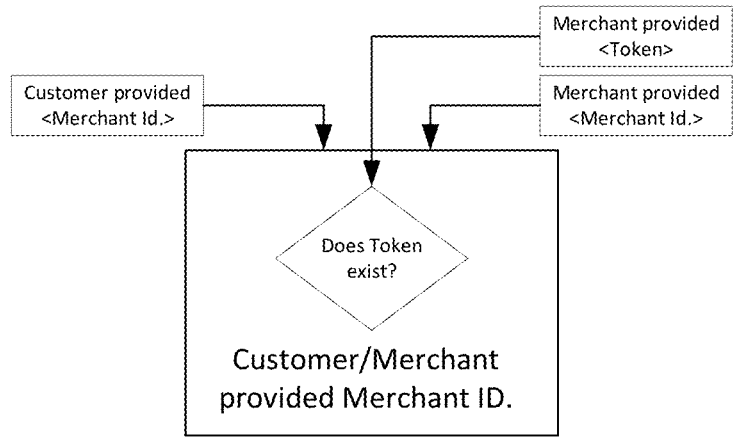
FIGS. 11A, 11B, and 11C, each depicts exemplary logic to initiate a payment transaction, in accordance with an illustrative embodiment.
Figure 11B:
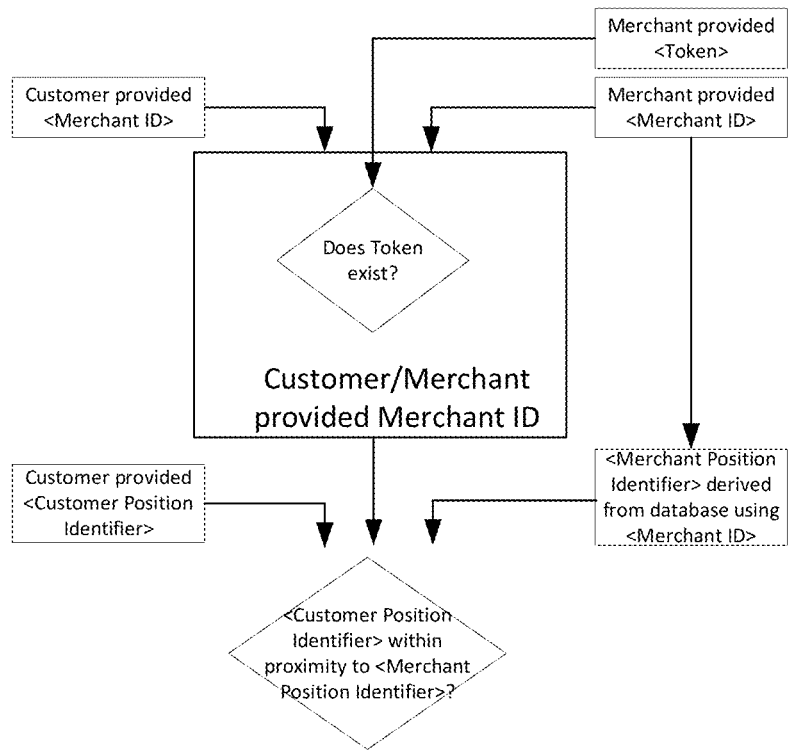
Figure 11C:
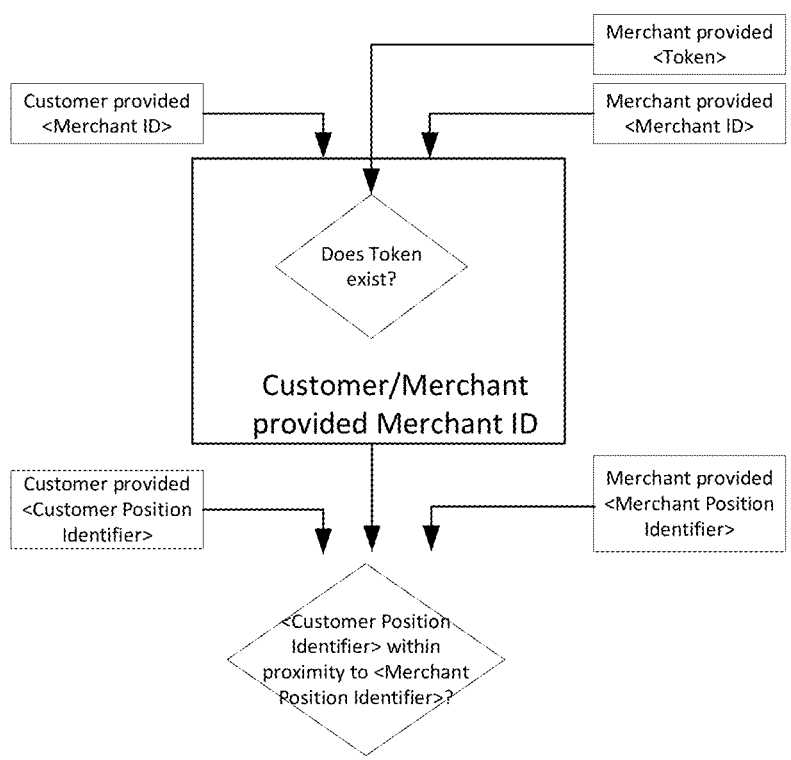

FIGS. 11A, 11B, and 11C, each depicts exemplary logic to initiate a payment transaction, in accordance with an illustrative embodiment.

In FIG. 11A, the logic to determine a valid transaction includes determining whether a token provided from a merchant device exists for a given merchant identifier.

In FIG. 11B, the logic to determine to a valid transaction includes determining whether a token provided from a merchant device exist for a given merchant identifier and whether a position identifiers associated with the customer is within a pre-defined proximity to the merchant's proximity as defined in a system's database. The proximity may be configured per a setting in the merchant configuration. In some embodiments, the proximity may be configured per a setting in the user configuration.

In FIG. 11C, the logic to determine the valid transaction includes determining whether a token provided from a merchant device exists for a given merchant identifier and whether a position identifiers associated with the customer is within a pre-defined proximity to a position identifier associated with the merchant. The position identifier is received, at the system, from the respective devices of the consumer and the merchant.

Figure 12:
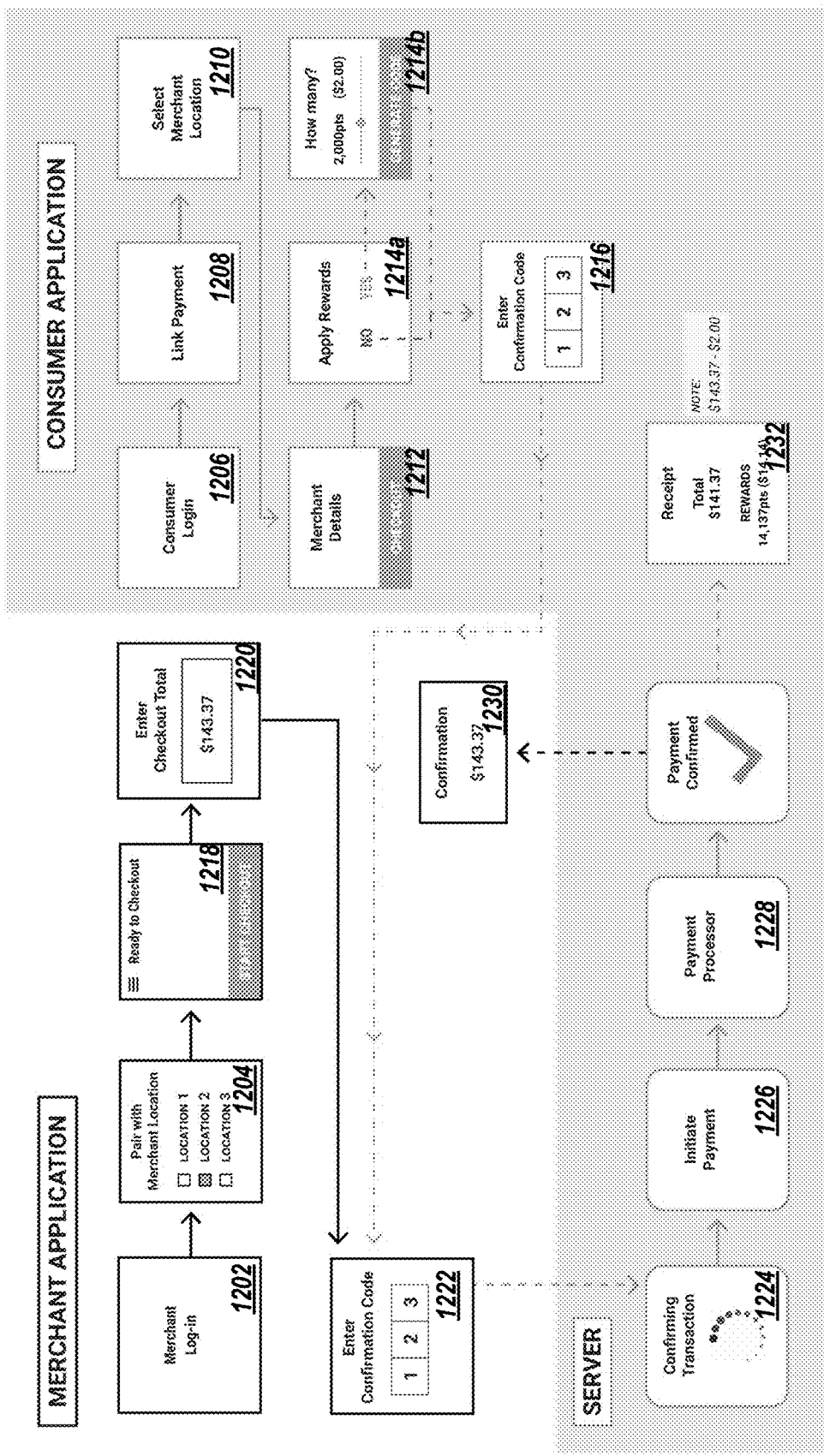
FIG. 12 depicts a flow diagram of an exemplary method for conducting a secure payment transaction, in accordance with an illustrative embodiment.

FIG. 12 depicts a flow diagram of an exemplary method for conducting a secure payment transaction, in accordance with an illustrative embodiment.

In FIG. 12, operations are shown at the merchant app (i.e., "merchant application"), at the consumer app (i.e., "consumer application"), and at the server associated with the transaction service provider.

As shown in FIG. 12, in some embodiments, the flow to set up a merchant account to perform a transaction as described herein includes logging in (1202) to the application and create (1204) a pairing of the merchant location to one or multiple available locations. FIGS. 4A and 4B show example GUI interfaces for such operations. The flow to set up a consumer account perform a transaction as described herein includes logging in (1206) (e.g., by providing a user name and password) and linking (1208) a payment to the account.

Then, to perform a transaction, the consumer may select (1210) a merchant location (1210) from among a list of merchants (e.g., shown in FIG. 3B) and being presented (1212) with merchant detail (e.g., as shown in FIG. 3C). The system may interrogate (1214a and 1214b) the consumer whether to apply reward points available in the consumer's account (e.g., as shown in FIG. 9A). In some embodiments, the interrogation is over two screens. In other embodiments, the interrogation is performed over a single screen. Upon receiving a request to generate a token (1214b), the system presents (1216) a token code to the consumer (e.g., as shown in FIG. 3D).

At the merchant GUI, the merchant may initiate (1218) a checkout process from a screen, e.g., shown at FIG. 4C. The merchant may provide (1220) a checkout amount (e.g., as shown in FIG. 4D) and be presented with an input screen for a token code. Upon receiving a token code (1222) (e.g., shown in FIG. 4D), the token code is transmitted to the server to confirm (1224) the transaction, initiate (1226) payment, process (1228) the payment, and present payment confirmation to the consumer (1232) and to the merchant (1230). Examples of the presented payment confirmation is provided in FIG. 4E (for the merchant) and 3E (for the consumer).

Other processes may be included herein without departing from the spirit of the disclosure.

Figure 13:
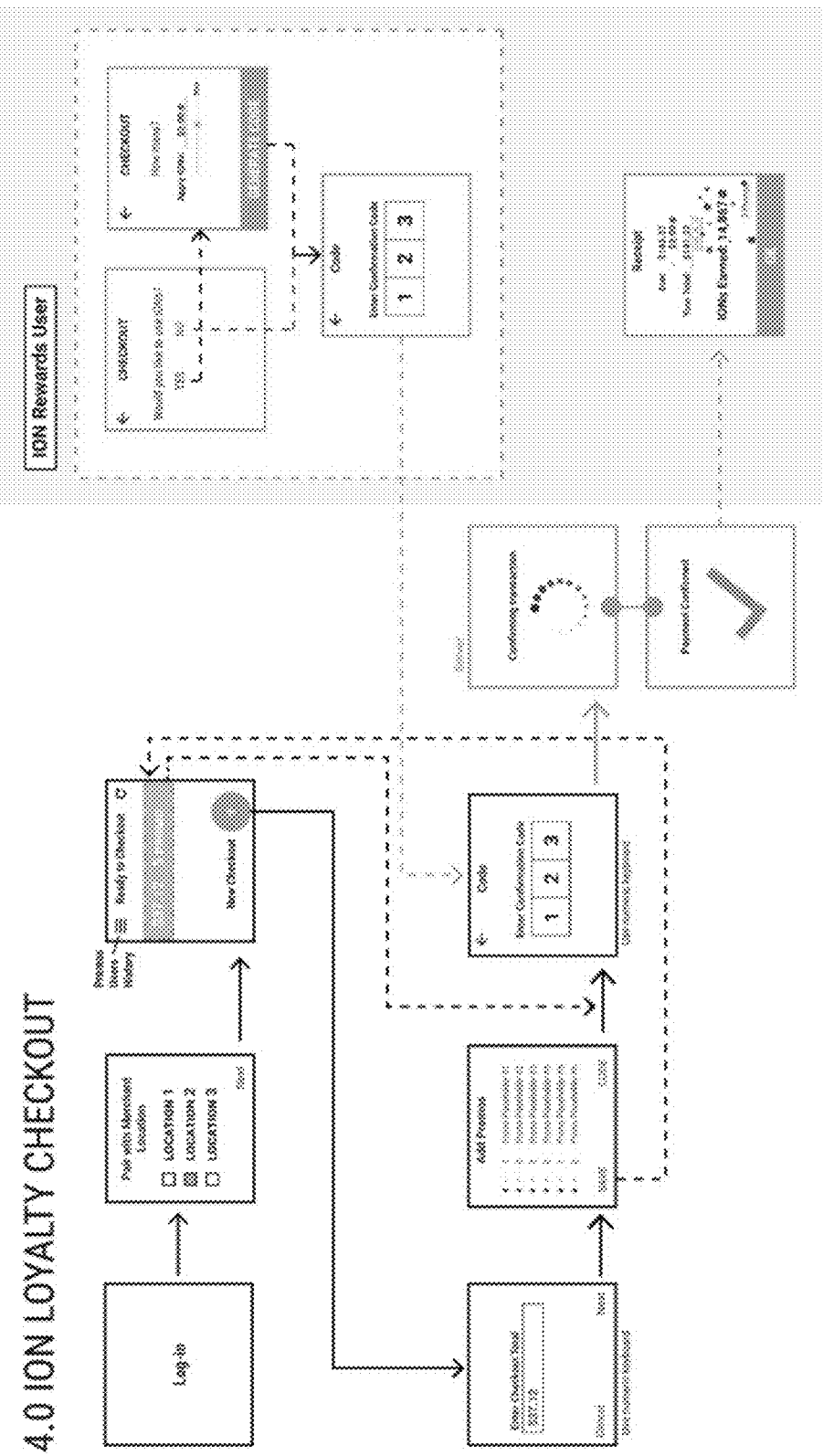
FIG. 13 depicts a flow diagram of an exemplary method for conducting a secure payment transaction using reward points (e.g., universal reward points), in accordance with an illustrative embodiment.

FIG. 13 depicts a flow diagram of an exemplary method for conducting a secure payment transaction using reward points (e.g., universal reward points), in accordance with an illustrative embodiment. As shown in FIG. 13, the system may receive an added promotions 1302 from the merchant to adjust a given payment. A promotion may be inputted, to the merchant device, as a promotion code, or retrieved from a scan of a promotional material (e.g., via QR codes, bar codes, and other like codes).

Figure 14:
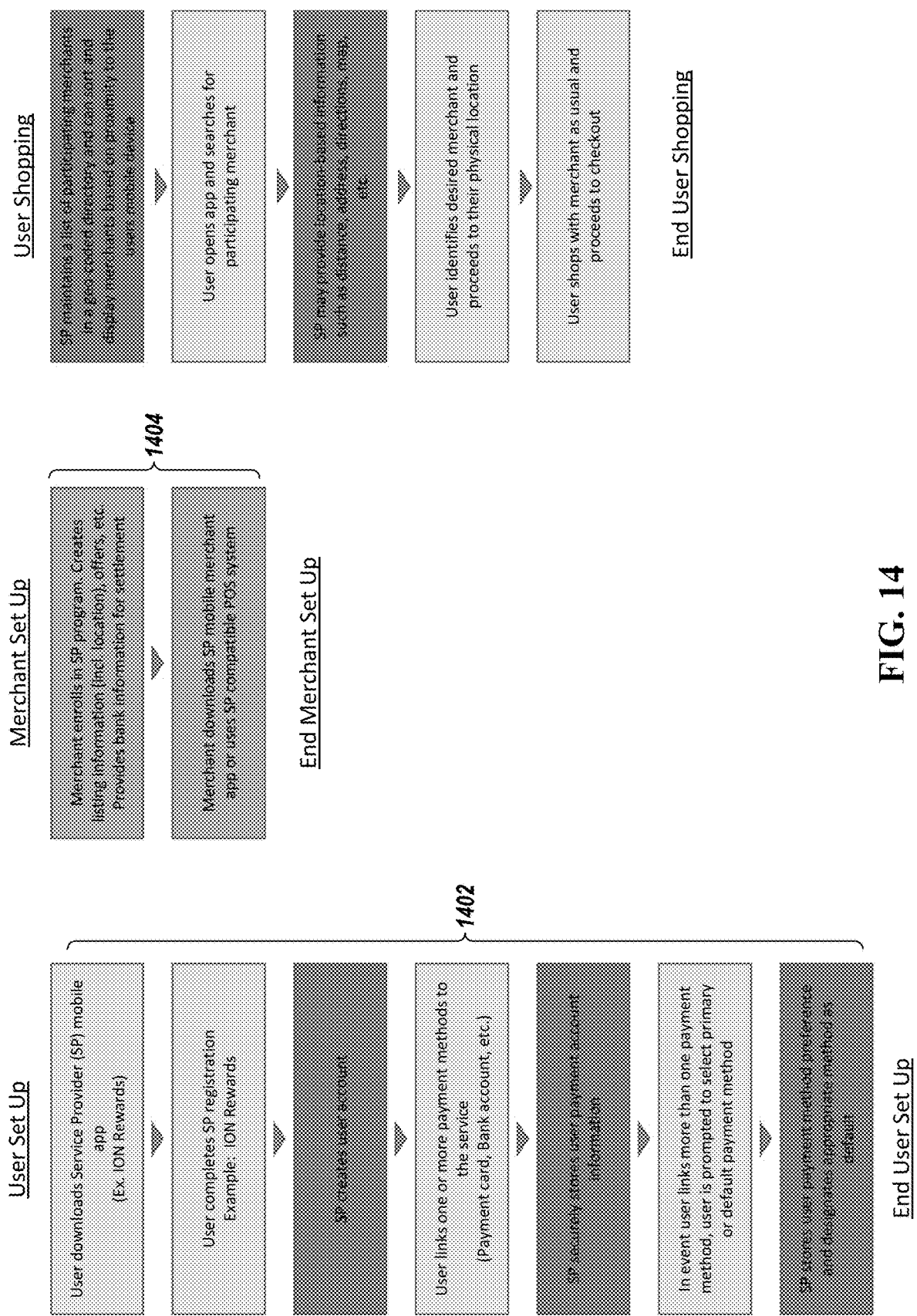
FIG. 14 depicts another flow diagram of an exemplary method for conducting a secure payment transaction, in accordance with an illustrative embodiment.

FIG. 14 depicts another flow diagram of an exemplary method for conducting a secure payment transaction, in accordance with an illustrative embodiment. In FIG. 14, a detail flow for setting up a consumer account is shown (1402) and a detail flow for setting up a merchant account is also shown (1404). Notably, as shown in 1404, the process to enroll a merchant is automatic by the server of the transaction service provider—that is, without input from personnel of the transaction service provider.

Figure 15:
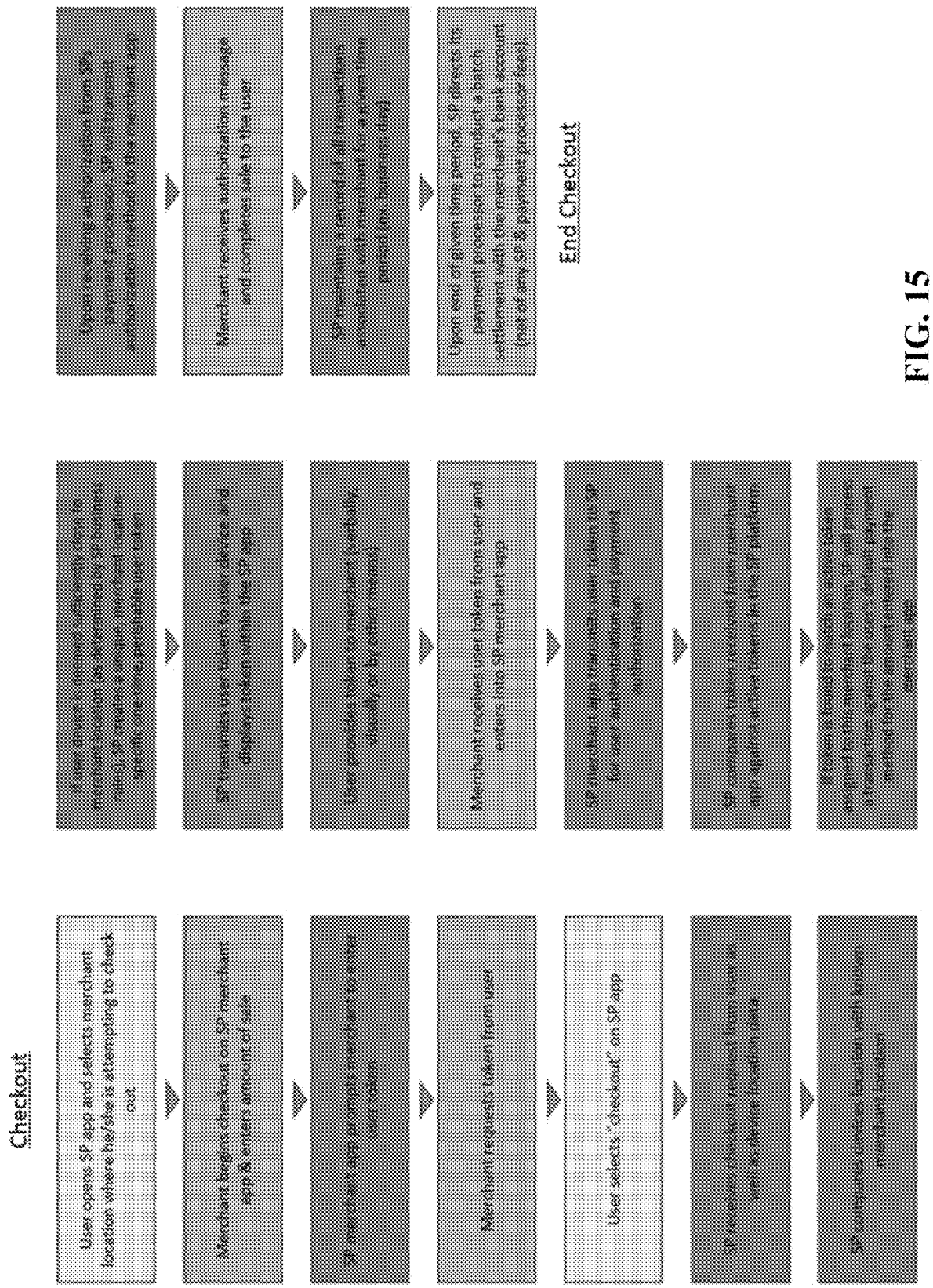
FIG. 15 depicts another flow diagram of an exemplary method for conducting a secure payment transaction, in accordance with an illustrative embodiment.

FIG. 15 depicts another flow diagram of an exemplary method for conducting a secure payment transaction, in accordance with an illustrative embodiment.

FIGS. 16, 17, 18, 19, 20, 21, and 22, each depicts a flow diagram of an exemplary method for conducting a secure payment transaction, in accordance with an illustrative embodiment.

Figure 16:
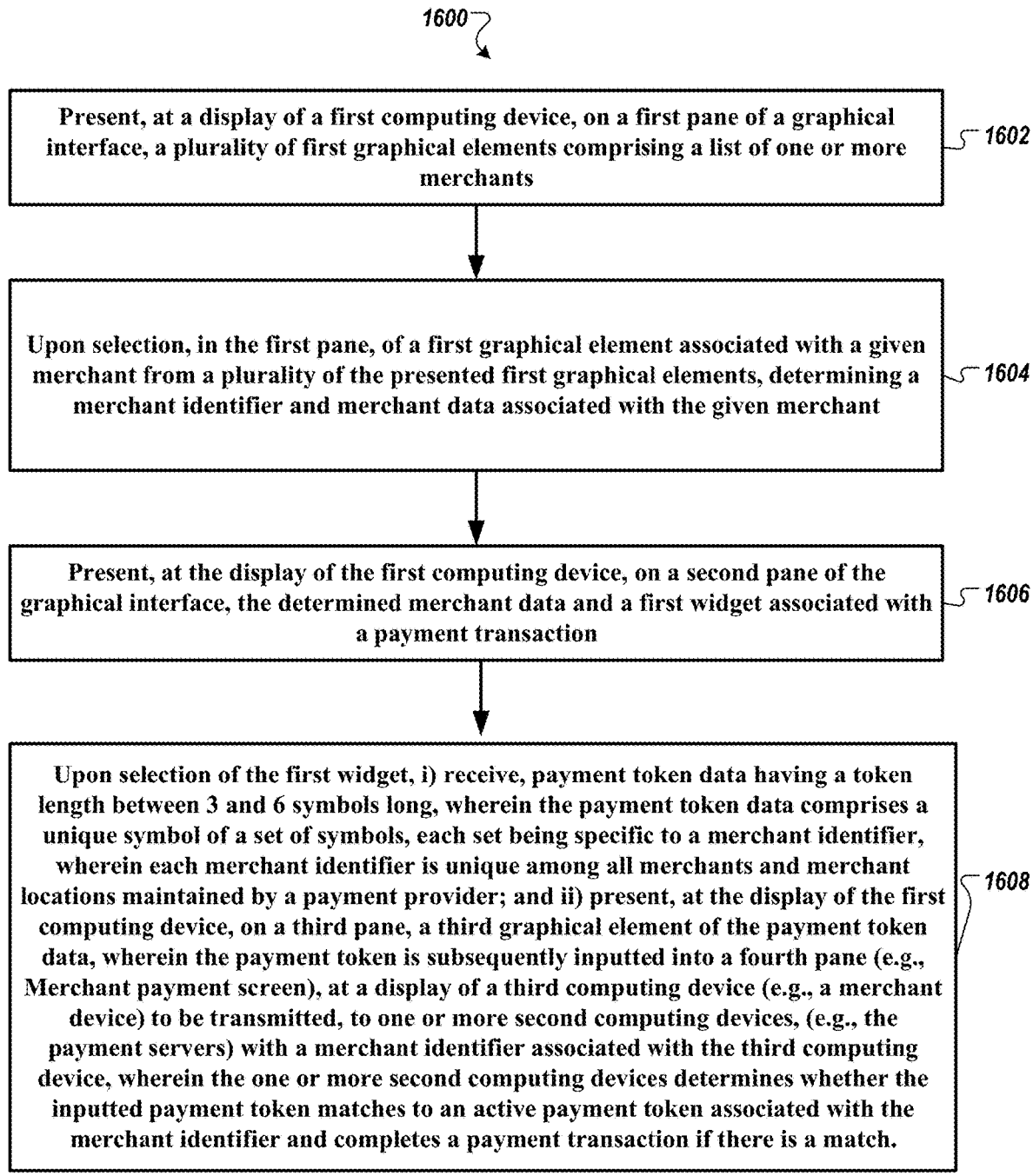
FIGS. 16, 17, 18, 19, 20, 21, and 22, each depicts a flow diagram of an exemplary method for conducting a secure payment transaction, in accordance with an illustrative embodiment.

FIG. 16 show a method 1600 for conducting a secure payment transaction for a user having an authenticatable ID via a mobile computing device associated with the user. The method includes presenting (1602), via a processor, at a display of a first computing device (e.g., user device), on a first pane of a graphical interface, a plurality of first graphical elements comprising a list of one or more merchants. This is, for example, shown and discussed in relation to FIG. 3B.

The method 1600 includes, upon selection, in the first pane (e.g., Merchant list), of a first graphical element associated with a given merchant from a plurality of the presented first graphical elements, determining (1604) merchant identifier and merchant data associated with the given merchant (e.g., via a API call to Facebook or Google Map). The method 1600 includes, presenting (1604), via the processor, at the display of the first computing device, on a second pane (e.g., Merchant information screen) of the graphical interface, the determined merchant data and a first widget (e.g., a checkout button) associated with a payment transaction. This is, for example, shown as described in relation to FIG. 3C.

The method 1600 includes, upon selection of the first widget (e.g., the checkout button), receiving (1608), by the processor, payment token data having a token length selected from the group consisting of 3, 4, 5, and 6 symbols (e.g., number or alphanumerical symbols), wherein the payment token data comprises a unique symbol among a set of symbols, each set being specific to each merchant identifier, and wherein each merchant identifier is unique among all merchants and merchant stores maintained by a payment provider; and presenting (1608), by the processor, at the display (e.g., FIG. 3D) of the first computing device, on a third pane (e.g., a token screen), a third graphical element of the payment token data, wherein the payment token is subsequently inputted into a fourth pane (e.g., Merchant payment screen, e.g., FIG. 4D), at a display of a third computing device (e.g., a merchant device) to be transmitted, to one or more second computing devices, (e.g., the payment servers) with a merchant identifier associated with the third computing device, wherein the one or more second computing devices is configured to determine (e.g., see FIG. 2) whether the inputted payment token matches an active payment token associated with the merchant identifier and to complete a payment transaction if there is a match.

Figure 17:
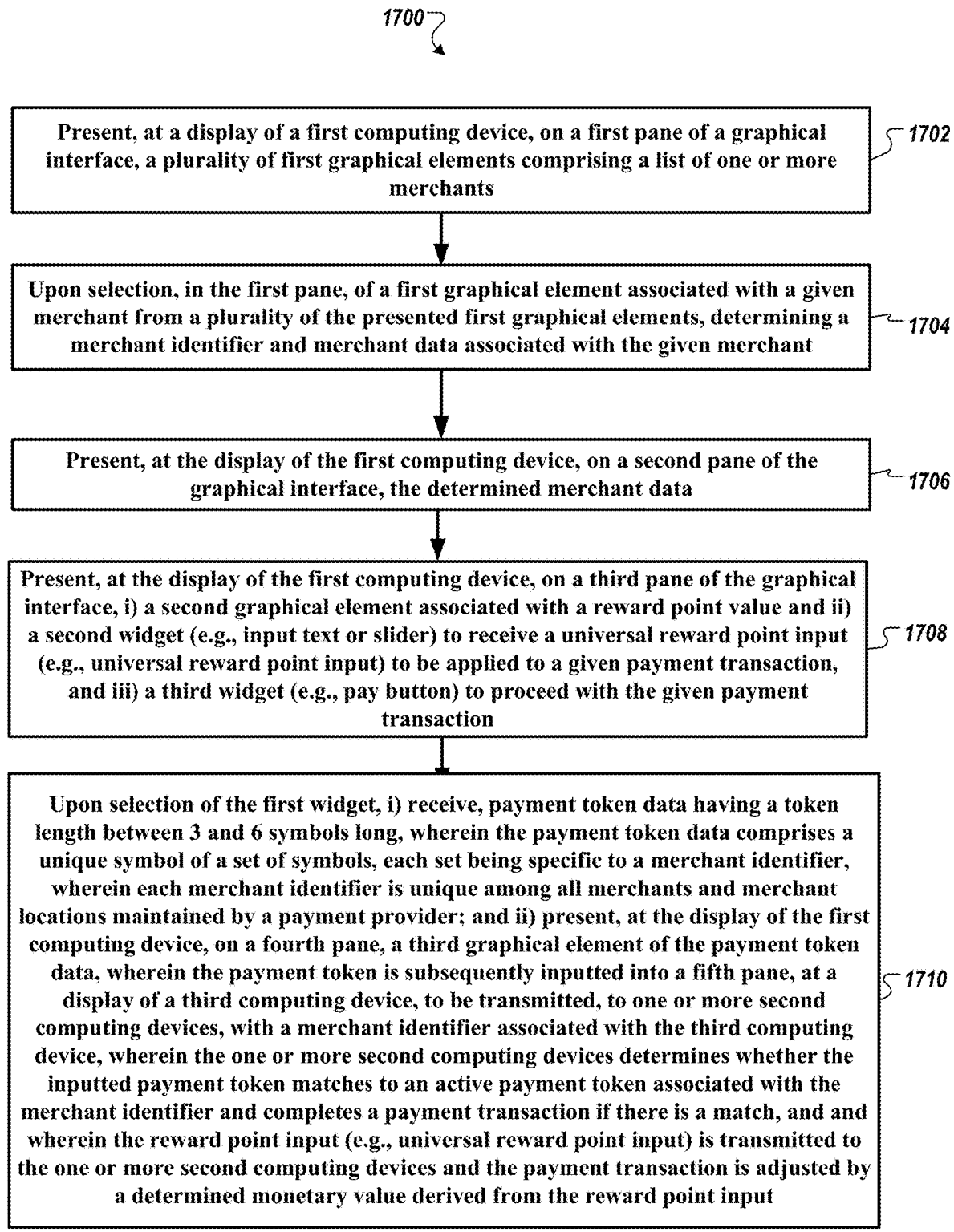

FIG. 17 show a method 1700 for conducting a secure payment transaction (e.g., a payment that includes in part, or whole, reward points (e.g., universal reward points) in the payment) for a user having an authenticatable ID via a mobile computing device associated with the user. The method 1700 includes, presenting (1702), via a processor, at a display of a first computing device (e.g., user device), on a first pane of a graphical interface, a plurality of first graphical elements comprising a list of one or more merchants (e.g., FIG. 3B).

The method 1700 includes, upon selection, in the first pane (e.g., Merchant list), of a first graphical element associated with a given merchant from a plurality of the presented first graphical elements, determining (1704) merchant identifier and merchant data associated with the given merchant (e.g., via a API call to Facebook or Google Map). The method 1700 includes, presenting (1706), via the processor, at the display of the first computing device, on a second pane (e.g., Merchant information screen) of the graphical interface, the determined merchant data and a first widget (e.g., a checkout button) associated with a payment transaction. This is, for example, shown as described in relation to FIG. 3C.

The method 1700 includes, upon selection of the first widget (e.g., the checkout button), presenting (1708), via the processor, at the display of the first computing device, on a third pane (e.g., rewards screen) of the graphical interface, i) a second graphical element associated with a reward point value (e.g., universal reward point value) associated with the authenticatable ID of the user, ii) a second widget (e.g., input text or slider) to receive a universal reward point input (e.g., universal reward point input) to be applied to a given payment transaction, and iii) a third widget (e.g., pay button) associated with the given payment transaction. This is, for example, shown in FIG. 9A.

The method 1700 includes, upon selection of the third widget (e.g., the pay button), receiving (1710), by the processor, payment token data having a token length selected from the group consisting of 3, 4, 5, and 6 symbols (e.g., number or alphanumerical symbols), wherein the payment token data comprises a unique symbol among a set of symbols, each set being specific to each merchant identifier, and wherein each merchant identifier is unique among all merchants and merchant stores maintained by a payment provider; and presenting (1710), by the processor, at the display of the first computing device, on a fourth pane (e.g., a token screen) (e.g., FIG. 3D), a third graphical element of the payment token data, wherein the payment token is subsequently inputted into a fifth pane (e.g., Merchant payment screen, e.g., FIG. 4D), at a display of a third computing device (e.g., a merchant device), to be transmitted, to one or more second computing devices (e.g., the payment servers), with a merchant identifier associated with the third computing device, wherein the one or more second computing devices is configured to determine whether the inputted payment token matches an active payment token associated with the merchant identifier and to complete a payment transaction if there is a match, and wherein the reward point input (e.g., universal reward point input) is transmitted to the one or more second computing devices and the payment transaction is adjusted by a determined monetary value derived from the reward point input (e.g., universal reward point input).

Figure 18:
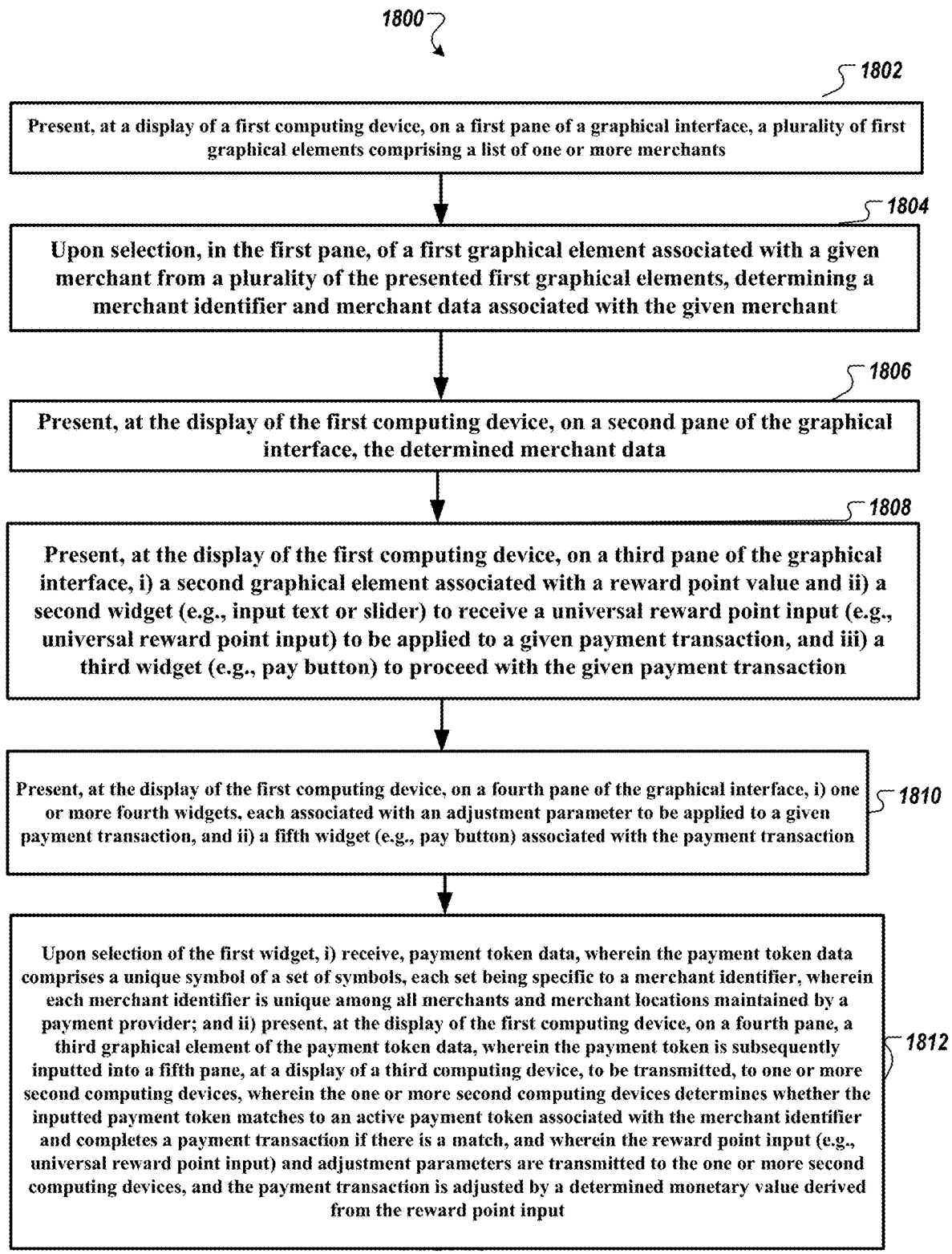

FIG. 18 shows a method 1800 for conducting a secure payment transaction (e.g., a payment that includes in part, or whole, reward points, e.g., universal reward points, in the payment and that allows the user to make adjustments to the cost) for a user having an authenticatable ID via a mobile computing device associated with the user. The method 1800 includes, presenting (1802), via a processor, at a display of a first computing device (e.g., user device), on a first pane of a graphical interface, a plurality of first graphical elements comprising a list of one or more merchants (e.g., FIG. 3B).

The method 1800 includes, upon selection, in the first pane (e.g., Merchant list), of a first graphical element associated with a given merchant from a plurality of presented first graphical elements, determining (1804) merchant identifier and merchant data associated with the given merchant (e.g., via a API call to Facebook or Google Map). The method 1800 includes, presenting (1806), via the processor, at the display of the first computing device, on a second pane (e.g., Merchant information screen) (e.g., FIG. 3C) of the graphical interface, the determined merchant data and a first widget (e.g., a checkout button) associated with a payment transaction.

The method 1800 includes, upon selection of the first widget (e.g., the checkout button), presenting (1808), via the processor, at the display of the first computing device, on a third pane (e.g., rewards screen) of the graphical interface, i) a second graphical element associated with a reward point value (e.g., universal reward point value) associated with the authenticatable ID of the user, ii) a second widget (e.g., input text or slider) to receive a reward point input (e.g., universal reward point input) to be applied to a given payment transaction, and iii) a third widget (e.g., pay button) associated with the payment transaction. This is, for example, shown in FIG. 9A.

The method 1800 includes, upon selection of the first widget (e.g., the checkout button), presenting (1810), via the processor, at the display of the first computing device, on a fourth pane (e.g., adjustment screen, e.g., to include tip) (e.g., FIG. 9C) of the graphical interface, i) one or more fourth widgets (e.g., input text or slider), each associated with an adjustment parameter (e.g., tip, coupon codes, etc.) to be applied to a given payment transaction, and ii) a fifth widget (e.g., pay button) associated with the payment transaction.

The method 1800 includes, upon selection of the fifth widget (e.g., the pay button), receiving (1812), by the processor, payment token data having a token length selected from the group consisting of 3, 4, 5, and 6 symbols (e.g., number or alphanumerical symbols), wherein the payment token data comprises a unique symbol among a set of symbols, each set being specific to each merchant identifier, and wherein each merchant identifier is unique among all merchants and merchant stores maintained by a payment provider; and presenting, by the processor, at the display of the first computing device, on a fifth pane (e.g., a token screen) (e.g., FIG. 3D), a third graphical element of the payment token data, wherein the payment token is subsequently inputted into a sixth pane (e.g., Merchant payment screen) (e.g., FIG. 4d), at a display of a third computing device (e.g., a merchant device) to be transmitted, to one or more second computing devices, (e.g., the payment servers) with a merchant identifier associated with the third computing device, wherein the one or more second computing devices is configured to determine whether the inputted payment token matches an active payment token associated with the merchant identifier and to complete a payment transaction if there is a match, and wherein the reward point input (e.g., universal reward point input) and the one or more adjustment parameters are transmitted to the one or more second computing devices and the payment transaction is adjusted by a determined monetary value derived from the reward point input (e.g., universal reward point input) and by the one or more adjustment parameters.

Figure 19:
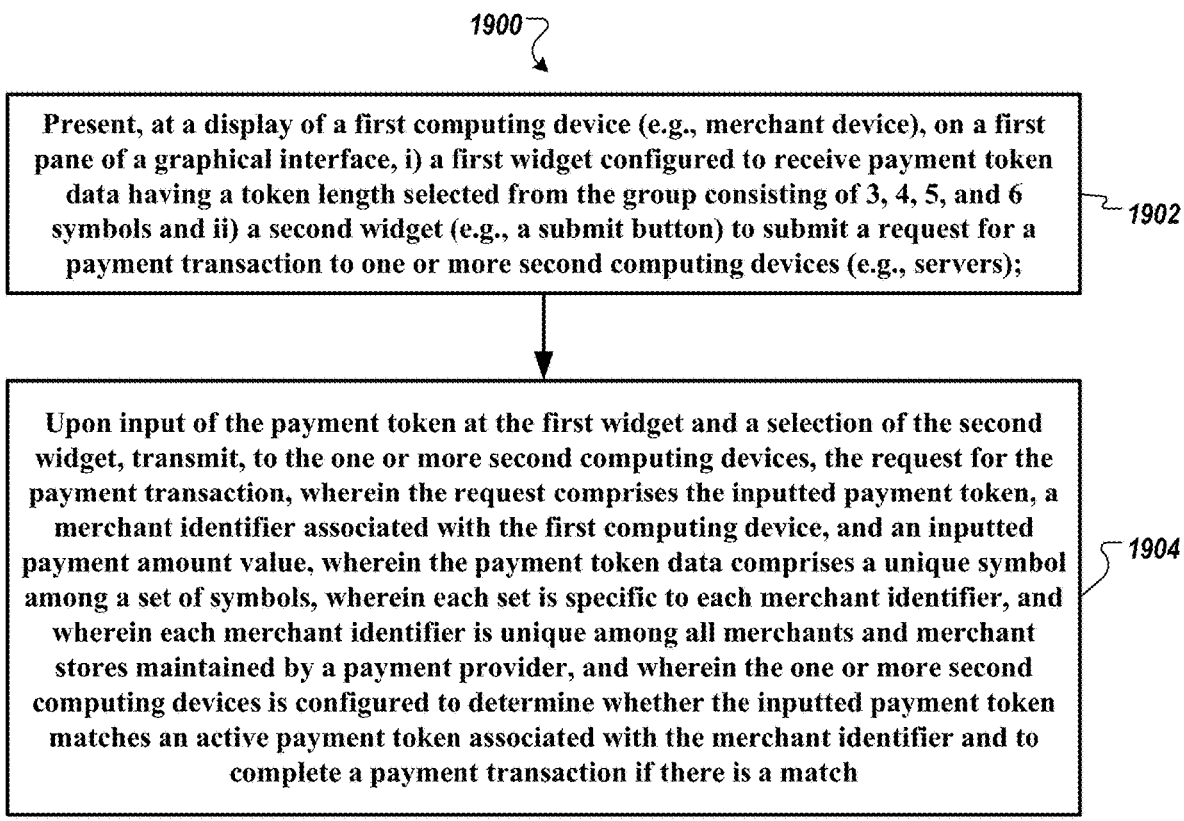

FIG. 19 shows a method 1900 for conducting a secure payment transaction for a merchant via a computing device associated with the merchant. The method 1900 includes presenting (1902), via a processor, at a display of a first computing device (e.g., merchant device) (e.g., FIG. 4D), on a first pane of a graphical interface, i) a first widget configured to receive payment token data having a token length selected from the group consisting of 3, 4, 5, and 6 symbols (e.g., number or alphanumerical symbols) and ii) a second widget (e.g., a submit button) to submit a request for a payment transaction to one or more second computing devices (e.g., payment servers, e.g., in the cloud).

The method 1900 includes, upon input of the payment token at the first widget and a selection of the second widget, transmitting (1904), by the processor, to the one or more second computing devices, the request for the payment transaction, wherein the request comprises the inputted payment token, a merchant identifier associated with the first computing device, and an inputted payment amount value, wherein the payment token data comprises a unique symbol among a set of symbols, wherein each set is specific to each merchant identifier, and wherein each merchant identifier is unique among all merchants and merchant stores maintained by a payment provider, and wherein the one or more second computing devices is configured to determine whether the inputted payment token matches an active payment token associated with the merchant identifier and to complete a payment transaction if there is a match.

Figure 20:
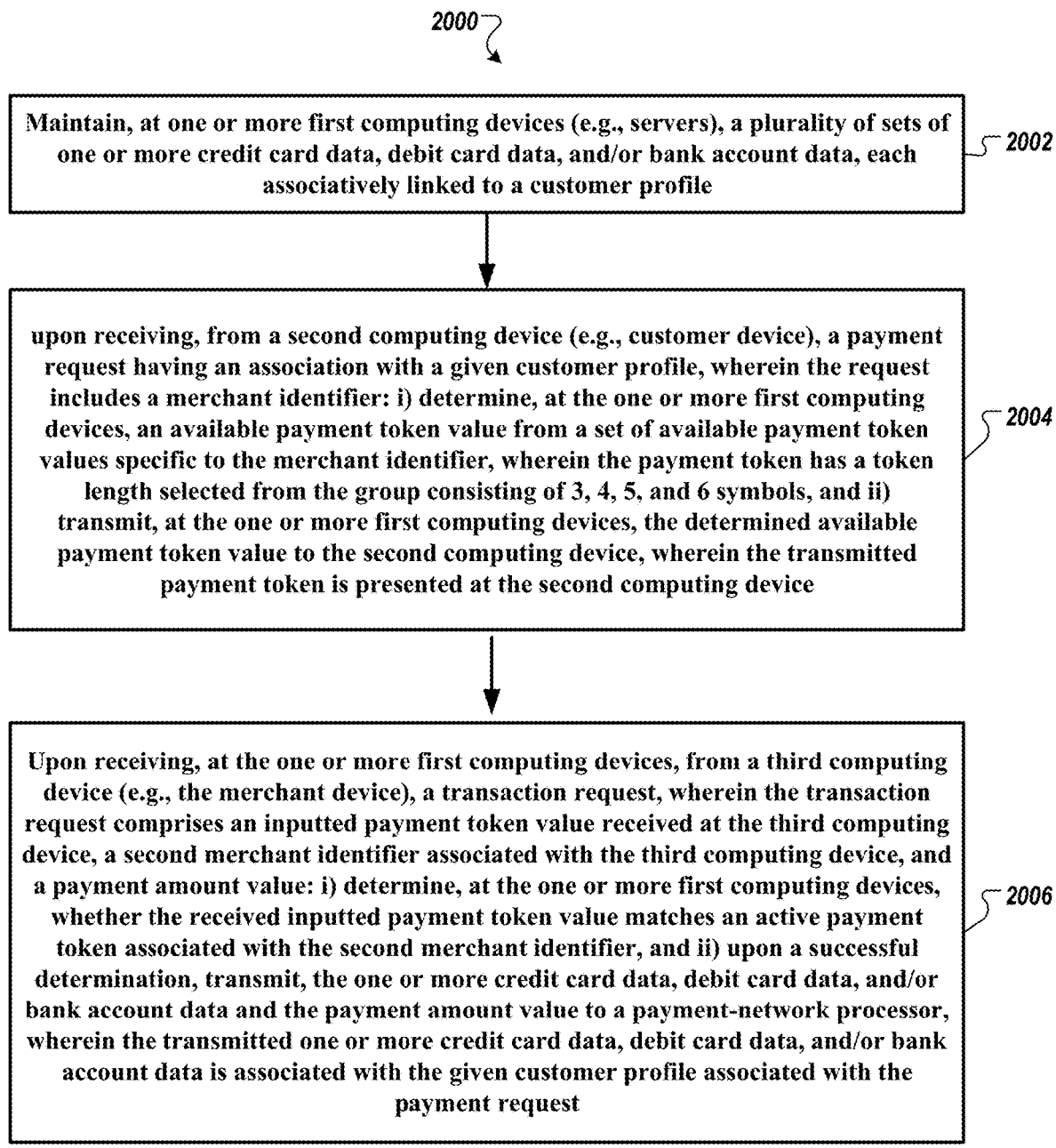

FIG. 20 shows a method 2000 (e.g., of operating servers) for conducting a secure payment transaction between a mobile computing device associated with a customer and a computing device associated with a merchant. The method 2000 includes, maintaining (2002), at one or more first computing devices (e.g., Sionic AWS), a plurality of sets of one or more credit card data, debit card data, and/or bank account data, each associatively linked to a customer profile. The method 2000 includes, upon receiving, from a second computing device (e.g., customer device), a payment request having an association with a given customer profile, wherein the request includes a merchant identifier: determining (2004), (e.g., via a random process), at the one or more first computing devices, an available payment token value from a set of available payment token values specific to the merchant identifier, wherein the payment token has a token length selected from the group consisting of 3, 4, 5, and 6 symbols; and transmitting (2004), at the one or more first computing devices, the determined available payment token value to the second computing device, wherein the transmitted payment token is presented at the second computing device. The method 2000 includes, upon receiving, at the one or more first computing devices, from a third computing device (e.g., the merchant device), a transaction request, wherein the transaction request comprises an inputted payment token value received at the third computing device, a second merchant identifier associated with the third computing device, and a payment amount value: determining (2006), by the processor, at the one or more first computing devices, whether the received inputted payment token value matches an active payment token associated with the second merchant identifier; and, upon a successful determination, transmitting (2006), by the processor, the one or more credit card data, debit card data, and/or bank account data and the payment amount value to a payment-network processor, wherein the transmitted one or more credit card data, debit card data, and/or bank account data is associated with the given customer profile associated with the payment request.

Figure 21:
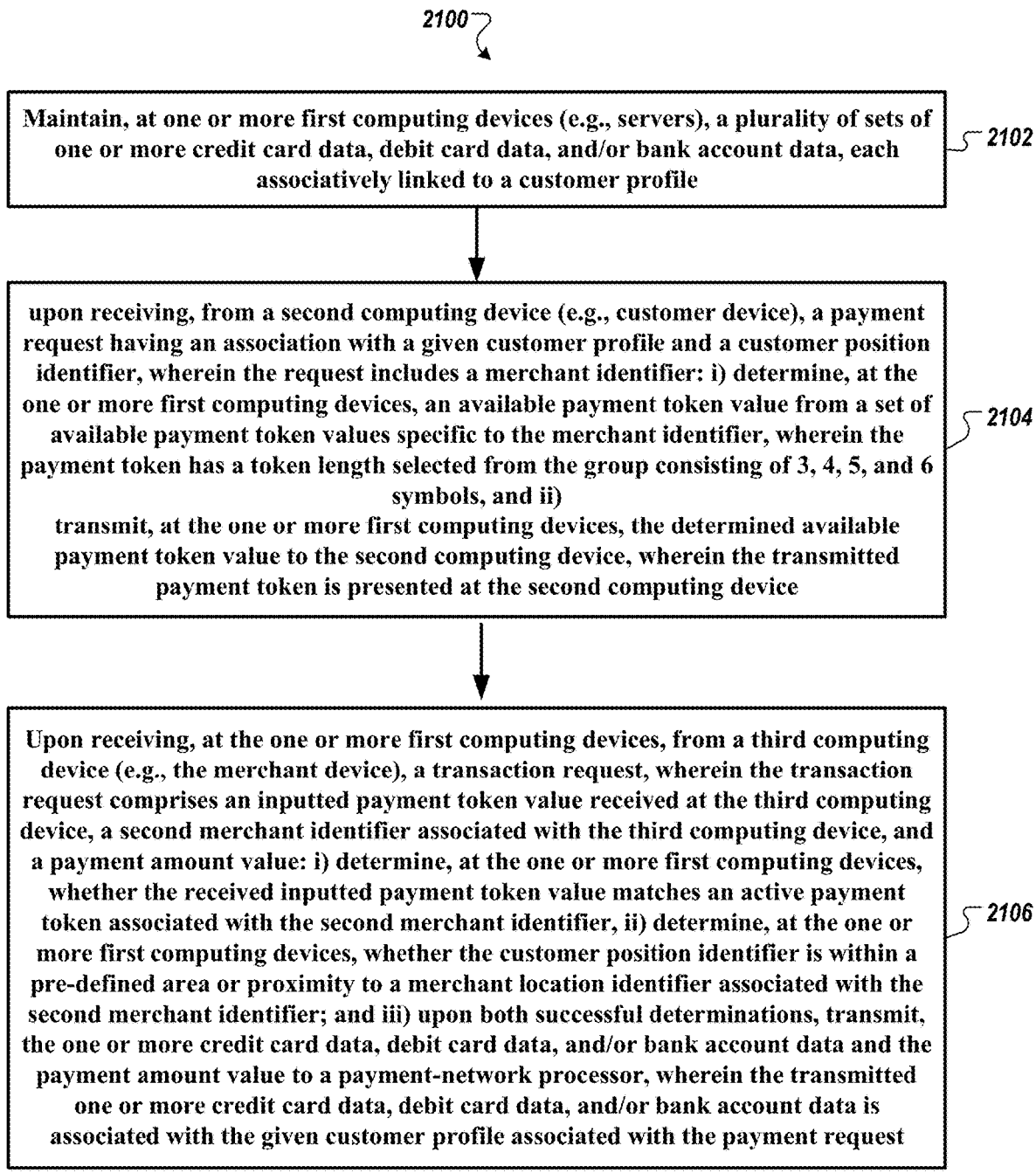

FIG. 21 shows a method 2100 (e.g., of operating servers) for conducting a secure payment transaction between a mobile computing device associated with a customer and a computing device associated with a merchant. The method 2100 includes, maintaining (2102), at one or more first computing devices (e.g., servers, e.g., in the cloud), a plurality of sets of one or more credit card data, debit card data, and/or bank account data, each associatively linked to a customer profile. The method 2100 includes, upon receiving, from a second computing device (e.g., customer device), a payment request having an association with a given customer profile, wherein the request includes a merchant identifier and a customer position identifier (e.g., GPS or MPS coordinates, e.g., latitude and longitude) corresponding to a position of the second computing device: determining (2104), (e.g., via a random process), at the one or more first computing devices, an available payment token value from a set of available payment token values specific to the merchant identifier, wherein the available payment token has a token length selected from the group consisting of 3, 4, 5, and 6 symbols; and transmitting (2104), at the one or more first computing devices, the determined available payment token value to the second computing device, wherein the transmitted payment token is presented at the second computing device. The method 2100 includes, upon receiving, at the one or more first computing devices, from a third computing device (e.g., the merchant device), a transaction request, wherein the transaction request comprises an inputted payment token value received at the third computing device, a second merchant identifier associated with the third computing device, and a payment amount value: determining (2106), by the processor, at the one or more first computing devices, whether the received inputted payment token value matches an active payment token associated with the second merchant identifier; and determining (2106), by the processor, at the one or more first computing devices, whether the customer position identifier is within a pre-defined area or proximity to a merchant location identifier associated with the second merchant identifier; and, upon both successful determinations, transmitting (2106), by the processor, the one or more credit card data, debit card data, and/or bank account data and the payment amount value to a payment-network processor, wherein the transmitted one or more credit card data, debit card data, and/or bank account data is associated with the given customer profile associated with the payment request.

Figure 22:
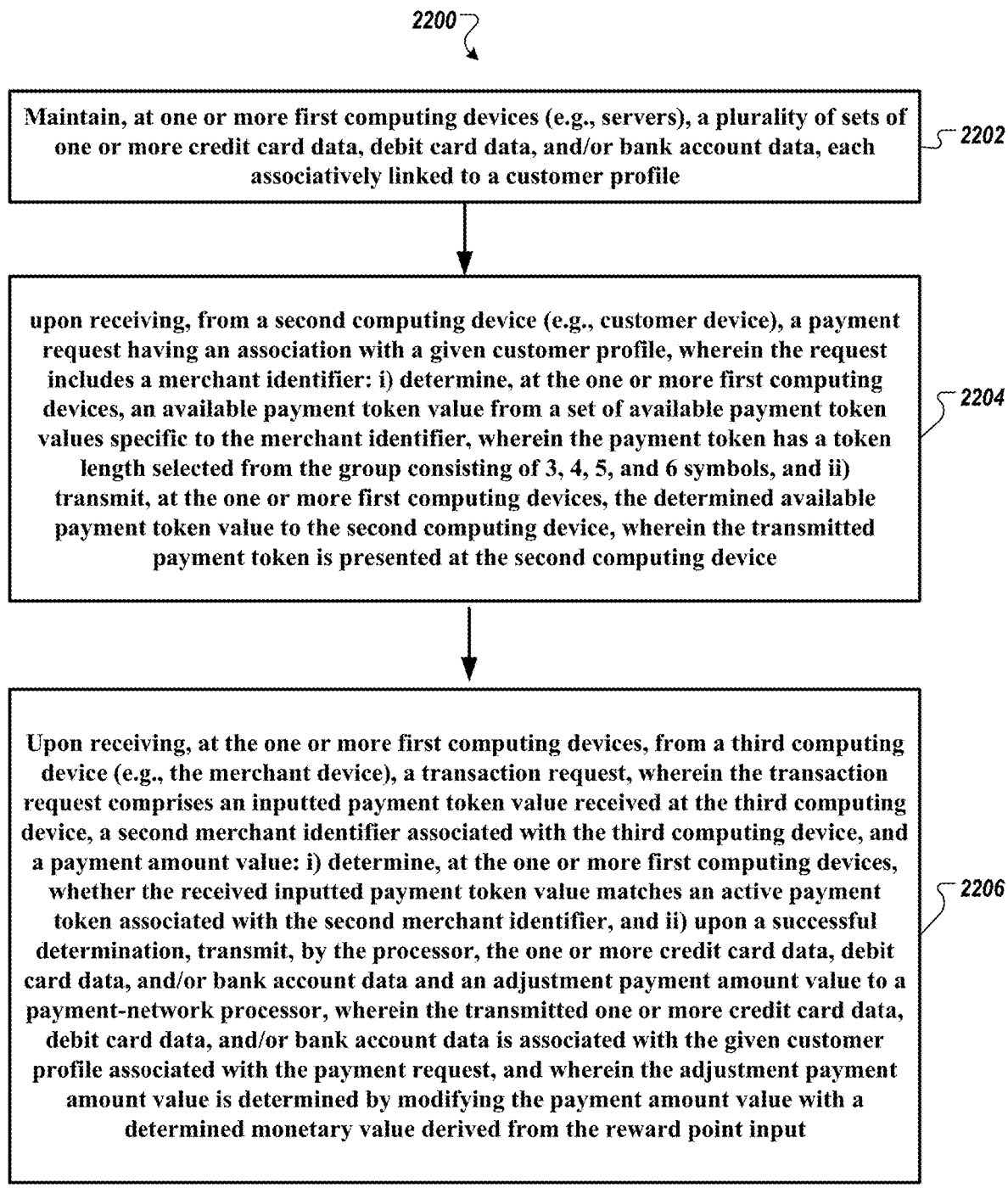

FIG. 22 shows a method 2200 (e.g., of operating servers) for conducting a secure payment transaction (e.g., a payment that includes in part, or whole, reward points (e.g., universal reward points) in the payment) between a mobile computing device associated with a customer and a computing device associated with a merchant. The method 2200 includes, maintaining (2202), at one or more first computing devices (e.g., servers, e.g., in the cloud), a plurality of sets of one or more credit card data, debit card data, and/or bank account data, each associatively linked to a customer profile. The method 2200 includes, upon receiving, from a second computing device (e.g., customer device), a payment request having an association with a given customer profile, wherein the request includes a merchant identifier and a reward point input (e.g., universal reward point input) to be applied to a given payment transaction: determining (2204), (e.g., via a random process), at the one or more first computing devices, an available payment token value from a set of available payment token values specific to the merchant identifier, wherein the payment token has a token length selected from the group consisting of 3, 4, 5, and 6 symbols; and transmitting (2204), at the one or more first computing devices, the determined available payment token value to the second computing device, wherein the transmitted payment token is presented at the second computing device. The method 2200 includes, upon receiving, at the one or more first computing devices, from a third computing device (e.g., the merchant device), a transaction request, wherein the transaction request comprises an inputted payment token value received at the third computing device, a second merchant identifier associated with the third computing device, and a payment amount value: determining (2206), by the processor, at the one or more first computing devices, whether the received inputted payment token value matches an active payment token associated with the second merchant identifier; and, upon a successful determination, transmitting (2206), by the processor, the one or more credit card data, debit card data, and/or bank account data and an adjustment payment amount value to a payment-network processor, wherein the transmitted one or more credit card data, debit card data, and/or bank account data is associated with the given customer profile associated with the payment request, and wherein the adjustment payment amount value is determined by modifying (e.g., subtracting) the payment amount value with a determined monetary value derived from the reward point input (e.g., universal reward point input).

Example Computing Device

Figure 23:
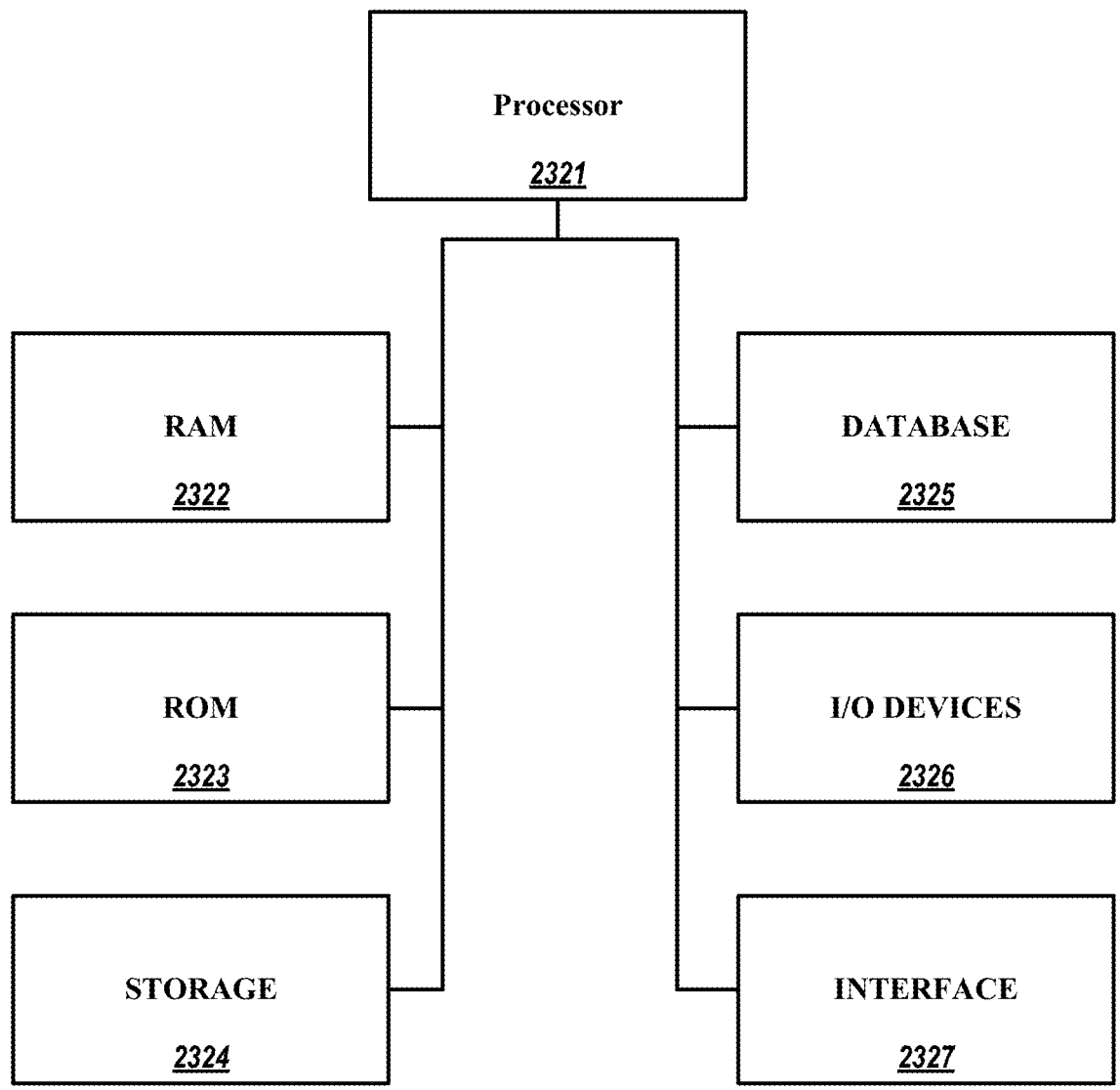
FIG. 23 depicts a diagram of an exemplary computing device.

FIG. 23 depicts a diagram of an exemplary computing device. In various aspects, the computer of FIG. 23 may comprise all or a portion of the consumer computing device, the merchant computing device, and one or more of the servers, as described herein. As used herein, "computer" may include a plurality of computers. The computers may include one or more hardware components such as, for example, a processor 2321, a random access memory (RAM) module 2322, a read-only memory (ROM) module 2323, a storage 2324, a database 2325, one or more input/output (I/O) devices 2326, and an interface 2327. Alternatively and/or additionally, controller 2320 may include one or more software components such as, for example, a computer-readable medium including computer executable instructions for performing a method associated with the exemplary embodiments. It is contemplated that one or more of the hardware components listed above may be implemented using software. For example, storage 2324 may include a software partition associated with one or more other hardware components. It is understood that the components listed above are exemplary only and not intended to be limiting.

Processor 2321 may include one or more processors, each configured to execute instructions and process data to perform one or more functions associated with a computer for indexing images. Processor 2321 may be communicatively coupled to RAM 2322, ROM 2323, storage 2324, database 2325, I/O devices 2326, and interface 2327. Processor 2321 may be configured to execute sequences of computer program instructions to perform various processes. The computer program instructions may be loaded into RAM 2322 for execution by processor 2321. As used herein, processor refers to a physical hardware device that executes encoded instructions for performing functions on inputs and creating outputs.

RAM 2322 and ROM 2323 may each include one or more devices for storing information associated with operation of processor 2321. For example, ROM 2323 may include a memory device configured to access and store information associated with controller 2320, including information for identifying, initializing, and monitoring the operation of one or more components and subsystems. RAM 2322 may include a memory device for storing data associated with one or more operations of processor 2321. For example, ROM 2323 may load instructions into RAM 2322 for execution by processor 2321.

Storage 2324 may include any type of mass storage device configured to store information that processor 2321 may need to perform processes consistent with the disclosed embodiments. For example, storage 2324 may include one or more magnetic and/or optical disk devices, such as hard drives, CD-ROMs, DVD-ROMs, or any other type of mass media device.

Database 2325 may include one or more software and/or hardware components that cooperate to store, organize, sort, filter, and/or arrange data used by controller 2320 and/or processor 2321. For example, database 2325 may store hardware and/or software configuration data associated with input-output hardware devices and controllers, as described herein. It is contemplated that database 2325 may store additional and/or different information than that listed above.

I/O devices 2326 may include one or more components configured to communicate information with a user associated with controller 2320. For example, I/O devices may include a console with an integrated keyboard and mouse to allow a user to maintain a database of images, update associations, and access digital content. I/O devices 2326 may also include a display including a graphical user interface (GUI) for outputting information on a monitor. I/O devices 2326 may also include peripheral devices such as, for example, a printer for printing information associated with controller 2320, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 2327 may include one or more components configured to transmit and receive data via a communication network, such as the Internet, a local area network, a workstation peer-to-peer network, a direct link network, a wireless network, or any other suitable communication platform. For example, interface 2327 may include one or more modulators, demodulators, multiplexers, demultiplexers, network communication devices, wireless devices, antennas, modems, and any other type of device configured to enable data communication via a communication network.

Secure Cardless Automated Teller Machine (ATM) Transaction

Figure 24:
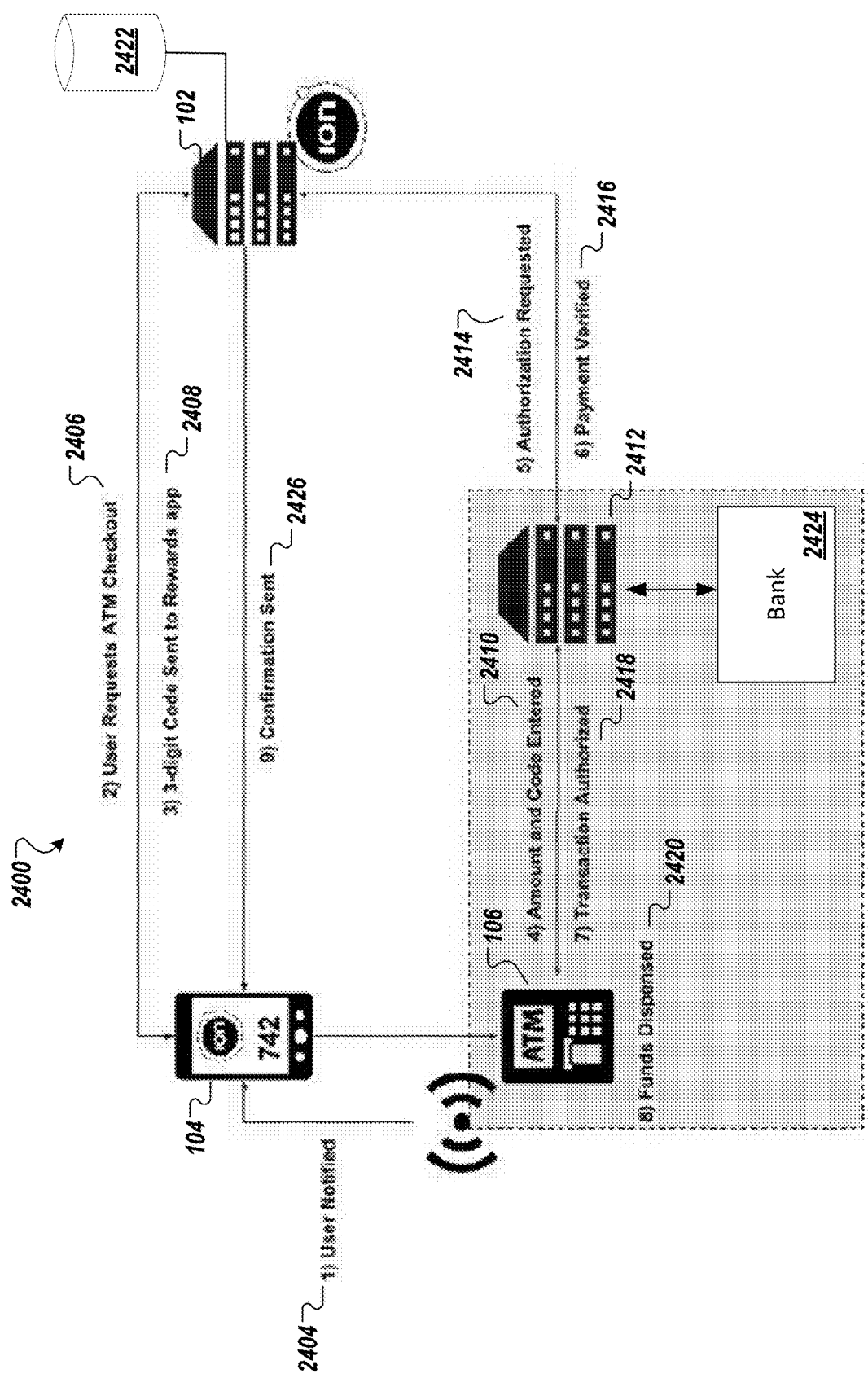
FIG. 24 depicts a diagram of an exemplary architecture for conducting a secure cardless ATM transaction, in accordance with an illustrative embodiment.

FIG. 24 depicts a diagram 2400 of an exemplary architecture for conducting a secure cardless ATM transaction, in accordance with an illustrative embodiment. As shown in FIG. 24, a user device 104 (e.g., mobile device) executes an application that lists (shown as "1. User Notified" 2404) an ATM device 106 in a marketplace pane. In some embodiments, the ATM device is presented in a marketplace pane in a Merchant Marketplace in a similar manner as merchant store 106 are added and displayed in the marketplace plane, as discussed in relation to FIG. 1. A consumer accessing the user device 104 can use the marketplace (i.e., application) to locate an ATM device in their area or proximity.

Using either a linked payment method or an available rewards balance, or a combination of the two, the consumer can request a cash withdrawal from the user device 104 in a cardless transaction with an ATM device (e.g., 2402). In some embodiments, upon a selection, at the user device 104, of an ATM device (e.g., 2402) from the presented list of selectable ATM devices (and/or a selection of a cardless ATM transaction), the user device 104 transmits (shown as operation "2. User Requests ATM Checkout" 2406) a transaction request (e.g., an encrypted request) to a transaction service provider 102 (which is similar, and in some instances, the same, as a payment service provider 102, as discussed in relation to FIG. 1). The request includes a unique identifier that is associated with the selected ATM device (which is unique among all ATM devices and among all ATM providers and merchants associated with the transaction service provider 102). The transaction service provider 102 provides (shown as operation "3. 3-digit Code Sent to Rewards App" 2408), e.g., over a secured or encrypted channel or in a secured or encrypted message, a transaction token data 210 (e.g., similar to payment token data 210 as discussed in relation to FIG. 2), to initiate a cash withdrawal transaction. The transactional token data 210 is temporarily assigned, by the transaction service provider 102, and is unique to a given ATM identifier. The transaction token data 210, in some embodiments, has a length between 3 and 6 symbols and is presented at an interface of the user device 104.

Without having to provide authentication means (e.g., a debit card, a bank card, or bank account data) to the ATM device 106, the user can then enter, into a graphical user interface of the ATM device 106, at an appropriate screen, a request to withdraw cash. Because no debit card or no other physical token is needed to be inserted into the ATM, the transaction is cardless. In some embodiments, proximity data associated with the ATM device 106 and/or location data associated with the user device 104 with respect to a location of the ATM device 106 is used in the authentication process.

Referring still to FIG. 24, at the ATM device, the user can access a request screen (as indicated above, without having to provide an authentication means), and then in the same or one or more subsequent screens later, is presented an input for a withdrawal amount and an input to receive a transaction token (e.g., 210) to validate and to authenticate the transaction. Upon receiving the transactional token (having only between 3 and 6 symbols) at the ATM device 106, the ATM device 106 transmits (shown as "operation 4. Amount and Code Entered" 2410) the request for cash withdrawal (for the inputted amount) and the inputted transaction token to an ATM provider system 2412. The ATM provider system 2412 transmits (shown as "5. Authorization Requested" 2414) the inputted transaction token and an ATM identifier to the transaction service provider 102. The inputted transactional token and the ATM identifier (sent in the request 2414) are compared to the transactional token and the ATM identifier received from the user device 104 (e.g., at step 2406). Upon a successful match, the transaction service provider 102 transmits (shown as "6. Payment Verified" 2416) a successful authenticated message to the ATM provider system 2412. The ATM provider system 2412, in turn, transmits a transaction authorized message (shown as "7. Transaction Authorized" 2418) to the ATM device 106. The ATM device 106 dispenses cash in this cardless transaction (shown as "8. Funds Dispensed" 2420). The transaction service provider 102 transmits (shown as "9. Confirmation Sent" 2426) a confirmation message to the user device 104.

As shown in FIG. 24, the transaction service provider 102 maintains a debit card data or bank account data 2422 (e.g., routing and account number data) associated with a given user. The information, in some embodiments, is provided by the user when setting up the account (e.g., rewards account, payment account, or transaction account) with the transaction service provider 102. In the authenticated message (e.g., 2416), the message (e.g., 2416) may be encrypted and, in some embodiments, includes debit card data or bank account data that is used by the ATM provider system 2412 to request funds from a banking institution 2424 (or the like).

Figure 25:
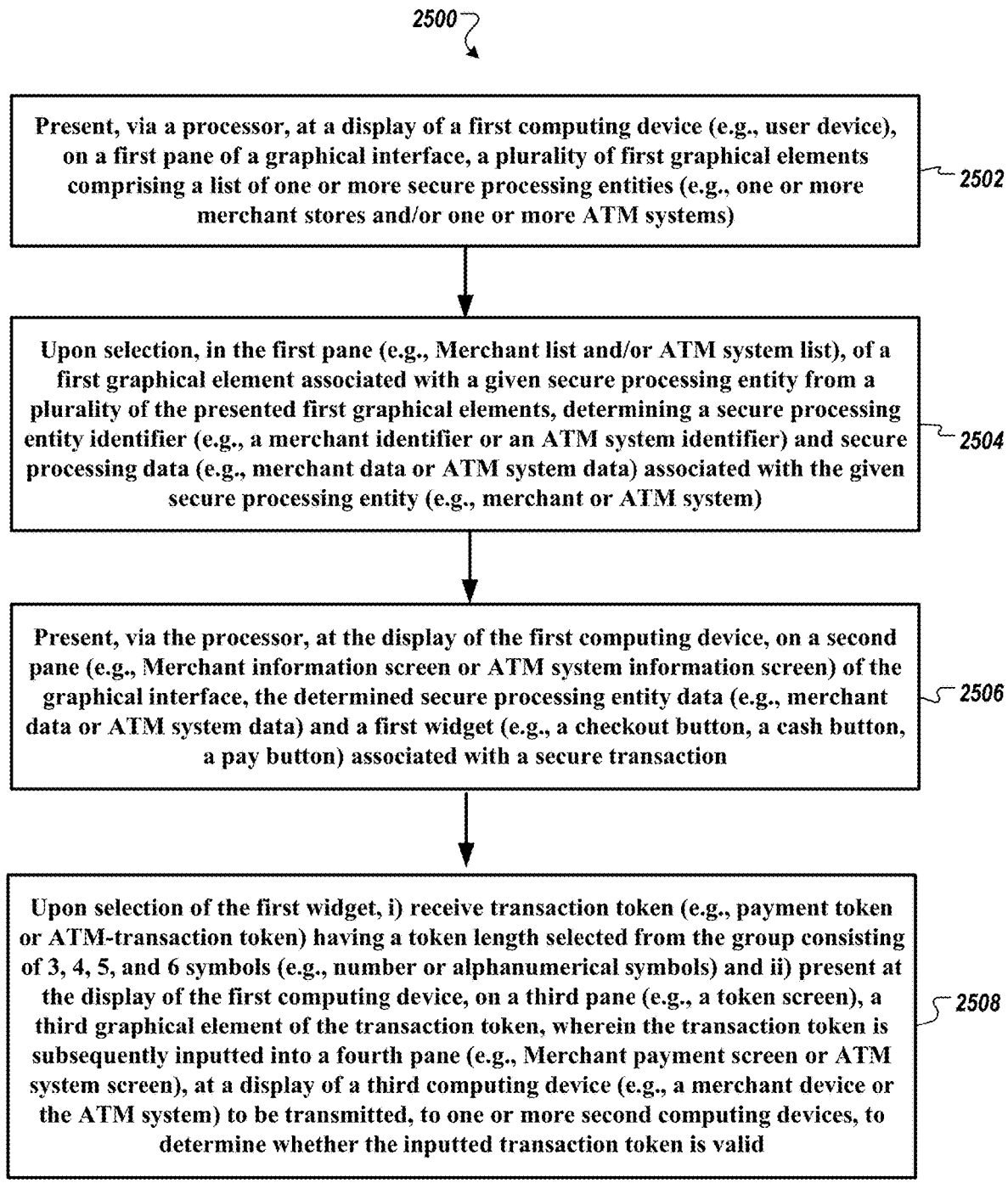
Figure 27:
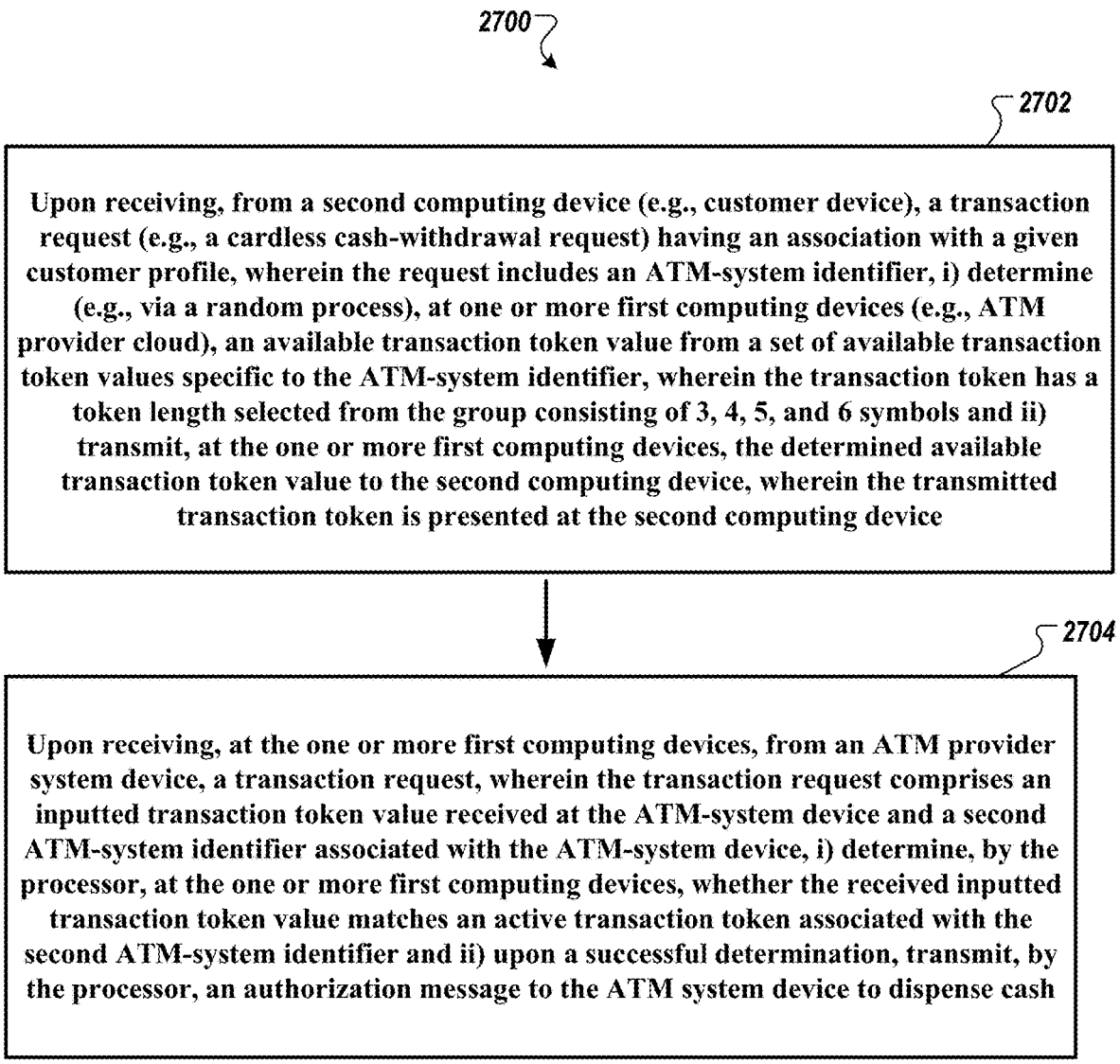

FIGS. 25, 26, 27, and 28, each depicts a flow diagram of an exemplary method for conducting a secure cardless ATM transaction, in accordance with an illustrative embodiments. In FIG. 25, a process of operating a user device to conduct a secure transaction is shown. In FIG. 26, a process, for a cardless ATM transaction, of operating a computing device at the transaction service provider when interfacing with an ATM provider is shown. In FIG. 27, a process, for a cardless ATM transaction, of operating a computing device at the ATM provider when interfacing with an ATM system is shown. In FIG. 28, a process, for a cardless ATM transaction, of operating a computing device at the transaction service provider when interfacing with an ATM provider is shown. In FIG. 278, proximity and/or location information of the user device is used as part of the authentication operation in addition to the transactional token verification.

Figure 29C:
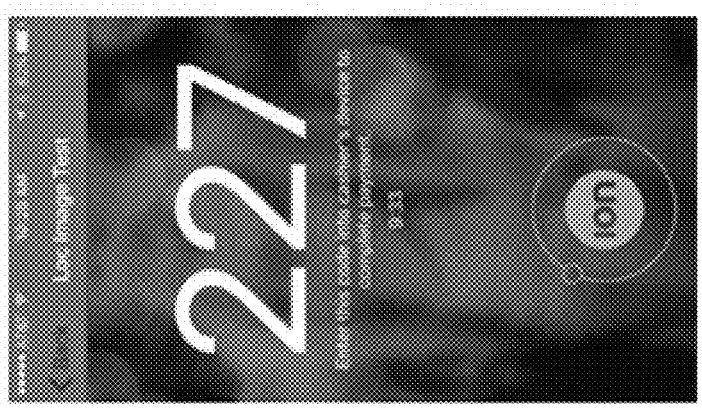
FIGS. 29A, 29B, and 29C, each depicts exemplary graphical user interface at a computing device associated with a consumer to conduct a secure cardless ATM transaction, in accordance with an illustrative embodiment.
Figure 29B:
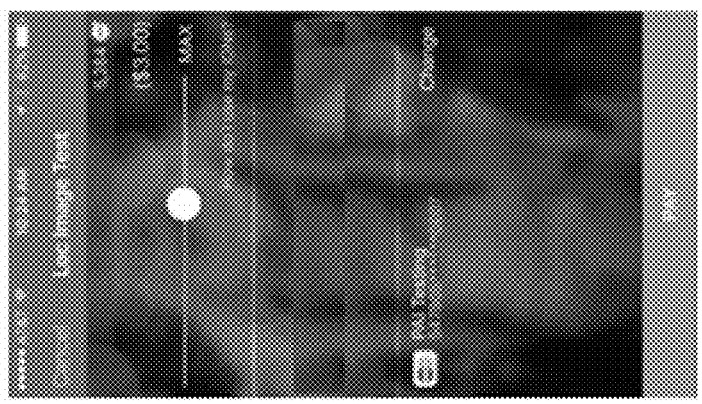
Figure 29A:

FIGS. 29A, 29B, and 29C, each depicts exemplary graphical user interface at a computing device associated with a consumer to conduct a secure cardless ATM transaction, in accordance with an illustrative embodiment. As discussed in relation to FIG. 3B, a consumer computing device is configured to present, at a display of a first computing device (e.g., user device), on a first pane 202 (e.g., a marketplace pane) of a graphical interface, a plurality of first graphical elements 302 comprising a list of one or more merchants. In FIG. 29A, the list of one or more merchants is further shown with one or more ATM devices (shown as 2902). In FIG. 29B, the consumer computing device is configured to present, at a display of a first computing device (e.g., user device), on a second pane 2904, an input to apply reward points accrued with the transaction service provider to cover a portion, or all, of a cash withdrawal request. In FIG. 29c, the consumer computing device is configured to present, at a display of a first computing device (e.g., user device), on a third pane 2906, an input to apply reward points accrued with the transaction service provider to cover a portion, or all, of a cash withdrawal request.

Figure 30A:
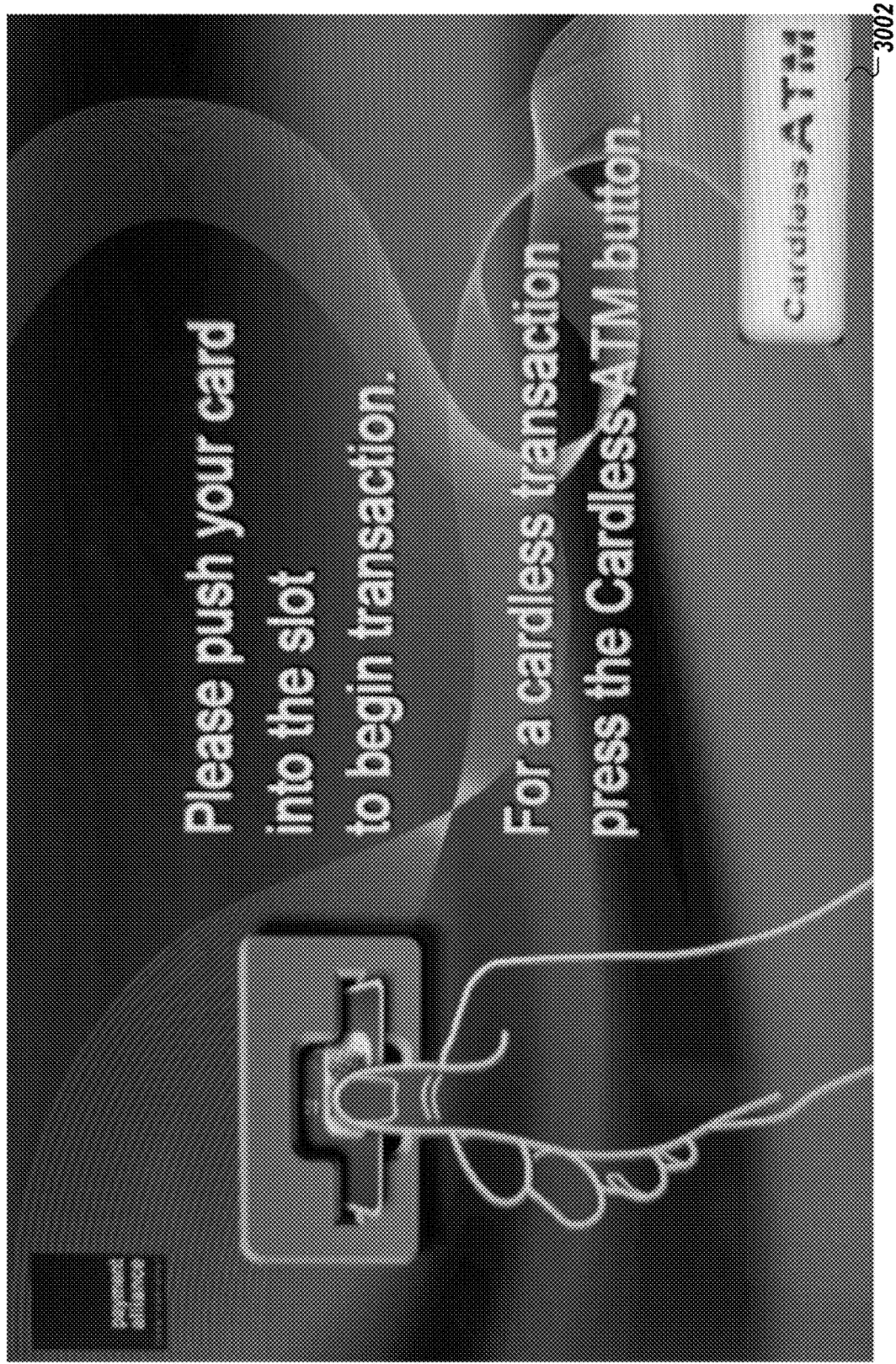
FIGS. 30A, 30B, 30C, 30D, and 30E, each depicts exemplary graphical user interface at an ATM system to conduct a secure cardless ATM transaction, in accordance with an illustrative embodiment.
Figure 30B:
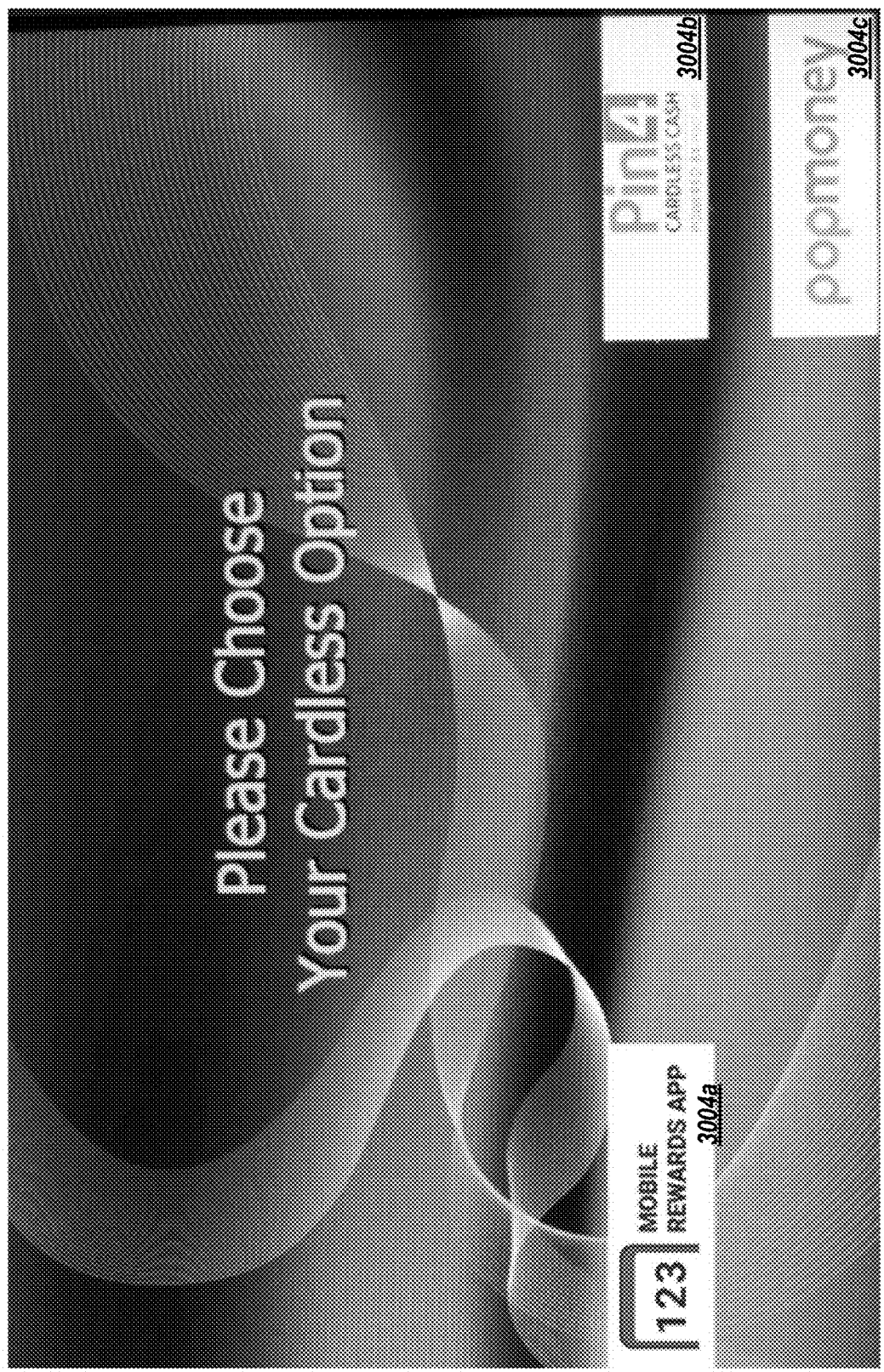

FIGS. 30A, 30B, 30C, 30D, and 30E, each depicts exemplary graphical user interface at an ATM system to conduct a secure cardless ATM transaction, in accordance with an illustrative embodiment. FIG. 30A shows an example graphical user interface 3000 for a cardless ATM transaction. The interface 3000, in some embodiments, presents an input 3002 widget to select a cardless transaction. Upon selection of the input 3002 (associated with a cardless transaction), the graphical user interface 3000, in some embodiments, presents one or more selectable inputs for cardless transaction options (shown as 3004a, 3004b, 3004c) (e.g., as shown in FIG. 30B).

Figure 30C:
Figure 30D:
Figure 30E:
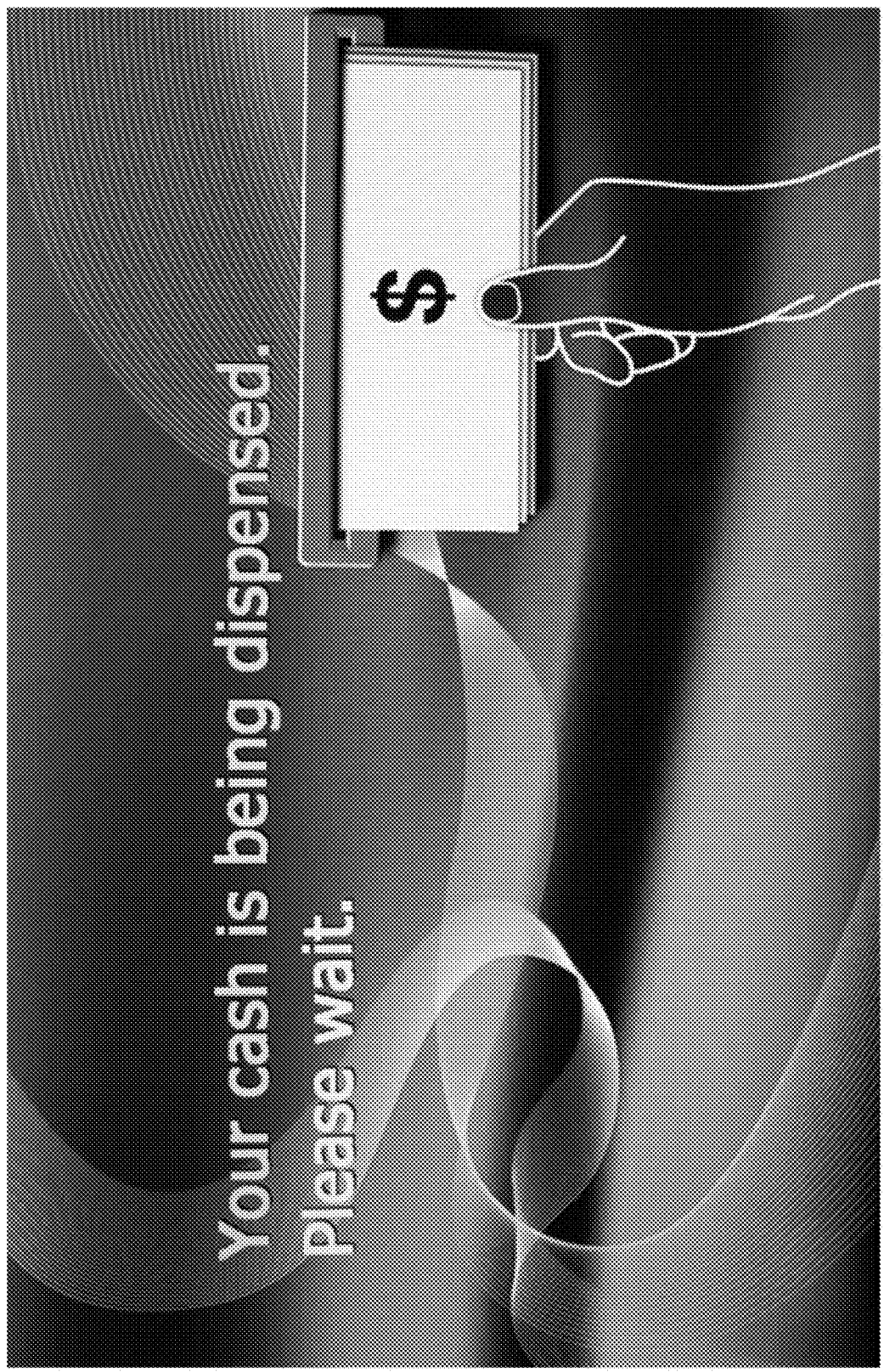

In FIG. 30C, the interface 3000 presents an input 3002 widget to input a transactional token 210, as discussed in relation to FIG. 24. Though indicated to be 3-digit code, in some embodiments, the code can be between 3 and 6 symbols in length (e.g., 3, 4, 5, or 6). The transactional token 210 is specific to the transaction that is initiated via the user device 102, as discussed and shown in relation to FIGS. 29A-29C. It is noted that no authentication code (e.g., username or password), debit card, or physical token has been used to authenticate the user's identity. Rather, only the transactional token 210 which is specific to the transaction that is initiated via the user device 102 is used. FIGS. 30D and 30E shows example GUI 3000 during the subsequent processing of the cardless ATM transaction and when cash is being dispensed from the cardless ATM transaction.

Example with Reward-Point Checkout

Following a transaction, the system is configured to calculate a number of reward points to be rewarded based on the net payment amount and the rewards percentage assigned by the merchant. In some embodiments, the amount is withheld form the merchant settlement based on the payment fee and the reward points awarded to the consumer. In some embodiments, the number of reward points is rewarded to reward accounts associated with social media accounts (i.e., "friends") linked to the consumer reward accounts.

In some embodiments, the system is configured to adjust the ledgers for all parties participating in the transaction. In some embodiments, the consumer account is adjusted via a credit for the reward points earned; debit for the reward points redeemed; and debit for any stored value used in the transaction. In some embodiments, the consumer's social media "friends" accounts (i.e., an associated account linked to the consumer account) is adjusted via credit for reward points provided by the transaction service provider as a bonus for a social media "friend's" checkout. In some embodiments, the merchant account is adjusted via a credit for reward points applied to the checkout; credit for the amount of the consumer's out-of-pocket portion of the checkout less by i) the amount of reward points credited to the consumer making the purchase and ii) the fee for payment processing due to the transaction service provider. In some embodiments, the transaction service provider account is adjusted via a credit for the payment processing fee; credit for the funds used to escrow the reward points earned by the consumer; and debit for any funds received by the merchant as a result of reward points being redeemed by a consumer as part of the checkout. In the event that a given transaction is voided or refunded, all transactions to the consumer account, consumer's social media "friends" accounts, merchant account, and transaction service provider account are reversed in the ledger.

Other adjustments to the various ledgers may be made without departing from the spirit of the disclosure.

Examples of the electronic ledger and processing systems is discussed in U.S. patent application Ser. No. 13/907,300, filed May 31, 2013, title "System and Method for Securely Managing Delivery and Redemption of Location-Based Incentives and Customer Loyalty Rewards to Mobile Devices," and in U.S. Pat. No. 9,542,691, each of which is incorporated by reference herein in its entirety.

In some embodiments, upon completion of the checkout transaction, the system is configured to send, to the merchant (e.g., a loyalty app or status dashboard associated with the merchant account), confirmation that the payment (e.g., full payment) was successfully processed. In some embodiments, the tips are separated from the payment to help with reconciliation. The system is also configured to send, to the consumer (e.g., a rewards app or a status dashboard associated with the consumer account), a receipt indicating i) an initial amount of the checkout, a tip amount charged to the consumer's designated form of payment, a number of ION's redeemed and the corresponding dollar amount deducted from the payment amount. Other information may be sent to the merchant the consumer without departing from the spirit of the disclosure.

Although example embodiments of the present disclosure have been described with reference to specific example embodiments, it will be evident that various modifications and changes may be made to these embodiments without departing from the broader spirit and scope of the disclosure.

What is claimed is:

1. A method for conducting a secure payment transaction for a user having an authenticatable ID, the method comprising:

presenting, by a processor of a mobile computing device, at the display of the mobile computing device, on a login pane of a graphical user interface for a payment application executing on the mobile computing device, a prompt for an authenticatable ID of a user for authenticating a user to receive a payment token;

receiving, by the processor of the mobile computing device, from one or more computing devices associated with a payment provider, data of one or more merchants serviced by the payment provider, wherein the data of the one or more merchants serviced by the payment provider include a merchant identifier for each of the one or more merchants;

presenting, by the processor of the mobile computing device, at the display of the mobile computing device on a first pane of the graphical user interface, a plurality of first graphical elements comprising a list of one or more merchants from the received data of the one or more merchants serviced by the payment provider;

transmitting, by the processor of the mobile computing device, from the mobile computing device, to the one or more computing devices, a received first merchant identifier;

determining, by the one or more computing devices from a database, merchant data associated with the received first merchant identifier;

maintaining, by the one or more computing devices, unique merchant identifiers among all merchants and merchant stores serviced by the payment provider, including the first merchant identifier;

receiving, by the processor of the mobile computing device, from the one or more computing devices, the determined merchant data associated with the first merchant identifier;

presenting, by the processor of the mobile computing device, at the display of the mobile computing device on a second pane of the graphical user interface, the received merchant data for a merchant associated with the first merchant identifier and a first widget associated with a payment transaction for the merchant associated with the first merchant identifier;

receiving, by the processor of the mobile computing device, an input from the first widget associated with the payment transaction for the merchant associated with the first merchant identifier;

transmitting, by the processor of the mobile computing device, a request to initiate a payment transaction for the merchant associated with the first merchant identifier;

determining, by the one or more computing devices from the request, symbols of a payment token for the payment transaction for the merchant associated with the first merchant identifier, wherein the symbols of the payment token comprise only three symbols, wherein the payment token has an associated expiration time, and wherein determining the symbols of the payment token consists of:

determining a first numerical symbol of the symbols;

determining a second numerical symbol of the symbols; and determining a unique symbol among a set of symbols of the symbols;

determining, by the one or more computing devices, whether a first verification token associated with the merchant computing device associated with the first merchant identifier matches the payment token associated with the first merchant identifier within the associated expiration time;

receiving, by the processor of the mobile computing device, from the one or more computing devices, the determined payment token including the symbols; and presenting, by the processor of the mobile computing device, at the display of the mobile computing device on a third pane of the graphical user interface, a third graphical element of the received payment token, wherein a merchant payment application executing at the merchant computing device associated with the first merchant identifier is presenting a merchant graphical user interface, the merchant graphical user interface receiving i) the first verification token and ii) an associated first payment amount for the payment transaction, and wherein the merchant payment application is receiving the first verification token and the first payment amount inputted at the merchant graphical user interface, the merchant computing device transmitting the received first verification token and received first payment amount to the one or more computing devices and wherein the one or more computing devices is processing the payment transaction for at least the first payment amount based on the match.

2. The method of claim 1, wherein each of the symbols of the payment token comprise a number or an alphanumerical symbol.

3. The method of claim 1, wherein the merchant data for each given merchant includes: a merchant name; a merchant address; and a telephone number or email address.

4. The method of claim 3, wherein the merchant data for each given merchant further includes a business hour information.

5. The method of claim 1, further comprising the one or more computing devices determining a reward point value based on the payment transaction and updating a reward point account associated with the user using the determined reward point value.

6. A method of claim 1, further comprising the mobile computing device arranging the list of the one or more merchants by proximity of respective merchants associated with the list to a location of the mobile computing device.

7. A method of claim 1, further comprising the mobile computing device arranging the list of one or more merchants based on the alphanumerical ordering of a name associated with each merchant in the list of the one or more merchants.

8. The method of claim 1, further comprising:

transmitting, by the mobile computing device, a location identifier associated with the mobile computing device to the one or more computing devices, wherein the one or more computing devices is determining whether the location identifier associated with the mobile computing device is within an area value with, or distance value to, a merchant location identifier associated with the mobile computing device, and wherein the determination is used in the processing of the payment transaction for the first payment amount.

9. The method of claim 8, wherein the merchant location identifier is determined based on the merchant identifier.

10. The method of claim 8, further comprising the mobile computing device transmitting the merchant location identifier to the one or more computing devices.

11. The method of claim 1, further comprising:

presenting, via the processor of the mobile computing device, at the display of the mobile computing device, one or more second widgets, each associated with an adjustment parameter to be applied to a given payment transaction; and transmitting, by the mobile computing device, the one or more adjustment parameters to the one or more second computing devices, wherein the payment transaction is adjusted, by the one or more second computing devices, by the one or more adjustment parameters.

12. The method of claim 1, further comprising the merchant computing device presenting at the display of the merchant computing device, a third widget configured to receive a selection of a store identifier among a plurality of store identifiers associated with the merchant.

* * * * *